United States Patent [19]

Corrigau, III

[11] Patent Number: 4,794,838

[45] Date of Patent: Jan. 3, 1989

[54] CONSTANTLY CHANGING POLYPHONIC PITCH CONTROLLER

[76] Inventor: James F. Corrigau, III, 114 Lakewood Cir., Smyrua, Tenn. 37167

[21] Appl. No.: 886,554

[22] Filed: Jul. 17, 1986

[51] Int. Cl.⁴ ...................... G09B 15/04; G10H 1/055; G10H 1/46

[52] U.S. Cl. ........................................ 84/1.01; 84/1.1; 84/1.24; 84/1.27; 84/478; 84/DIG. 30; 340/712; 338/69; 362/86

[58] Field of Search ........................ 84/1.01, 1.04–1.27, 84/DIG. 30, 478; 362/86; 340/712, 815.1, 815.11, 815.15–815.23; 338/69

[56] References Cited

U.S. PATENT DOCUMENTS

| | | | |
|---|---|---|---|
| Re. 31,019 | 8/1982 | Evangelista . | |
| 3,353,435 | 11/1967 | Schmoyer | 84/478 |
| 3,503,297 | 3/1970 | Schmoyer et al. | 84/478 |
| 3,555,166 | 1/1971 | Gasser . | |
| 4,078,464 | 3/1978 | Sugiyama . | |
| 4,085,647 | 4/1978 | Adachi . | |
| 4,177,705 | 12/1979 | Evangelista . | |
| 4,257,306 | 3/1981 | Laflamme . | |
| 4,336,734 | 6/1982 | Polson . | |
| 4,339,979 | 7/1982 | Norman . | |
| 4,384,503 | 5/1983 | Gunn . | |
| 4,412,473 | 11/1983 | Laflamme . | |
| 4,538,501 | 9/1985 | Smith et al. | 84/478 |
| 4,546,245 | 10/1985 | Cooper et al. | 84/1.18 X |
| 4,570,521 | 2/1986 | Fox . | |

OTHER PUBLICATIONS

H. Chamberlin, Musical Applications of Microprocessors (2d. Ed. 1985), Hayden Book Co.

Guitar Player, Jun., 1986 (Special Issue on Guitar Synthesizers and MIDI).

Nathan, "Midi Equipment Update", Recording Engineer/Producer, Apr. 1986, pp. 121–125.

"What's Midi?", Publication #LMB12, 8564 by Yamaha (available from Nippon Gakki Co., Ltd., Hamamatsu, Japan).

"Wire-Bonding Chips to Boards May Speed Surface Mounting", Electronics, May 12, 1986, pp. 33–34.

*Primary Examiner*—Stanley J. Witkowski

*Attorney, Agent, or Firm*—Cushman, Darby & Cushman

[57] ABSTRACT

A real-time polyphonic pitch controller and process for controlling notes or tones emanating from signal synthesizers such as used in the performance of music. The controller comprises a body with key controllers, each of which activates a pre-programmed note; a strumming controller which automatically activates selected key controlled notes in a pre-programmed sequence and rate; and controls and displays used for programming and performance. Extending longitudinally from the body is a guitar-like neck graduated by fret markings and over which slides a hand controller incorporating finger levers. Sliding the hand controller creates portamento, vibrato or glissando effects on the notes activated by the key controllers. Also, each finger lever of the hand controller when depressed raises and/or lowers its own peculiar, pre-programmed combination of individually voiced notes by pre-programmed amounts. Some note pitches may be raised, others lowered, and still others unaffected by the movement of a lever, and the finger levers may be operated separately or in combination. When only partially depressed, a lever alters the pitch of the pre-selected combination of individually voiced notes fractionally, in porportion to the lever's depression. The controllers may further operate in conjunction with a computer program which interprets and processes the controller's pitch altering signals and teaches the musician how to perform on the instrument expressively. In an alternative embodiment, the controller incorporates a sliding fretted hand controller with finger pads rather than levers.

53 Claims, 13 Drawing Sheets

SETUP PROGRAMMING CHART

SETUP NUMBER 1

SETUP NAME E9th STEEL GUITAR

| PSEUDO-STRING KEY# | B P | F. D. S. H. C. LEVERS I | M | R | L | T |
|---|---|---|---|---|---|---|
| 10 | F#3 | | | | | |
| 9 | D#3 | | | | | |
| 8 | G#3 | | A 3 | | | |
| 7 | E 3 | | | F#3 | E♭3 | F 3 |
| 6 | B 2 | C#3 | | C#3 | | |
| 5 | G#2 | | A 2 | | | |
| 4 | F#2 | | | | | |
| 3 | E 2 | | | | E♭2 | F2 |
| 2 | D 2 | | | | | |
| 1 | B 1 | C#2 | | | | |

FRET EMULATOR OFF

| | KEY № | RATE |
|---|---|---|
| UPSTRUM SEQUENCE | 10 9 6 4 1 | 80 |
| DOWNSTRUM SEQUENCE | 1 3 5 6 7 8 | 75 |

FIG. 9a

SETUP PROGRAMMING CHART

SETUP NUMBER 2

SETUP NAME STEEL NECK DOBRO

| PSEUDO STRING KEY # | BP | F. D. S. H. C. LEVERS I | M | R | L | T |
|---|---|---|---|---|---|---|
| 10 | | | | | | |
| 9 | | | | | | |
| 8 | D 4 | E 4 | | | E♭4 | |
| 7 | B 3 | C 4 | | B♭ 3 | | |
| 6 | G 3 | | F 3 | | | F#3 |
| 5 | D 3 | E 3 | | | E♭3 | |
| 4 | B 2 | C 3 | | B♭2 | | |
| 3 | G 2 | | F 2 | | | A 2 |
| 2 | | | | | | |
| 1 | | | | | | |

FRET EMULATOR OFF

| | KEY № | RATE |
|---|---|---|
| UPSTRUM SEQUENCE | 8 7 6 5 4 3 | 77 |
| DOWNSTRUM SEQUENCE | 3 4 5 6 7 8 | 65 |

FIG. 9b

SETUP PROGRAMMING CHART

SETUP NUMBER 3

SETUP NAME ELECTRIC GUITAR

| PSEUDO STRING KEY # | BP | F. D. S. H. C. LEVERS | I | M | R | L | T |
|---|---|---|---|---|---|---|---|
| 10 | | | | | | | |
| 9 | | | | | | | |
| 8 | E 4 | | | | | | F#4 |
| 7 | B 3 | | | | C 4 | C#4 | |
| 6 | G 3 | | | G#3 | A 3 | | A 3 |
| 5 | D 3 | | E 3 | | E 3 | | D#3 |
| 4 | A 2 | | B 2 | | | | B 2 |
| 3 | E 2 | | | | | | F#2 |
| 2 | | | | | | | |
| 1 | | | | | | | |

FRET EMULATOR ON

| | KEY № | RATE |
|---|---|---|
| UPSTRUM SEQUENCE | 8 7 6 5 4 | 80 |
| DOWNSTRUM SEQUENCE | 3 4 5 6 7 8 | 75 |

FIG. 9c

SETUP PROGRAMMING CHART

SETUP NUMBER 4

SETUP NAME VIOLIN FAMILY

| PSEUDO STRING KEY # | BP | F. D. S. H. C. LEVERS | I | M | R | L | T |
|---|---|---|---|---|---|---|---|
| 10 | E 4 | | | | | | |
| 9 | A 3 | | | Bb 3 | B 3 | | |
| 8 | D 3 | | E 3 | | | | |
| 7 | G 2 | | | | | F 2 | |
| 6 | E 2 | | | | | | |
| 5 | C 2 | | | | | | C#2 |
| 4 | A 1 | | | Bb 1 | B 1 | | |
| 3 | D 1 | | E 1 | | | | |
| 2 | G 0 | | | | | F 0 | |
| 1 | C 0 | | | | | | C#0 |

FRET EMULATOR OFF

| | KEY № | RATE |
|---|---|---|
| UPSTRUM SEQUENCE | | 0 |
| DOWNSTRUM SEQUENCE | | 0 |

FIG. 9d

SETUP PROGRAMMING CHART

SETUP NUMBER 5

SETUP NAME HUMAN VOCAL CHOIR

| PSEUDO STRING | | F. D.S.H.C. LEVERS | | | | |
|---|---|---|---|---|---|---|
| KEY # | B P | I | M | R | L | T |
| 10 | E 4 | | | F 4 | Eb 4 | |
| 9 | C 4 | C# 4 | D 4 | | | |
| 8 | Bb 3 | | B 3 | | | |
| 7 | G 3 | | | | | Gb 3 |
| 6 | E 3 | | | F 3 | Eb 3 | |
| 5 | C 3 | C# 3 | D 3 | | | |
| 4 | Bb 2 | | B 2 | | | |
| 3 | G 2 | | | | | Gb 2 |
| 2 | E 2 | | | F 2 | Eb 2 | |
| 1 | C 2 | C# 2 | D 2 | | | |

FRET EMULATOR OFF

| | KEY № | RATE |
|---|---|---|
| UPSTRUM SEQUENCE | 10 8 7 6 5 4 3 1 | 20 |
| DOWNSTRUM SEQUENCE | 1 3 4 6 7 8 9 | 20 |

FIG. 9e

SETUP PROGRAMMING CHART

SETUP NUMBER 6

SETUP NAME BRASS HORNS

| PSEUDO STRING | | F. D.S.H.C. LEVERS | | | | |
|---|---|---|---|---|---|---|
| KEY # | B P | I | M | R | L | T |
| 10 | F 3 | Bb 3 | Eb 3 | C 4 | | D 3 |
| 9 | D 3 | G 3 | C 3 | G 3 | | C 3 |
| 8 | Bb 2 | Eb 3 | A 2 | Eb 3 | B 2 | Bb 2 |
| 7 | G 2 | | F 2 | C 3 | Ab 2 | A 2 |
| 6 | F 2 | Bb 2 | C 2 | Bb 2 | | G 2 |
| 5 | Eb 2 | | | G 2 | D 2 | F 2 |
| 4 | D 2 | G 2 | A 1 | Eb 2 | B 1 | Eb 2 |
| 3 | Bb 1 | Eb 2 | F 1 | C 2 | Ab 1 | D 2 |
| 2 | F 1 | Bb 1 | C 1 | G 1 | | C 2 |
| 1 | Bb 0 | Eb 1 | F 0 | C 1 | B 0 | Bb 1 |

FRET EMULATOR OFF

| | KEY № | RATE |
|---|---|---|
| UPSTRUM SEQUENCE | 10 9 8 7 6 5 4 3 2 1 | 90 |
| DOWNSTRUM SEQUENCE | 1 2 3 4 5 6 7 8 9 10 | 95 |

FIG. 9f

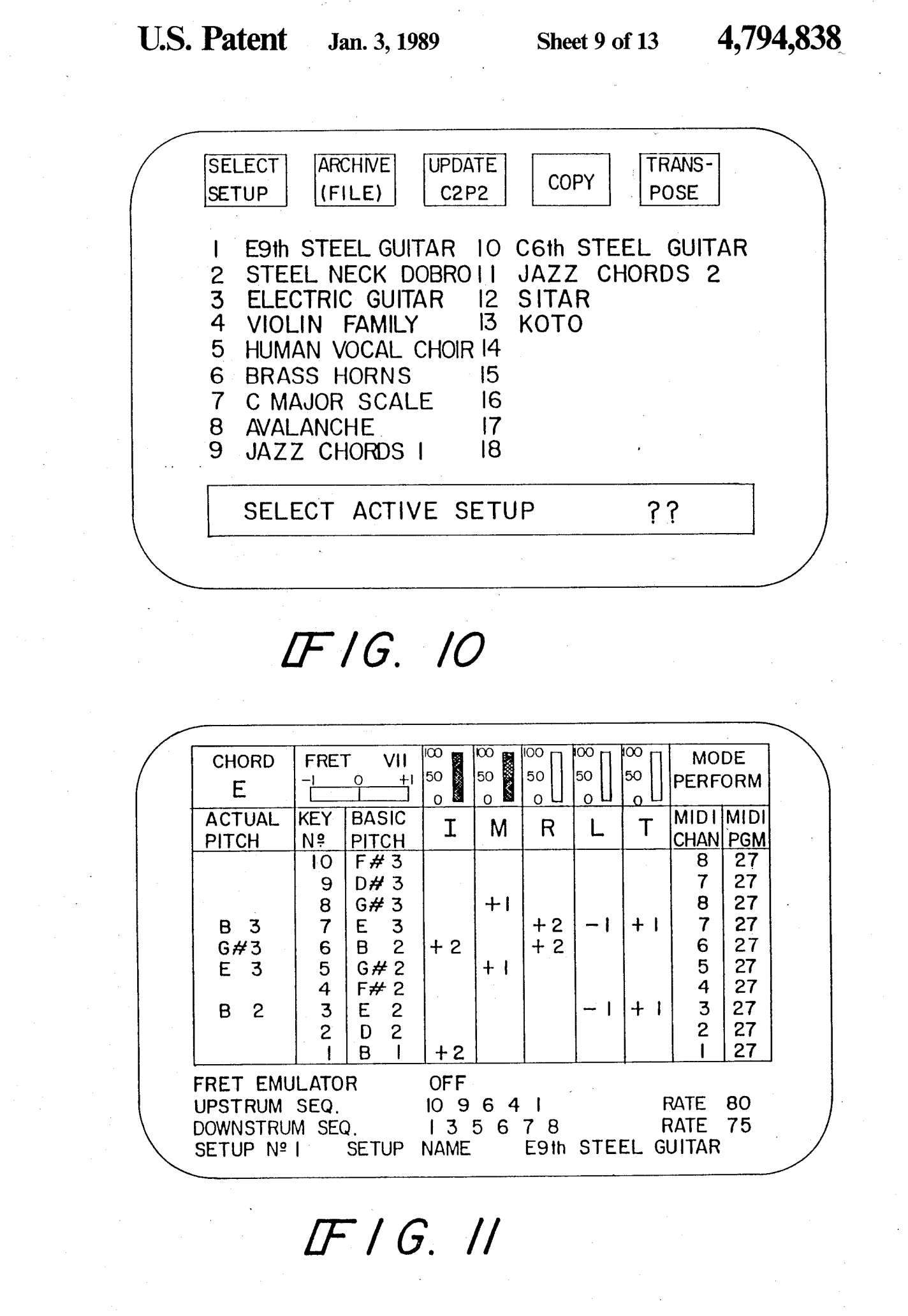

| SELECT SETUP | ARCHIVE (FILE) | UPDATE C2P2 | COPY | TRANS-POSE |
|---|---|---|---|---|

1 E9th STEEL GUITAR
2 STEEL NECK DOBRO
3 ELECTRIC GUITAR
4 VIOLIN FAMILY
5 HUMAN VOCAL CHOIR
6 BRASS HORNS
7 C MAJOR SCALE
8 AVALANCHE
9 JAZZ CHORDS I
10 C6th STEEL GUITAR
11 JAZZ CHORDS 2
12 SITAR
13 KOTO
14
15
16
17
18

SELECT ACTIVE SETUP ??

FIG. 10

| CHORD E | FRET VII -1 0 +1 | | 100 50 0 | 100 50 0 | 100 50 0 | 100 50 0 | 100 50 0 | MODE PERFORM | |
|---|---|---|---|---|---|---|---|---|---|
| ACTUAL PITCH | KEY Nº | BASIC PITCH | I | M | R | L | T | MIDI CHAN | MIDI PGM |
| | 10 | F# 3 | | | | | | 8 | 27 |
| | 9 | D# 3 | | | | | | 7 | 27 |
| | 8 | G# 3 | | +1 | | | | 8 | 27 |
| B 3 | 7 | E 3 | | | +2 | -1 | +1 | 7 | 27 |
| G#3 | 6 | B 2 | +2 | | +2 | | | 6 | 27 |
| E 3 | 5 | G# 2 | | +1 | | | | 5 | 27 |
| | 4 | F# 2 | | | | | | 4 | 27 |
| B 2 | 3 | E 2 | | | | -1 | +1 | 3 | 27 |
| | 2 | D 2 | | | | | | 2 | 27 |
| | 1 | B 1 | +2 | | | | | 1 | 27 |

FRET EMULATOR OFF
UPSTRUM SEQ. 10 9 6 4 1 RATE 80
DOWNSTRUM SEQ. 1 3 5 6 7 8 RATE 75
SETUP Nº 1 SETUP NAME E9th STEEL GUITAR

FIG. 11

CONSTANTLY CHANGING POLYPHONIC PITCH CONTROLLER

BACKGROUND OF THE INVENTION

1. Field of the Invention

This invention relates to polyphonic pitch controllers which when used in conjunction with electronic signal synthesizers, especially as employed in musical applications, is capable of controlling the pitch, amplitude and tone of a multiplicity of independently voiced notes in real time. Note timbre is essentially a function of the synthesizer programming, while note amplitude—attack, sustain and decay—an tone are controlled in a known fashion by piano-like keys fitted with velocity and pressure sensing transducers. The most significant feature of this invention is its pitch controlling ability through which an infinite variety of harmonic and contrapunctal voice movements can be realized. The Constantly Changing Polyphonic Pitch Controller, as it is taught herein, produces no musical sound of its own; rather, it works together with its operator and computer firmware to produce polyphonic pitch, amplitude and tone control signals as electrical input intelligible to a note synthesizer.

2. Description of Prior Art

The development of the microprocessor has singularly transformed the nature and manner of musical performances. The modern synthesizer, a product of this transformation, employs various techniques-phase distortion, frequency modulation, signal sampling, additive and subtractive processing and the like—to create electronically sounds which previously could only have been produced mechanically. Synthesizers can now create the exact sound qualities, or timbres, of almost every known musical instrument. Virtuousity, as difficult to acquire as it is for any particular instrument, increasingly is becoming worsted by the effortless imitations which keyboard controlled synthesizers now produce.

In addition to ease of performance, synthesizers have other advantages over conventional acoustical instruments which will likely add to their increasing prominence in the music industry. The synthesizer can often be less expensive, less temperamental, and less cumbersome than its acoustical counterpart. Furthermore, one synthesizer can, through re-programming, synthesize notes of any number of musical instruments. Thus, the musical instrument family, as we have long known it, may now be moribund; its successor will likely be the single synthesizer connected, interchangeablely, to one of several new pitch/amplitude/tone controllers.

Several types of pitch controllers are known. However, most controllers, such as the wheel, joy stick, ribbon, breath and foot pedal controller, are inherently monophonic in nature and, therefore, have only limited use in a polyphonic environment. See, e.g., Adachi U.S. Pat. No. 4,085,647. Only three general types of polyphonic controllers currently exist: the simple keyboard controller; the digital guitar, See Polson U.S. Pat. No. 4,336,734, and see generally Guitar Player, June, 1986 (special issue on guitar synthesiziers); and various hybrids of the guitar and keyboard. Gasser for instance U.S. Pat. No. 3,555,166, Norman U.S. Pat. No. 4,339,979, Evangelista U.S. Pat. No. Re. 31, 019, and Fox U.S. Pat. No. 4,570,521 all disclose electronic controllers consisting of guitar-like necks and bodies incorporating features such as tough pads, strings, psuedo-strings and key controllers. Sugiyama U.S. Pat. No. 4,078,464, teaches a guitar-like neck over which a shifting keyboard slides and rotates so as to control signal pitch, tone and amplitude. These prior patents have described instruments comprised of both controllers and synthesizers, whereas the present invention teaches a new independent controller. With the recent advent of the standardized protocol, Musical Instrument Digital Interface ("MIDI"), controllers can now freely interchange and interface with any synthesizing equipment. However, this synthesizing equipment offers much more potential for musical expression than controllers can currently exploit. Correspondingly, there exists a need for further polyphonic pitch controllers capable of forming and manipulating new harmonic, rythmic and contrapunctal idioms in real time. The present invention is specifically directed to this purpose.

SUMMARY OF THE INVENTION

The present invention provides a control means for creatively changing polyphonic pitch of notes originating from a signal synthesizer. Being exclusively a controller, the invention itself produces no musical sound; instead, it provides intelligent polyphonic musical pitch, amplitude and tone control signals. The principles upon which the control is based are similar to those found in a variety of conventional instruments, including the piano, guitar, and steel guitar. However, unlike the control available in any one instrument, the Constantly Changing Polyphonic Pitch Controller (hereinafter "Controller") is designed to control polyphonic pitch after the fashion of a composer who conceives and arranges a musical score: that is, it permits large relative progressions of pitch or harmonic groups, variegated by small contrpunctal movements among the group's individually voiced notes, and separated by neat discrimination of passing and neighboring notes.

The present invention incorporates the following features:

(a) a body consisting of a multiplicity of key controllers, having velocity and pressure sensors which, when depressed, activate a pre-programmed note; a strumming controller which can toggle between two switched states, each of which automatically activates selected keys, individually, in a pre-programmed sequence and at a pre-programmed rate, thereby emulating the "up" and "down" strumming of a guitar; and controls and displays used during programming and performance;

(b) a graduated guitar-like neck extending longitudinally from the body; providing a support rail over which a five digit hand controller member slides;

(c) a five digit hand controller member which communicates with and slides longitudinally along the graduated guitar-like neck producing portamento, glissando or vibrato effects globally over pitch, and whichis fitted with finger and thumb controlling means for allowing pre-programmed incremental changes—descending or ascending—of polyphonic pitch of the notes assigned to each key controller, individually or collectively;

(d) software/firmware used in conjunction with the Controller which interprets and processes the Controller's pitch altering signals, teaches the Controller's musician/operator how to achieve desired harmonic and melodical effects, allows pre-programming of the Controller, and monitors the Controller's existing settings and performance.

The principal objective of the invention is to allow expressive polyphonic control of individually pitched and voiced notes in a manner that, historically, has only been possible with many individual musicians and/or vocalists performing together (e.g. performances of choirs, string orchestras, etc.). Each key controller, through programming, is assigned one note value which, depending on the settings of the synthesizer into which it is ultimately routed, is also designated a specific timbre, or instrument sound quality. The timbre may be preset to imitate a trumpet, guitar, saxophone or the like. The key controller acts, however, only as an electronic switch. By depressing a key, its pre-assigned note—pitch and timbre included—is generated by a connected synthesizer, amplified and sounded through loud speakers. In addition, because each key controller, as taught in this invention, is also fitted with pressure and velocity sensing transducers, the amplitude, tone and other musical attributes may be controlled through pre-programming. Note tone and amplitude are functions of the speed and pressure with which a key is struck by the operator; much like the control inherently present in an acoustic piano.

As an alternative or companion to the key controllers, the strum (consisting of a monostable double pole switch) controller, which for easy access is situated parallel to and above the key, may be toggled by means of the operator's thumb and small finger. This simulates the downward and upward strumming motion used on a guitar. Closing the strumming control switch in one direction produces a pre-programmed sequence of notes in one direction (typically from low to high pitch when emulating the "downward" strum on a guitar) and at a pre-programmed rate (the strum speed). Any combination or order of notes may be strummed; additionally, notes may be omitted from the sequence altogether, thereby producing an effect similar to muting strings on a guitar. Likewise, when the strum controller switch toggles in the opposite direction (thereby closing the other end of the double pole switch), the effect is typically reversed (simulating the upstrum on a guitar). A limitless number of programmable settings are available for the strum controller. This creates for the operator a variety of strumming effects, styles and note combinations not presently possible on a guitar alone.

While the strum and key controllers incorporated onto the Controller body control primarily tone and amplitude of a plurality of pre-programmed note values, polyphonic pitch control is achieved principally by the Five Digit Slide Hand Controller. The Five Digit Slide Hand Controller (hereinafter "FDSHC") communicates with, surrounds, and slides longitudinally along the invention's rigid guitar-like neck. The neck is marked either linearly or exponentially with graduated spacings much like a conventional guitar. As the FDSHC slides longitudinally up toward the Controller body, a global pitch change occurs: all synthesized notes pre-assigned to and actived by the key or strum controllers are raised equally. Either a portamento (i.e., a completely smooth global pitch change, equivalent to a bar being slip "up" the strings of a violin) or a glissando (i.e., an incremental change, equivalent to a bar being slip "up" the strings of a fretted instrument, such as a guitar) effect can be produced, depending on the manner in which the Controller is programmed. Sliding the FDSHC longitudinally away from the body reverses the uniform pitch altering the effect.

The finger and thumb levers affixed to the FDSHC modify polyphonic pitch upon a further level. Each lever is programmed to alter the pitch of any number of key assigned notes by any amount, up or down, in proportion to the lever's position (from fully extended to fully depressed). Each lever may, for instance, be programmed to simultaneously raise and lower the pitches of several, or all, independently voiced notes by differing musical intervals.

The resulting pitch shift for each note activated by a key controller is the vector sum, in equal and opposite directions, of the pitch shift component attributable to the sliding of the FDSHC plus the pitch shift component attributable to the FDSHC lever depression. In addition to mere vector summation, other mathematical functions may be used to interpret the combined effect of movement of the FDSHC and its independent levers. Maximum and/or minimum "trigger" settings can be defined for the FDSHC levers creating discrete, rather than continuous, pitch shifting. Pitch shifting can also be triggered by pre-set Boolean algebra combinations of the FDSHC and its levers. In short, when the invention is combined with dedicated software and firmware to analyze, process and assist the operator's control movements, a limitless variety of harmonic and contrapunctal movements are possible. This is primarily due to the special pitch control features inherent in the interaction of FDSHC and its levers.

Another object of the this invention is to provide a means for teaching an operator how to use effectively the programmable setting combinations of the invention through continuous feedback and self-correction. This is accomplished by means of software and firmware dedicated to instruction, assistance and real time display of the programmed settings and the resultant harmonic and contrapunctal movements controlled by the operator.

A further object of this invention is to provide an efficient process whereby new settings may be programmed into the Controller so as to allow the creation of custom tailored control movements and styles for each individual operator.

BRIEF DESCRIPTION OF THE DRAWINGS

FIGS. 9*a*, 9*b*, 9*c*, 9*d*, 9*e* and 9*f* show typical setups, recorded in ROM, which can be used as control schemes for individually voiced notes similar to those used by a variety of conventional instruments;

FIG. 10 is a video display produced by the preferred embodiment of the Controller ROM showing the operator a menu of various performance control settings from which to choose;

FIG. 11 is a preferred real-time video display of an E9th Steel Guitar control setup, produced by the Controller ROM referred to in FIG. 10.

Similar features have been given similar reference numerals in the drawings.

DETAILED DESCRIPTION OF THE INVENTION

Figure 1:
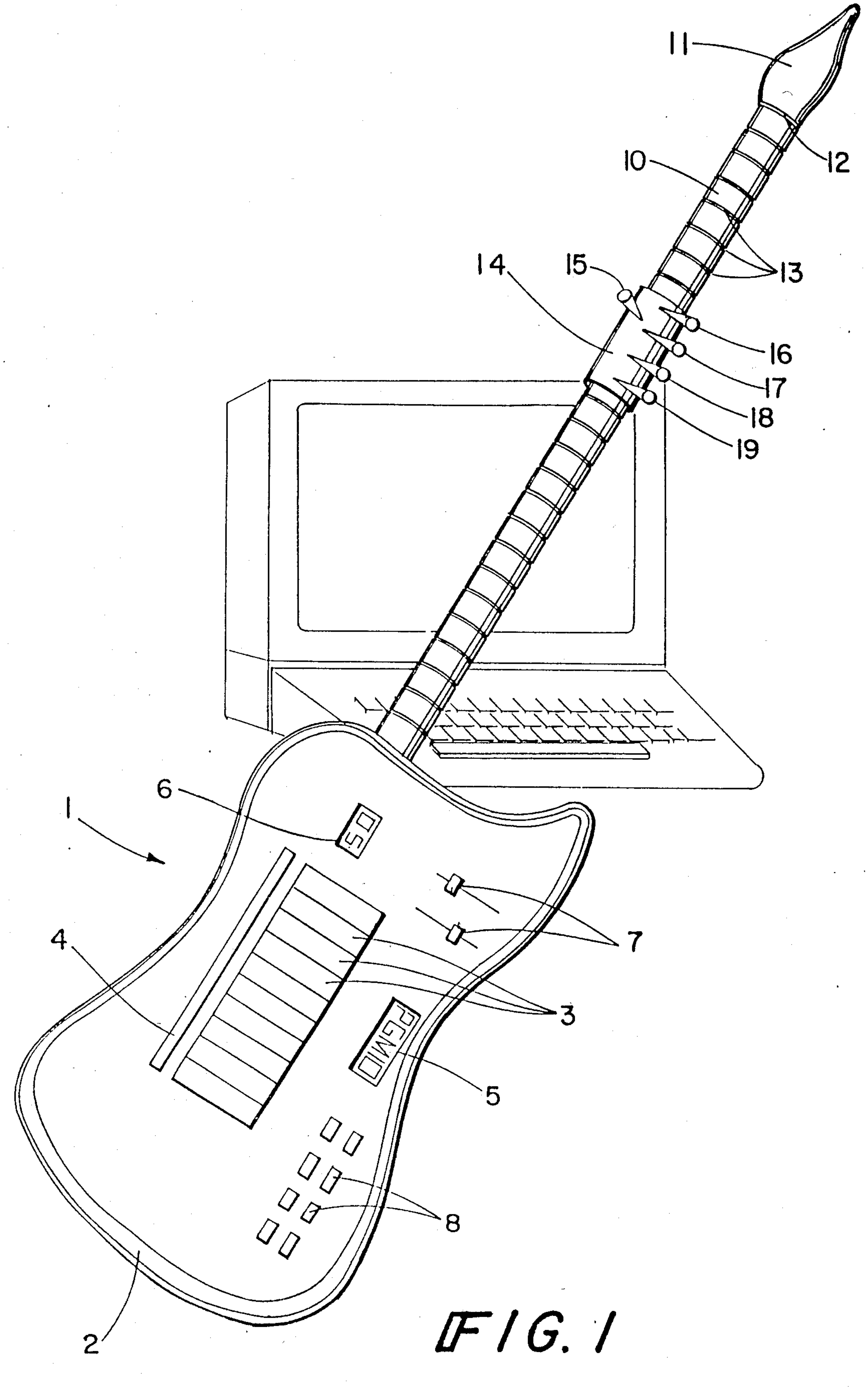
FIG. 1 is an isometric view of an electronic Controller in use with a ROM monitor/programmer, in accordance with a preferred embodiment of the invention.
Figure 2:
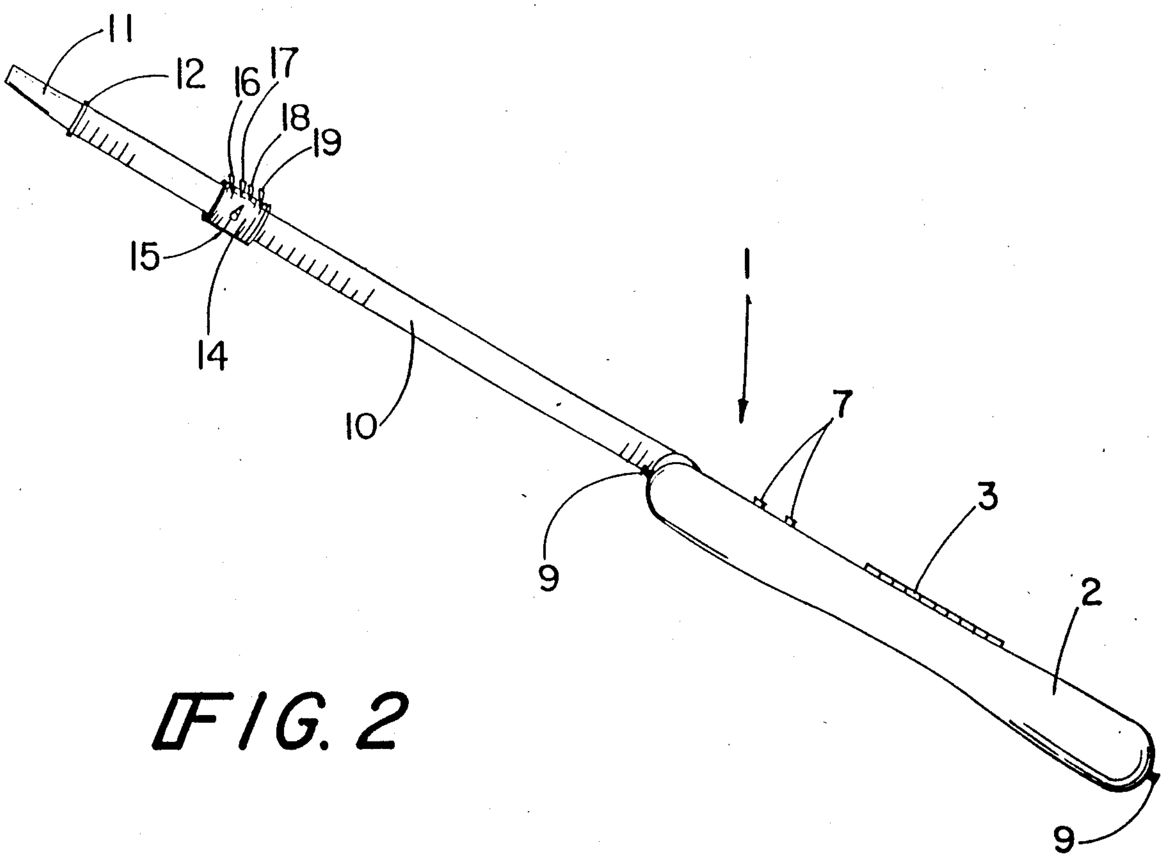
FIG. 2 is a side view of the Controller shown in FIG. 1.

With reference to FIGS. 1 through 7, the Constantly Changing Polyphonic Pitch Controller (hereinafter "Controller") 1 is designated in the general shape of an electric six-string guitar with attachments 9 for shoulder straps (not shown) which permit an operator to play the Controller while standing. The Controller's overall shape will depend upon its ultimate application: a rectangular body with attached legs is more desirable, for instance, for sedentary performances.

In its preferred embodiment, the Controller produces no sound by itself; instead it transmits digital control signals which control tone, amplitude and pitch of notes created by a synthesizer. The Controller's body 2 houses any required electronics and batteries. The body also serves, however, as a rigid mechanical support for the attached neck 10. A number of electronic displays, 5 and 6, attached to the body 2 visually indicate the functional status of the Controller—its custom-programmed set-up and its mode of operation—while a multiplicity of switches, 7 and 8, activate microprocessor and/or ROM controlled functions such as modulation, transpositions, scale temperaments and tunings pre-set by the operator.

The body's most important features are a plurality of key controllers 3 and a strum controller 4 which control amplitudinal, rythmic and tonal qualities of musical notes played by the operator.

The key controllers 3 resemble the white keys found on a piano. When depressed, each key sends a control signal to an off-board synthesizer (not shown) which causes a note with pre-set timbre to sound. Typically, there may be between 6 and 12 key controllers present, although in the preferred embodiment ten are shown. Unlike the keys on a piano, however, each key controlled must be pre-assigned its note value by the operator through programming. This choice alone will define distinctive performance characteristics of the Controller and significantly affect the expressive qualities of the operator's performance. For example, the keys may be assigned note values of the diatonic C major scale, and the control quality would be similar to a piano keyboard; alternatively, the key controllers could be programmed in the overtone or harmonic series F, $B^b$, F, $B^b$, D, F etc. for control qualities of a tenor trombone; or, a perfect fourth/major third interval relationship for the control qualities of a six string guitar. It should be observed that notes which are several hand spans apart on a piano keyboard may be situated next to each other by appropriate key control programming—an operator's forearm need not move in order to reach widely varying pitch signals. Thus, each creative use of note assignments or of interval relationships among the key controllers creates distinctly new control capabilities and manners of expression for the operator.

Programmable assignments of note values create stil further expressive possibilities and genres for the operaor. The key controllers may be easily "tuned" to exotic scale relationships, which will expand the range of musical idioms for the operator. With key controller programming it is possible to generate pentatonic, or duodecimal scales; scales tempered and just; and melodically based scales, such as used in Eastern music, which incorporate small pitch increments such as quarter tones.

In addition to their note mapping function, the key controllers 3 are capable of controlling, in a known fashion, amplitude and tonal qualities of a note when they are fitted with velocity and pressure sensing transducers. Depending on the programmed response to signals from these transducers, a key controlled note can be made to sound blown, plucked, bowed, struck, barked (sic) and the like.

Figure 3:
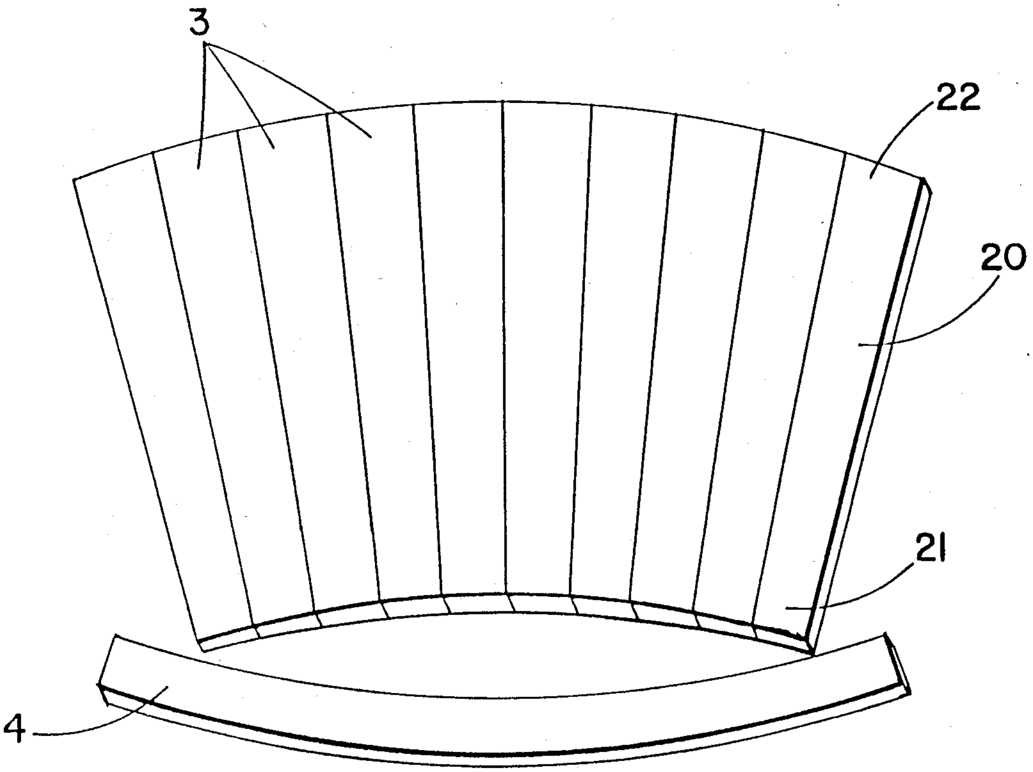
FIG. 3 is a top plan exploded view of an alternative configuration of the key and strum controllers.
Figure 4:
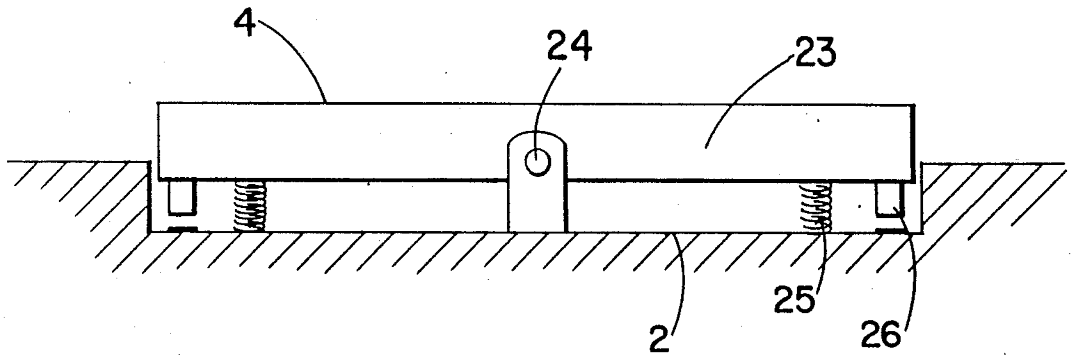
FIG. 4 is a side view of the strum controller.

The key controllers 3, in their preferred embodiment, are arranged in a parallel manner, after the fashion of a piano keyboard. FIG. 3 shows an alternative configuration which follows more closely the natural curve of a hand span. In this configuration the key controllers are directed radially outward away from the operator's hand and towards the lower, distal end of the Controller. Each separate key controller 20, in consequence, has a wider distal end 22 then proximal end 21.

For ease of nighttime playing, the key controllers may be constructed from translucent plastic, behind which a low power light source may be fixed. Each individual key controller may be illuminated according to a spectral color scheme such that the key controller activating the lowest frequency note is illuminated by a color closest to the red end of the optical spectrum, and each other key controller activating successively higher frequency notes is illuminated by a proportionately higher frequency light. Such a color scheme may be used, therefore, to allow the user to determine at a glance the relative pitch of each pre-programmed arrangement of the key controllers.

Above the key controllers 3, towards the higher, proximal end of the Controller, is mounted a pivoting strum controller 4 which, when toggled, generates an automatic "strumming" effect of the pre-programmed notes. The strum controller 4 is positioned so that the thumb and the small finger of the operator's hand may easily span and rest on each end of the strum controller arm 23 which is supported and suspended parallel to the Controller body 2 by means of two coiled springs 25 and a central pivoting means 24. When the strum controller arm 23 is struck by the operator'thumb, the strum controller arm 23 pivots about the central pivoting means 24 and closes one of the electrical contacts 26. A pre-programmed sequence of key controller notes is then initiated at a pre-programmed rate of speed by a ROM based program. This could be described as the downward strum because it closely follows the downward strumming motion of a guitar. At the downward strum any group, or any order, of key controlled notes is sounded; for example, the notes assigned to key controllers 1 , 3 , 4 , 7 , and 2 may sound. Amplitude and strum rate may be pre-programmed or, alternatively, derived continuously from pressure and velocity sensors mounted on the electrical contacts 26.

Immediately after one electrical contact 26 has closed and a downward strum occurred, the cooperating torque action of the springs 25 (one compressed, the other extended) in conjunction with the downward force of the operator's little finger cause the strum controller arm 23 to again toggle about the central pivoting means 24, and close the second of the electrical contacts 26. Another pre-programmed sequence of notes is triggered—typically the reverse sequence of the downward strum (although any sequence is possible), at a strum rate slightly slower than the preceding downward strum. This creates a simulated "upward" strum effect as used with a guitar. Again, if velocity/pressure sensors are applied to the electrical contacts 26, the strum rate will grow faster and louder as the strum controller arm 23 pivots faster and harder; otherwise the strum rate and amplitude must be pre-programmed.

The alternating thumb-little finger toggling motion used to operate the strum controller 4 employs the same wrist movement used in strumming a guitar. However, the toggling of the strum control arm 23 is easier and faster than the strumming of a guitar. Furthermore, the strum control 4 permits unusual combinations of strummed notes which would be difficult, if not impossible, on other instruments. Specific finger picking styles such as a banjo 3 finger roll, or guitar claw hammer are instantly achieved by proper programming and simple wrist movement. Especially important in jazz chord progressions, the programmable strum control method allows the operator to mute any unharmonious notes.

Figure 5:
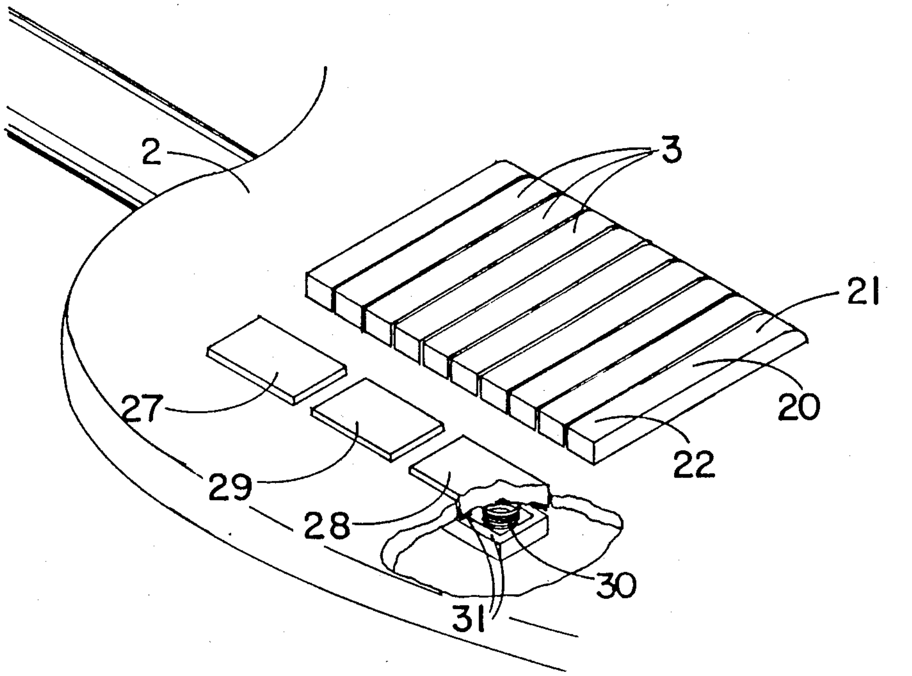
FIG. 5 is an isometric view of a vertical cross section of the Controller body with an alternative realization of the strum controller.

An alternative strum controller arrangement is shown in FIG. 5. The strum control arm 23 is replaced by separate downstrum and upstrum pads, 27 and 28, which are supported above the Controller body 2 by means of coiled springs 30. Electrical contacts 31 are made when the up and downstream pads are depressed. As before, the pads 27 and 28 are positioned above the key controllers 3, on the proximal end of the body 2 so that they may be struck with the thumb and little finger while the three middle fingers are free to depress or sustain the key controllers, if desired. An optional special function pad 29 is fixed to the Controller body 2 mid-distance between the up and downstrum pads 27 and 28. This special function pad 29 may be custom programmed by the operator to activate any number of strum or harmonic related functions. These functions could include a toggle on/off switch for fret emulation (discussed below), a switch allowing the operator to step through the Controller's set-up charts in ROM (discussed below), or a step switch which in conjunction with a fader (e.g. switch 7) could allow smooth transposition of music to different key signatures.

The strum and key controllers, 4 and 3, require only one hand to operate. The operator's other hand is free, therefore, to control the Five Digit Slide Hand Controller (hereinafter "FDSHC") 14—a real time pitch controller—which is superposed and slides longitudinally along a rigid Controller neck 10 attached to and projecting longitudinally from the anterior end of the Controller body 2.

Figure 6:
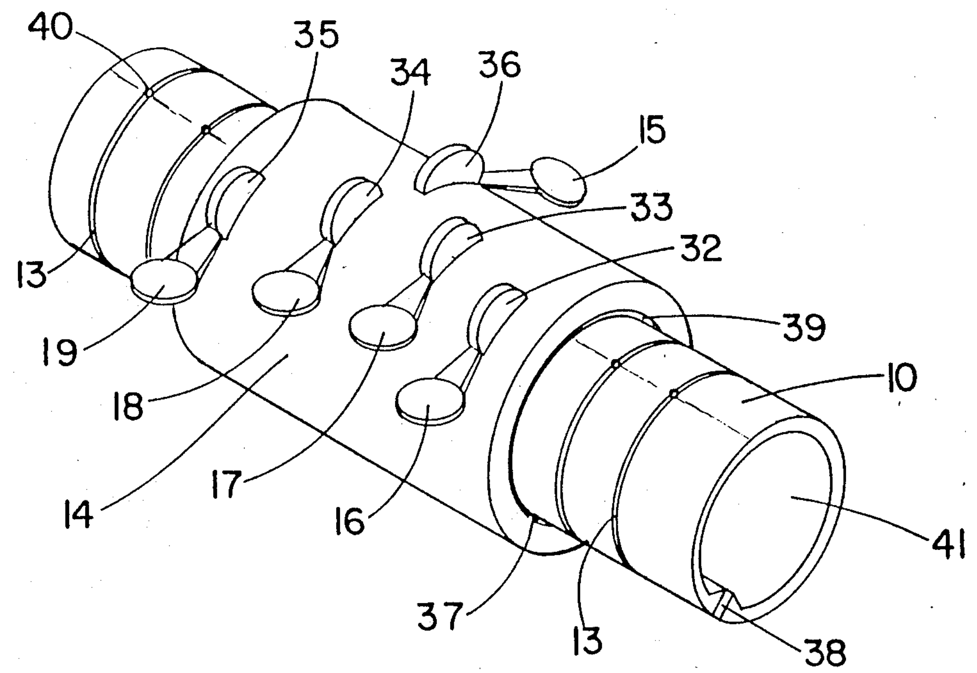
FIG. 6 is an enlarged fragmentary perspective of the Controller neck with the Five Digit Slide Hand Controller superposed.
Figure 7:
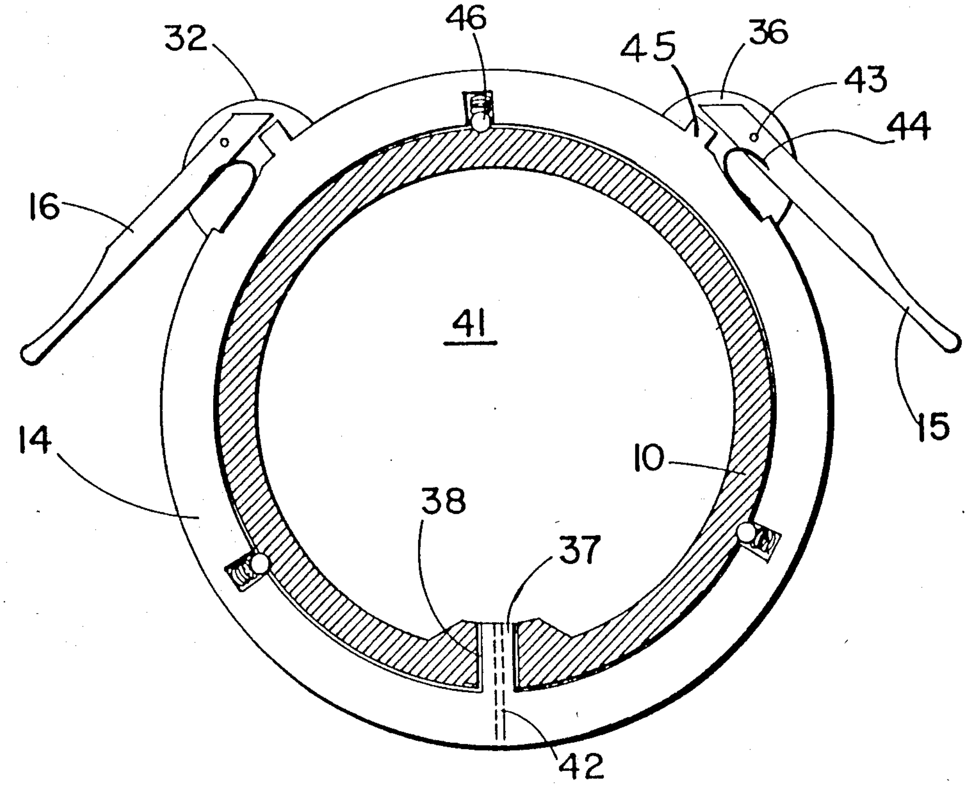
FIG. 7 is an enlarged fragmentary vertical section of the Controller neck and superposed Five Digit Slide Hand Controller as shown in FIG. 6.

The neck 10 should be constructed of plastic or light weight metal and generally will resemble the size and shape of an electric guitar neck. A simple round neck section with superposed FDSCH is shown in FIGS. 6–7; however, necks may also be designed in polygonal shapes.

The neck center 41 is typically hollow so as to permit electrical or fiber-optical connections between the Controller body 2 and all neck locations.

A solid (e.g. wood) neck could be used only if electrical contact wires, tape or foil were inlaid along it. There should also be a uniform cross sectional geometry to the neck running the entire longitudinal length thereby permitting the FDSHC 14 to slide smoothly and unobstructed. A FDSHC guide key 37 which tracks and projects into the neck slot 38 helps maintain the alignment and stability of the FDSCH 14 as it slides.

The FDSCH 14 slide movement is limited by the necks's posterior and anterior ends. Posteriorly, the Controller body 2 checks the FDSHC movement; anteriorly, the nut stop 12. Between the nut stop 12 and the Controller body 2 there must exist uniform cross-sectional neck dimensions and geometry so as to provide small but constant clearance 39 between the neck 10 and the FDSHC 14.

Much like a guitar neck, the Controller neck 10 is graduated with fret markings 13 either at regular linear or exponential intervals. Each fret marking is also notched with a small indentation 40 which cuts unobtrusively into the neck 10. Three retractible spring loaded ball-bearings 46 fixed to the FDSCH's interior side slides in and out of the indentations 40 of various frets as the FDSHC is slided. Thus, the combination of a spring loaded ball bearing 46 and the fret indentation 40 allow the Controller operator to both see and feel the positional changes of the FDSHC 14 as it slides longitudinally along the neck 10.

In the preferred embodiment of the Controller the anterior longitudinal end of the neck 10 has a decorative head piece 11 attached. This head piece 11 provides the Controller 1 with more of a guitar like aspect but otherwise serves no purpose other than providing a display area for manufacturer's logos and/or brand name.

The FDSHC 14 provides a means of real-time polyphonic pitch control for the Controller 1, which when employed with the strum and keyboard controllers, 4 and 3, provides expressive pitch control features. Two independent pitch altering axes are available in the FDSHC control. One pitch altering effect is produced by the longitudinal sliding of the FDSHC 14 along the Controller's neck 10; the other is dependent upon the depression (or combinations thereof) of finger levers 16,17,18,19 and thumb lever 15.

Sliding the FDSHC 14 up and down the neck 10 emulates the control effected by a steel bar slided along the strings of a steel guitar; or, in the case of an unfretted instrument, a finger slided along the strings of a violin. Sliding the FDSHC 14 creates a global pitch change in all the notes controlled by the key controllers 3. That is, moving the FDSHC 14 longitudinally towards the Controller body 2 raises each independently voiced note by the same pitch. Sliding the FDSHC 14 away from the Controller body 2, towards the nut stop 12, lowers the pitch of all notes uniformly. However, the Controller's firmware further interprets these pitch altering signals to produce fret or unfretted sliding effects. The optional fret emulator feature is incorporated into the Controller ROM and permits the FDSHC to produce either portamento (i.e., sliding effect produced on unfretted instruments such as violin or trombone) or glissando (i.e., sliding effect produced on fretted instruments such as a guitar or banjo) effects.

The length of the neck 10 may be electronically divided up into a linear scale, rather than the familiar exponential scale that naturally occurs on real stringed instruments. The linear scale provides more accurate control while the FDSHC 14 is positioned near the body end of the neck 10 than an exponential scale (in which small movements would cause large pitch control changes.) Nevertheless, both scales graduations can be incorporated on the Controller.

The FDSHC 14 is specially designed to conform to the shape of an average person's grasp. Each of the four fingers has its own control lever 16, 17, 18 and 19 for fingers I (index), M (middle), R (ring), and L (little), respectively, comfortably positioned on the finger side of the unit, and the thumb has its own thumb lever 15 positioned around the thumb side of the unit. The movement used to depress all of the five control levers 15–19 simultaneously is that of the hand squeezing an object; viz. a natural hand movement. The positioning of the levers and the general shape and size of the FDSHC 14 should simply be comfortable to the human grip.

Each of the FDSHC levers 16–19 may be programmed to simultaneously raise and lower the relative pitch control signals of any number of notes while the FDSHC itself slides up or down the neck 10. Furthermore, all of the five levers 15–19 may be operated simultaneously in any position at any time. Each lever, 15–19, is pre-programmed to alter the pitch of any number of key assigned notes by any amount, up or down, in proportion to the lever's position (from fully extended to fully depressed). Each lever may, for instance, be programmed to simultaneously lower and raise the pitches of several, or all, independently voiced notes by differing musical intervals.

The levers, 15–19, are fitted with transducer means protected by covers 32–36. Each transducer means (not shown) generates electrical signals proportional to the lever depression angle $\theta$ about a pivot point 43 and the rate of depression change $d\theta/dt$. Electrical signals from the levers, when not transmitted wirelessly, may be conducted by wiring or fiber optical material through neck slot 42 into the controller neck center 41. When a depressed lever is released by the generator's finger or thumb a compressed spring 44 acts with an opposing moment to force it into a stop 45 and the corresponding rest, or fully extended, position.

The resulting pitch shift for each note activated by a key controller is the vector sum, in equal and opposite directions, of the component pitch shift attributable to the sliding of the FDSHC plus the component pitch shift attributable to the FDSHC lever depression (full or partial). However, other mathematical functions, in addition to vector summation, may be used to interpret the combined effect of movement of the FDSHC and its independent levers. For instance, maximum and/or minimum "trigger" settings can be defined for the FDSHC levers to create discrete, rather than continuous, pitch shifting. Pitch shifting can also be triggered by pre-set Boolean algebra combinations (e.g. AND, NOR, etc.) of the FDSHC and its levers. In short, when the invention is combined with dedicated software and firmware to analyze, process and assist the operator's control movements, a limitless variety of harmonic and contrapunctal movements are possible. This is primarily due to the special pitch control features inherent in the interaction of FDSHC and its levers. The author knows of no other device with this amount of constantly changing pitch control available to an operator of electronic synthesizers.

The FDSHC 14 and its individual finger and thumb lever numbers 15–19 must produce intelligible electronic signals which correspond to FDSHC neck position and lever depression, respectively. Thus 6 separate channels of pitch altering information (5 FDSHC levers+FDSHC slide position) must be communicated to the Controller's integral microprocessor system, and analyzed before proper pitch offset can be made to any note activated by the strum or key controllers 4 and 3. Many types of known telemetry systems can be applied for this purpose.

FDSHC neck slide position, for example, may be ascertained by a simple resistivity measurement. A noncorroding plastic conducting strip (not shown) may be run longitudinally along the neck or placed in the neck slot 38 such that the FDSHC is shunted by guide key 37. A variable resistance circuit with a resistive value dependent upon the longitudinal position along the neck of the FDSHC 14 is thus obtained. This strip resistance will be increased or decreased depending upon the point where it is contacted by the FDSHC 14. This creates a potentiometer effect similar to that used in acoustical faders. FDSHC neck slide position may also be determined by contact free methods such as ultrasonic, acoustical, infrared or induction based ranging.

Figure 8:
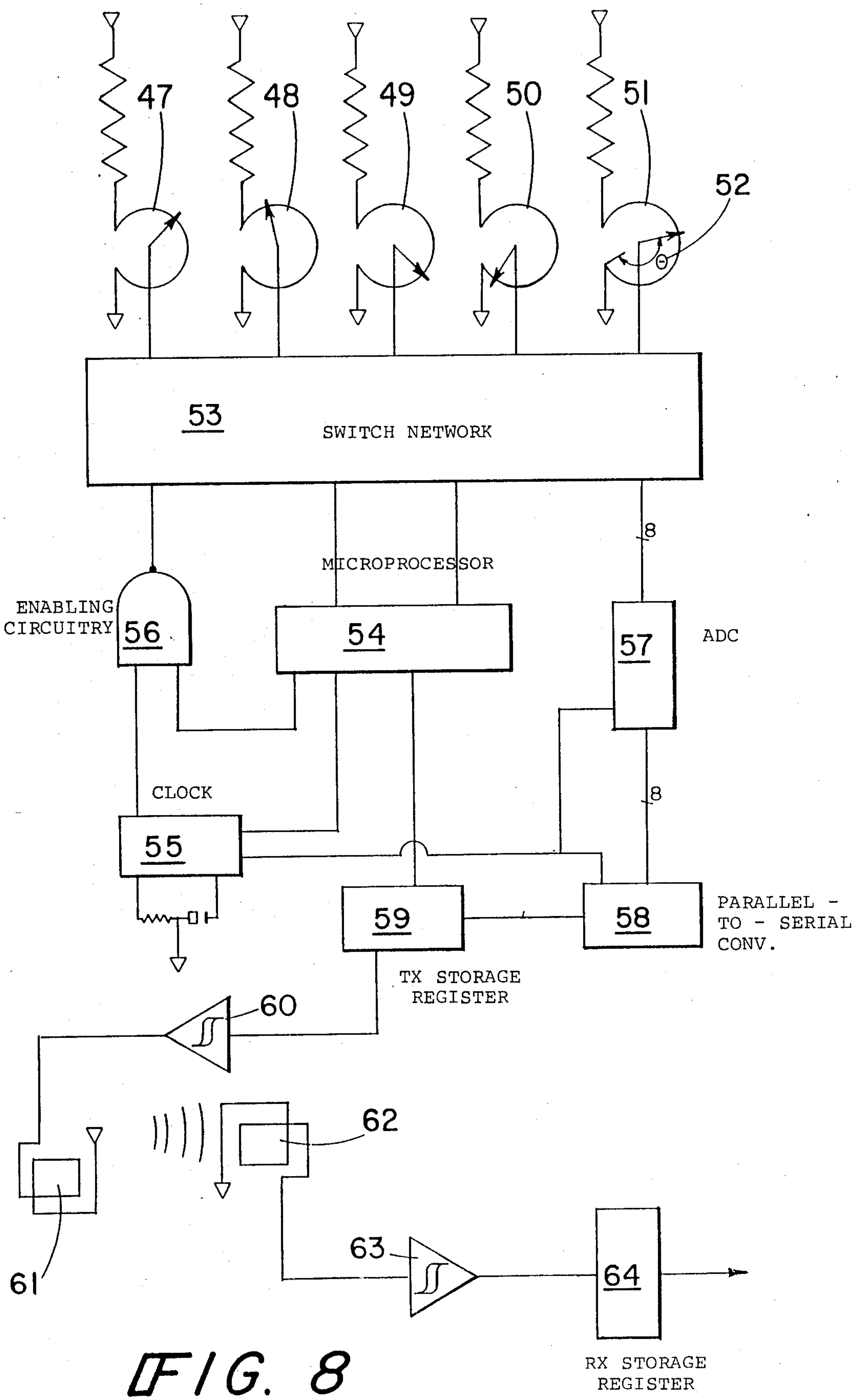
FIG. 8 is a schematic block diagram of the Five Digit Slide Hand Controller sensor circuitry which communicates with the Controller electronics.

The transmission of FDSHC lever data, however, is more complex than the mere transmission of FDSHC slide position. FIG. 8 shows a block schematic of a possible FDSHC sensor circuit which can transmit the data generated by the FDSHC levers 15–19. Each lever sensor 47–51 generates two electrical signals; one signal's strength is proportional to lever depression $\theta$, 52; the other is porportional to the angular velocity $d\theta/dt$. These signals are fed into a high impedance input buffer/analogue switch network 53 which is addressed and controlled by the onboard microprocessor 54 and its related enabling circuitry 56 and clock 55. The output from the analogue switch network passes through an 8 bit analogue to digital convertor 57, an 8 bit parallel to serial converter 58, and on to a transmission storage register 59. The microprocessor prepares the information in the transmission storage register for transmission by adding proper protocol bytes, flags and markers as well as error correction coding (e.g. Hamming Codes) and the like. The processed transmission storage register data then passes through an op-amp buffer 60 and to a transmitter 61 where it is broadcast and received by receiver 62 fixed in or on the Controller neck 10. The transmission may be wireless (e.g. infrared or ultrasonic, or Hall effect magnetic pulse codes) or may involve the use of, say, a multichannel folding ribbon connector linking the FDSHC 14 to the guitar neck 10 (in which case each lever controller sensor 47–51 could have its own conducting channel). Alternatively, the serial transmission data which is amplified by the Op-Amp 60 may be transmitted along the same communication channel (e.g. a plastic resistive strip) used to determine the FDSHC slide neck position. In this case, the transmission data may be transmitted digitally, and the transmission may be powered by a battery (not shown) which is automatically recharged whenever the FDSHC touches the stop 45 or the controller body.

Regardless of the transmission system used, the sensor data received at 62 should be amplified and cleaned of noise typically by a high input impedance Op-Amp 63 with hysteresis, before being stored in the receiver storage register 64. The sensor information stored at 64 then may be interpreted, if necessary, and formated further by an onboard microprocessor or P.I.A. (parallel interface adapter) (not shown).

It should now be apparent that the Controller 1 must possess a means of discriminating and analyzing the various electronic signals generated by the FDSHC 14, the FDSHC levers 15–19, the key controllers 3, the strum controller 4, and other related switches and controls. The pitch tone and amplitude controlling signals should be formatted in such a way as to be intelligent to a wide variety of musical note synthesizers.

As of this writing, the most feasible and desired signal output (i.e. protocol) for the Controller 1 is that of the Musical Instrument Digital Interface, better known as MIDI. MIDI is an international standard for interfacing electronic synthesizers, controllers, computers and other audio electronic equipment. The preferred embodiment of this invention will now be further described using a MIDI protocol system. However, any other known protocol standards, such as one volt per octave control voltage technique, IEEE-488 byte parallel, word parallel, RS232, RS432 serial, or an Ethernet interface all may be used in conjunction with the Controller.

MIDI IMPLEMENTATION OF THE CONSTANTLY CHANGING POLYPHONIC PITCH CONTROLLER

The following terms are specifically defined for purposes of describing this invention in its preferred embodiment:

BASIC PITCH. Basic Pitch of a key controlled note 20 is defined as the pitch represented by the note (i.e. pre-programmed) when the FDSHC 14 is in the extreme position against the nut stop 12.

FDSHC Levers. Each FDSHC lever 15–19 is designated by I, M, R, L or T. The I lever is operated by the index finger; M by middle finger; R by ring finger; L by little finger; and T by thumb.

FRET EMULATOR. A fret emulator is a collection of electronic control algorithms (i.e. firmware) which cause the continuously variable slide positions of the FDSHC to be translated into the closest pseudo-fret on the Controller's neck 10 in a polyphonic real-time fashion. A pseudo-fret is discrete pitch control increment, pre-programmed by the operator, which is typically defined as a musical half step (i.e., the interval between two adjacent notes, such as from C to C#). A fret emulator performs the following functions:

(a) Translating intermediate note values (e.g. notes between C and C#) into the closes pseudo-fret. For example, if pseudo-frets are pre-programmed to indicate half steps, and the combined position of the FDSHC 14, its levers 15–19, and a depressed key controller 20 caused a pitch to be 60% higher than middle C and 40% lower than middle C#, then the Fret Emulator would calculate the C# as the curent pitch value, rather than the intermediate value it would have otherwise been. (Actually, however, in the MIDI implementation described herein, the closest pseudo-fret is always calculated since MIDI data format is defined in half step increments with each note having an integer value between 0 and 127, corresponding to C-2 through G8. All of the intermediate values are generated by calculating the nearest note and immediately sending MIDI pitch bend data of a calculated amount to achieve the intermediate value. Thus, the Fret Emulator is actually achieved by purposely by-passing the logic and algorithms used to achieve continuously variable pitch control.)

(b) Restriking the note. Whenever a note has already been struck (by sending MIDI note-on and velocity codes over the interface) and the FDSHC 14 is moved so that it would cause the note value to cross over one or more pseudo-frets, the "RESTRIKE" logic will cause not only the pitch change MIDI data at the pseudo-fret crossing point, but also a new note-on and a recalculated lower velocity code simulating the effect of sliding the fingers an a fretted string instrument while a string is sustained. The MIDI velocity data is typically used by synthesizers to control the amplitude envelops of the sound generating circuits: lower values causing the note to strike, or be played, with less initial attack, typically.

(c) Diminishing vibrational energy emulation. On a real fretted instrument, each time a vibrating string crosses a fret and vibrates at a higher or lower pitch, vibrational energy is given up causing a sudden decrease in amplitude at each crossing. This can be very easily emulated in MIDI on the Controller by subtracting a programmed amount of MIDI volume data each time a crossing point is encountered.

When all three of the above features are implemented, the Controller should be able to very closely emulate (by creating MIDI output control signals) most of the control features found on real fretted string instruments, such as fretted electric bass guitar, guitars, banjos, mandolins, fretted dobros, lutes, and the like. Of course, on the controller the playing technique would be decidedly different from acoustical instruments.

KEY CONTROLLER MEMBER NUMBERS: Each individual key controller member 20 is assigned a number 1 - 10 on each setup. These numbers correspond with the location of each individual key controller member 20 on the Controller body 2.

PSEUDO-STRING. This is the pre-programmed note value assigned by the operator to each individual key controller member 20 while the FDSHC 14 is at a rest position adjacent to and abutting the nut stop 12. The note is activated (plucked, picked, hit etc. depending on the synthesizer settings) by depressing an assigned key controller number 20.

REST POSITION. Rest position, a standard reference point for pitch control, is achieved when the FDSHC 14 is adjacent to and abutting the nut stop 12.

SETUP. A setup is a collection of programmed control parameters which is associated with a number and/or a name, and is stored in the Controller's firmware memory. As will be shown, each setup has a particular musical purpose. Therefore, it is desirable to associate a name with each one. Also, since it would be desirable to instantly change from one setup to another (even in the middle of a performance) a number should be associated with each setup so that momentary contact switches, such as a numeric keypad or similar arrangement, could be used to rapidly change setups. Factory setups are setups as defined above having already been given names and numbers and having been stored in an onboard memory device(s) in a production model of the Controller 1.

Several Setup Programming Charts are shown in FIGS. 9*a*–9*f*. They are hypothetically programmed; nonetheless, the charts define certain tuning, fundamental pitch or control idioms associated with their musical instrument counterparts.

For example, the first chart, FIG. 9*a*, indicates a Controller programmed SETUP for an E9th pedal steel guitar. Here the Controller actually emulates the loosely defined standard setup of a pedal steel guitar with three pedals and two knee levers in the E9th tuning. The three pedals are respectively emulated by the index levers 16, middle 17 and ring 18 finger levers of the FDSHC 14, and the two knee levers are emulated by the little finger 19 and thumb levers 15 of the FDSHC 14. The remaining charts FIGS. 9*b*–9*f* also reflect certain control features of their analogous musical instruments as will be seen from the following detailed description.

Detailed Explanation of the Six Hypothetical Setups

Refer to FIGS. 9*a*–9*f*. In all cases a setup number and name appear at the top of the chart for identification. The bottom section of the charts indicate whether the Fret Emulator is on or off as well as the strum controller's 4 up-strum and down-strum programmed sequences. The strum controller rates are thus hypothetically defined: 99 represents instantaneous strum; 0 represents no strum; and 1 through 98 represent linearly varying strum rates from slow to fast.

The body of each chart indicates the programmed relationships between the key controllers 3 and the five individual levers on the FDSHC 15–19. The left hand column of pseudo-string settings indicates the basic pitch of each of the ten key controllers 3 at the nut stop position 12. (Of course, any number of individual key controller numbers 20 may be used in the Controller.) Basic pitch (abreviated as "BP" on the charts) is expressed in musical notation consisting of the twelve note chromatic scale and octave number (where C3 is middle C on the piano, and C4 is one octave higher than middle C, and C2 is one octave lower than middle C, etc.). The five columns to the right of the basic pitch column (viz. I, M, R, L and T) indicate the programmed pitch changes which will occur when the levers are depressed. Many more programming parameters can be included in these charts (such as MIDI transmitter channel numbers for each key controller, as well as MIDI performance data); however, these have been omitted for clarity.

FIG. 9*a* details a setup simulating the control features present in the standard E9th steel guitar. The tuning is general purpose by offering both chromatic spacing and open chord spacing of intervals. Note that two E major partial scales exist between key controller numbers 3, 4 and 5 (E2, F#2, G#2) and key controller numbers 9, 7, 10, 8 (D#3, F#3, G#3), the later purposely being out of order. This demonstrates how the Controller differs from piano-like keyboard controllers which define equal intervals between keys in either ascending or descending order.

If the operator were to depress three or more of the individual key controller numbers 1, 3, 5, 6, 7, 8 at rest position, an E major chord would be produced on the synthesizer equipment connected to the Controller. Sliding the FDSHC 14 down to the 7th pseudo fret, however, would cause the E major chord to modulate to a B major chord.

At rest position, playing an E major chord and depressing both the I and M finger levers will cause the chord to modulate to A major by raising the B pitches to C# (under direct control of the I lever) and the G# pitches to A (under the direct control of the M lever). In the first instance, pitch is raised by one whole step (B to C#), and in the second case, pitch is raised by one half step (G# to A). This is an example of how the Controller can simultaneously control varying amounts of pitch change under direct operator control.

If the operator were to play an open E chord at rest position and thereafter depress the I and M levers while also sliding the FDSHC 14 down seven frets, the chord would change, by degrees, from an E major back to another form of E major. This type of control is highly desirable for composers who want to incorporate this form of "chordal animation" to orchestral and choral arrangements.

Another example of the Controller capability to simultaneously control pitch changes in any direction under direct operator control is demonstrated by the interaction of depressing the M and L levers simultaneously while depressing several of the E major key controllers (numbers 1, 3, 5, 6, 7, 8) with the operator's other hand. The chord changes from E major to B7th by simultaneously raising the G#s to As and lowering the Es to D#s ($E^{b}5$). Again, the ability to simultaneously raise the lower polyphonic pitch is desirable during either composition or performance.

The hypothetical Controller setup in FIG. 9*b* mimics the standard tuning of a steel neck dobro which consists of two G major triads. Since the dobro has six strings, only six out of the ten key controllers are programmed in this example. In this setup, depressing any open keys will produce a G major chord at the nut stop position. The levers are programmed to produce a large variety of chord combinations by depressing one, two, or three levers at a time. All of the control capabilities demonstrated for the E9th steel guitar setup are present in this steel neck dobro setup, which is easier to visualize.

The hypothetical Controller setup in FIG. 9*c* mimics a standard six string guitar in basic pitch settings. Again, only six key controllers are programmed, as in the dobro example. In this setup, the T lever is programmed to produce a B7th chord, and the finger levers are programmed to produce many chords via combinations of one, two, or three levers depressed at a time. Note that in this case the Fret Emulator is turned on. Also, the down-strum rate is slower than the up-strum rate, which is typical during most guitar performances.

The hypothetical setup in FIG. 9*d* includes two sections of pitch widely spaced by intervals of fifths—the dominant interval of the violin family—with a major triad in the center of the setup (keys 5, 6 and 7). The fiver levers are programmed to make small changes to the widely spaced basic pitches. This setup would probably cause the operator to make extensive movements of the FDSHC up and down the neck of the Controller to control the desired pitches of a violin arrangement. However, this would be analogous to real string players in an orchestra; i.e., the violinists, viola and cello players who make extensive arm movements up and down their instruments necks. This setup demonstrates not only the Controller's flexibility in mimicking real instrument conventions, but the "carry over" effect of the real instrument performance technique to the Controller. It appears more realistic to control synthesized strings on the Controller than on a conventional keyboard controller.

The hypothetical setup of FIG. 9*e* has the control features required in musical arrangements typically written by composers for vocal choirs and background vocalists. The basic pitch settings form a C7th chord. The four finger levers, I, M, R, and L, are programmed to offer two sets of chromatic scale changes (i.e., C to C# to D interval change by using the I and M levers; and $E^b$ to E to F interval change by using the R and L levers), while also offering many major, minor, diminished, seventh, and augmented fifth chord possibilities when used in combinations. When the T lever is depressed simultaneously with the L lever a ten note $A^{b}9$th chord is produced.

The hypothetical setup of FIG. 9*f* is modeled after the $B^b$ overtone series—the basic harmonics or series of pitches which naturally occur in many resonating brass instruments (i.e., valveless); however, a partial major scale is included in the middle of the ten key settings (viz. keys 4, 5, 6, 7, corresponding to rest position notes, D2, $E^b$2, F2, and G2 respectively). This setup demonstrates extensive programming of the FDSHC levers. Unlike the previous examples in which a lever may only vary the pitch of one or two notes (excluding octaves), in this example, each lever changes the basic pitch of almost every key controller.

Note that the basic pitches form a $B^b$ chord (excluding the keys 5 and 7, which correspond to $E^b$2 and G2). The I lever is programmed to raise eight of the ten pseudo strings up by a fourth, or five pseudo-frets, to an $E^b$ chord. This action may emulate several slide trombones or even "slide" trumpets sliding notes in unison. The M lever is programmed to cause a nine note decending slide from a $B^b$ chord to an F7th via varying pitch change amounts. The R lever is programmed to change all ten pseudo strings into a Cm7th chord through varying pitch change amounts; and, the T thumb lever is programmed to change all ten pseudo strings into a $B^b$ major scale. One or more levers could have been programmed to produce a minor scale, or a chromatic scale, if desired.

It should be understood that through creative programming of setup charts a wide variety of sounds and pitch control features are possible.

FIRMWARE USED IN CONJUNCTION WITH THE CONTROLLER

In its preferred embodiment, the Controller is used in conjunction with off-board firmware designed to process, interpret, and analyze pitch/amplitude/tone control, assist the operator in programming and performing, and teach the operator how to use effectively the Controller to generate new sounds and control characteristics.

The Controller offers limitless pitch altering capabilities. At any given neck position there are 120 (i.e. $5!=5\times4\times3\times2\times1$) discrete combinations of FDSHC lever positions possible (all of which may be further altered through re-programming). The FDSHC itself may be longitudinally slided in any number of positions for further pitch altering capability. Thus, it is essential that the Controller provide a means to teach its operator how to use these Controller combinations and monitor the real-time performance of the Controller.

The Controller must coordinate the operation of its on-board firmware (which merely translates all signals from FDSHC, FDSHC levers, key controllers and strum controller transducer's into a MIDI protocol) with the off-board firmware (mainly for programming, instruction and monitoring) described above. The on-board firmware must generate a set of MIDI output signals for the off-board firmware separate from that generated for the synthesizer equipment.

The synthesizer equipment, for instance, needs only to receive MIDI note on and off data, and pitch bend data. The synthesizer does not need data to indicate how the on-board firmware arrived at its notes and pitches. In contrast, the off-board firmware can not use the MIDI data intended for the sound-generating synthesizer because it cannot "reverse-engineer" the data to discern which key controllers, finger levers and neck positions caused the note and pitch data to be originally generated. Instead, the off-board firmware requires the Controller to send special controller data to it indicating: (1) which key (or strum) controllers are depressed, (2) which finger levers are depressed by what amount, and (3) neck position of the FDSHC. Fortunately, the MIDI specification has "room" for these off-board specific controllers as follows:

The MIDI "controller" command may be used for this purpose. (The MIDI controller command is defined as a MIDI status byte command with the four most significant bits, out of an eight-bit byte, being set to the 1011 binary.) This command precedes another eight-bit byte defining the controller number, which precedes another eight-bit byte defining the value of the controller. MIDI allows 32 special controllers to be used out of a possible 64 controller numbers. As of October, 1985, the International MIDI Association has defined only 12 of the 64 possible controller numbers. Therefore, the invention's specific controllers may fit into the existing MIDI numbering scheme, and still be under the 32 controller limit.

A possible MIDI controller number assignment table is shown in Schedule A below. By using such as assignment table it is possible for various manufacturers to produce uniformity of fit, form and function in all Controllers and their corresponding synthesizing equipment.

In addition to transmitting MIDI note on/off and pitch bend data to the synthesizer, the Controller's on-board firmware should also intersperse the Controller data with information which will support the off-board firmware.

The Controller should send all off-board firmware data on a MIDI channel number separate from all of the channels assigned to pseudo-strings. Since MIDI has 16 simultaneous channels to choose from, this presents no problem. (Although, for reasons of economy, one MIDI interface should be used, instead of two).

The interspersing of the Controller data should be user-selectable. That is, the musician should be able to allow or prevent this data transmission. Otherwise, this data may become so voluminous that subsequent delays in synthesizer responsiveness will be apparent during performance. However, when the off-board firmware is in use, time delays would not normally be a significant factor, since the musician would usually make slow actuator movements while looking at the video monitor to visualize what has been done. During this learning phase, the visual feedback becomes the self-regulating factor which tends to keep the MIDI signals from becoming cluttered.

The on-board firmware must, additionally, be able to send its setup and performance parameters, of the active setup, (whether a factory setup or user setup) to the MIDI-equipped computer containing the off-board firmware ROM. This can be achieved by using the same MIDI "system exclusive" commands currently used by other MIDI controllers, synthesizers, and computers for exchanging bulk program data.

The on-board firmware should, alternatively, be able to receive its setup and performance parameters from the MIDI-equipped computer containing the off-board firmware ROM. Again, this can be achieved by using the same MIDI "system exclusive" commands mentioned above. This ability allows the operator to create new user setups on the computer while using the video monitor as programming aid. This ability will encourage the operator to do more experimentation with various setup parameters before finalizing them in the on-board firmware memory area.

The Off-board ROM: Features and Operation

The off-board ROM shall enable the MIDI-equipped computer to receive and send MIDI "system common" commands for setups, and to receive and process in real-time the specific Controller commands, and to ignore the performance data intended for the synthesizer equipment.

There are two modes of operation for the off-board firmware: Performance and Programming modes.

In Programming Mode, the operator may create and modify setups.

In Performance Mode, the off-board firmware interprets and monitors the musician's controller movements and displays calculated pitch values, chord and actuator positional data in real time on the video monitor. This real-time data is what facilitates the musician's learning process on the Controller.

The off-board ROM produces a main screen display similar to the one depicted in FIGS. 10 and 11. The ROM may have additional displays to support this main display. This main display may be used for both modes of operation—Programming and Performance.

A setup menu, used in both programming and performance modes, is displayed in FIG. 10. For example, option #1, the E9th Steel Guitar, is chosen, and the off-board firmware then generates the display shown in FIG. 11. The main screen display, FIG. 11, resembles the Setup Charts shown in FIGS. 9*a*–9*f*. The same columns for key number, basic pitch, and the five levers of the FDSHC appear as before. However, the effects of the lever programming are not now expressed in absolute musical pitch value; instead they are displayed in relative terms of plus and minus musical half steps. The additional columns to the right indicate the associated MIDI transmission channel for each key controller, and its respective program number to be used on each MIDI channel. These two columns effect the performance of the connected synthesizer equipment.

The upper right hand corner of FIG. 11 indicates which mode the program is in—either Performance or Programming. The parameters displayed at the bottom of the screen have been covered in the Setup Charts earlier in this test and appear the same here: fret emulator status, strum controller parameters, setup number and setup name.

The programming mode of operation is essentially static. The operator changes any of the static setup parameters and the changes are sent back to the Controller via the computer's MIDI-OUT output to the MIDI-IN input and instantly become the current active setup in the Controller. The screen display always shows the current setup in effect in the Controller. Any changes in the current setup which may change the operation of the connected synthesizer equipment (such as MIDI program number) must be "turned around" by the on-board firmware and transmitted immediately to the synthesizer equipment.

In contrast to the programming mode, the performance parameters of the Controller and its connected synthesizer equipment are fixed. However, the screen dispay, as shown in FIG. 11, becomes a "live" real-time display. The parts of the display that become animated are:

(a) The ACTUAL PITCH column. Whenever a key controller on the Controller is depressed, the off-board firmware calculates the effective pitch of the key controller and displays it in the pitch displayed in this column. The example in FIG. 11 shows that key controllers 3, 5, 6, and 7 are currently depressed, and their respective pitches are B2, E3, G#3, and B3, as calculated by the off-board ROM firmware.

(b) The CHORD box. The CHORD box in the upper left hand corner of the display shows the resulting chord based on the ACTUAL PITCH column. Standard musical notation is used for this display. If the pitches are so inharmonious as to not fall within a discernable chord mask, then "N/C" is displayed in this box, meaning no chord. If two or fewer key controllers are depressed, the box will be empty. The example in FIG. 11 displays "E" signifying an E major chord, based on the B2, E3, G#3, and B3 pitches appearing in the ACTUAL PITCH column.

(c) The FRET box. The FRET box located to the right of the CHORD box contains two real-time displays. The number appearing in the center of the box ("VII" in the example) indicates which pseudo fret is closest to the FDSHC's present neck position. The display under the number "VII" is a bi-directional horizontal bar graph which fills in either direction indicating how sharp or flat the neck position actually is from the value stated above. (FIG. 11 illustrates a perfectly centered 7th fret postion). This bar graph is scaled in units of plus and minus one musical quarter step.

(d) The five VERTICAL BAR GRAPHS for finger and thumb levers. These five bar graphs appear above their respective control levers and display the proportionate amount of lever movement in effect in real-time. A clear, or empty, bar display indicates that the lever is not depressed. A partially depressed lever will cause a proportionate amount of bar shading from 0% to 100% as indicated by the adjacent scale markings. The example in FIG. 11 indicates both the index and middle finger levers are fully depressed.

The off-board firmware in Performance Mode especially simplifies the learning of a Controller setup. Refering to FIG. 11, it is obvious that the ACTUAL PITCH column is the mathematical sum of the BASIC PITCH column plus the number of frets up the neck (as shown in the FRET box) plus the changes in pitch effected by the levers. The arrangement of the display clearly indicates which keys are effected by lever movements and by how much.

The off-board ROM effectively eliminates the tedious and time consuming calculations which would otherwise burden the operator in determining actual pitch and chords. The operator may now enjoy depressing and actuating the Controller, while listening to the sounds generated by the synthesizer(s); and the off-board firmware displays what is actually being performed.

Typical Controller-Firmware-Synthesizer Interconnections (for a MIDI Protocol)

Figure 12:
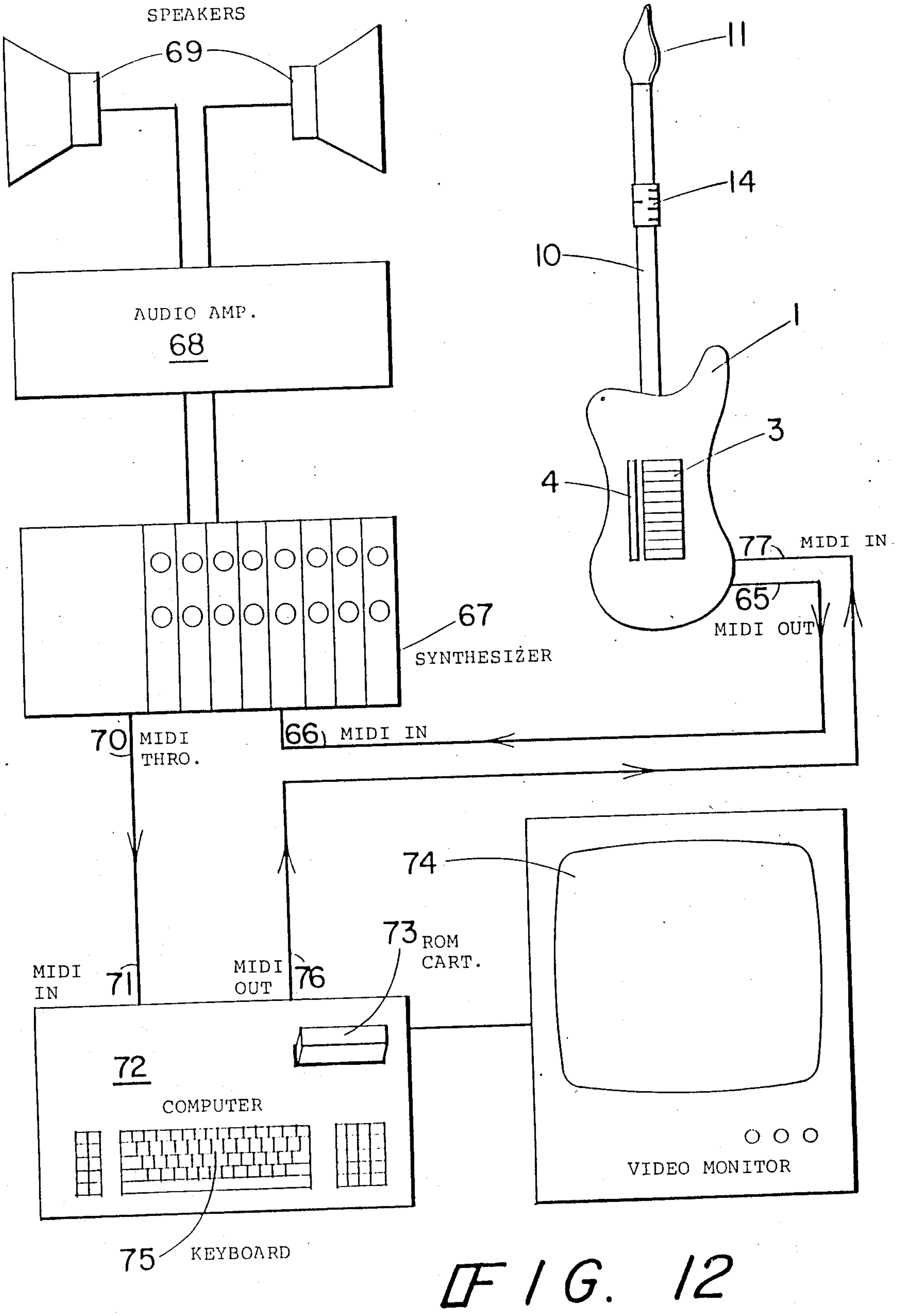
FIG. 12 is a component block diagram of a typical Controller system in use with Computer Terminal, Synthesizer and Sound Amplification.
Figure 14:
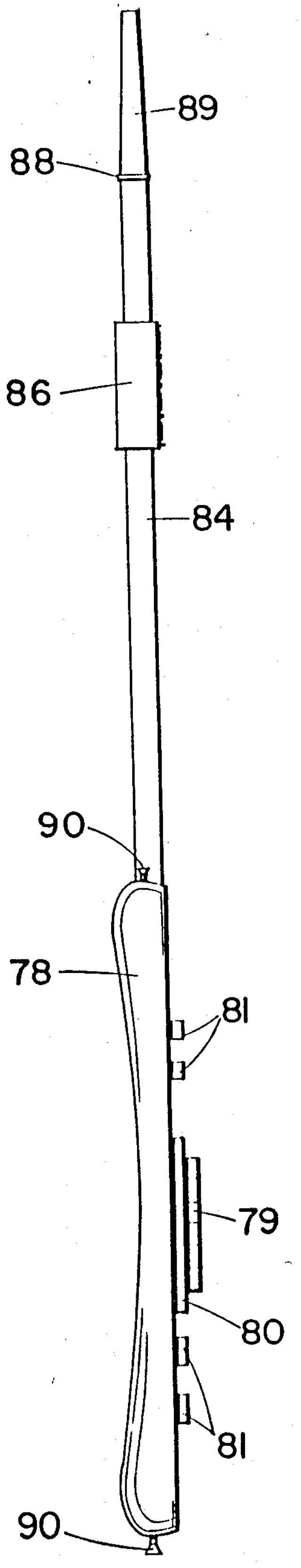
FIG. 14 is a side view of an alternative embodiment of an electronic Controller emulating a six string guitar as shown in FIG. 13.
Figure 13:
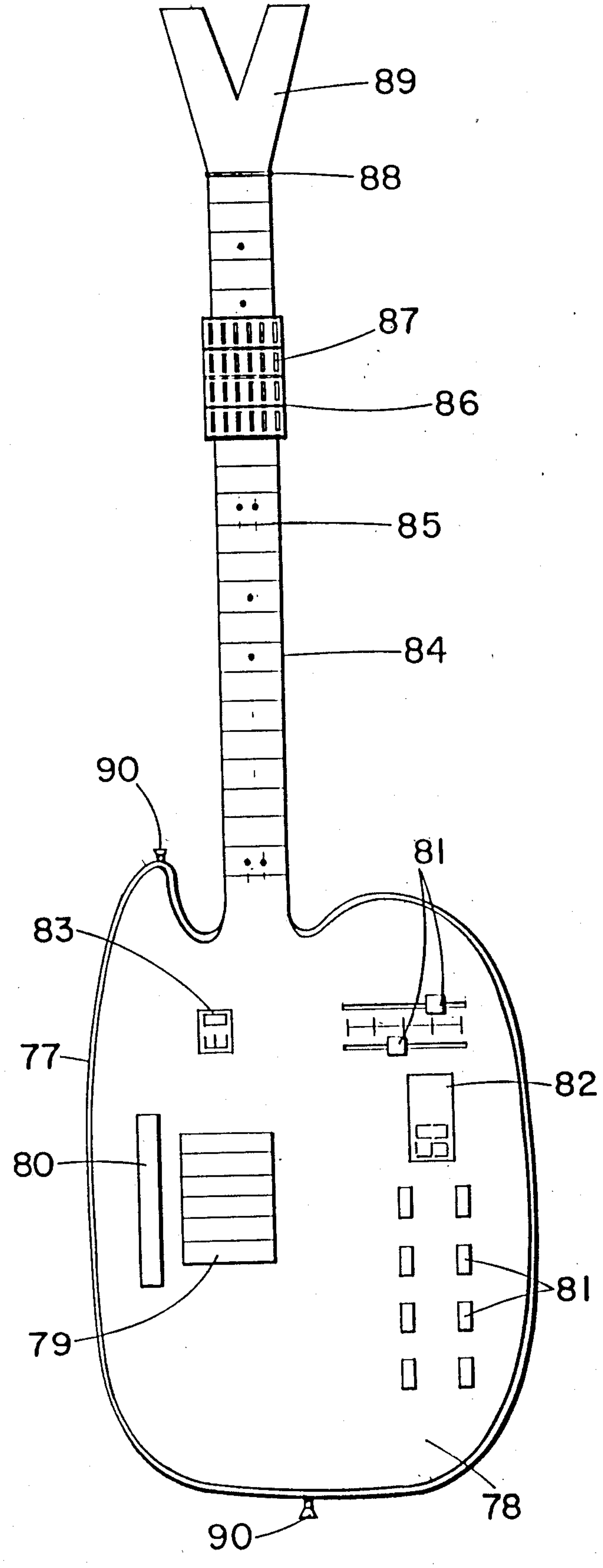
FIG. 13 is a top plan view of an alternative embodiment of an electronic Controller emulating a six string guitar, wherein six piano-like key controllers and a sliding fretbroad controller member of matrix switches are shown.
Figure 15:
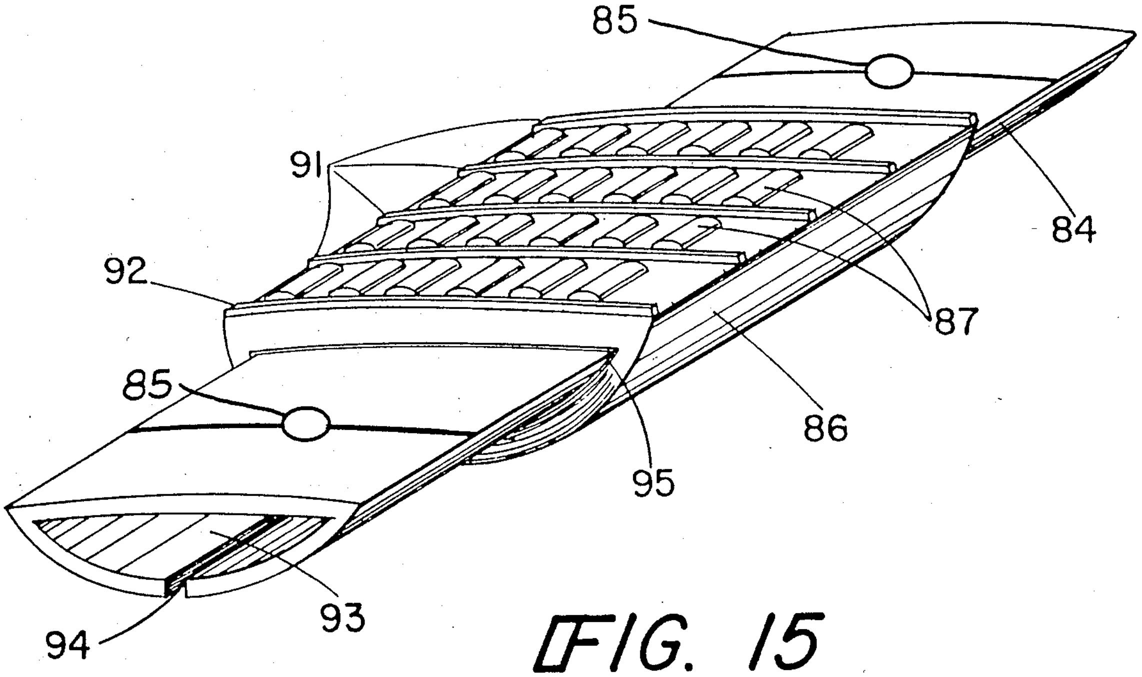
FIG. 15 is an isometric view of a vertical cross section of the neck and sliding fretboard controller shown in FIG. 13.
Figure 16:
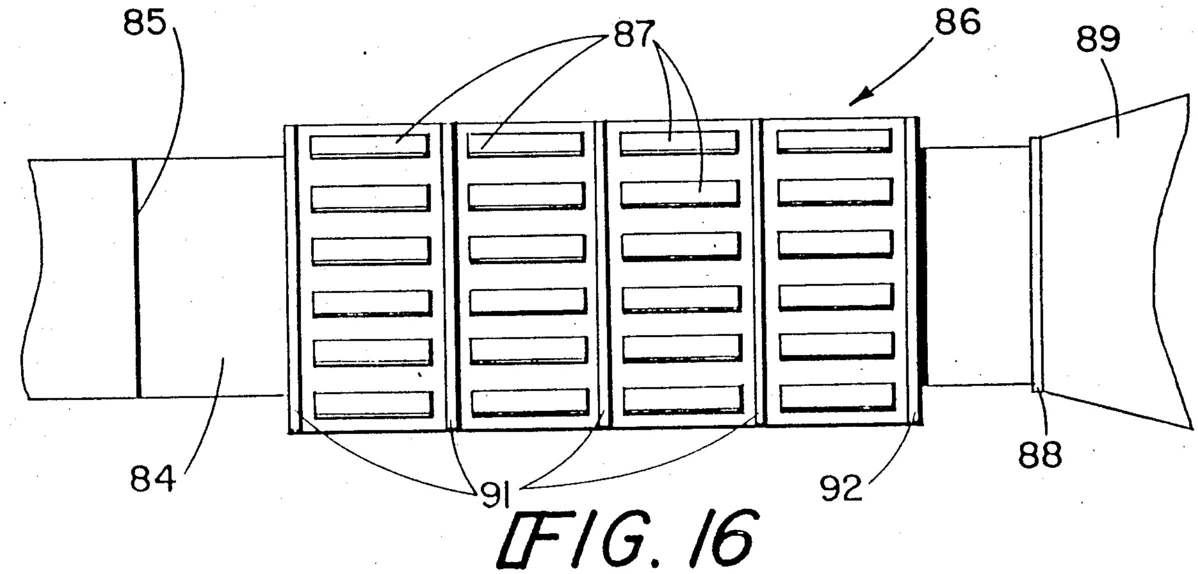
FIG. 16 is a top plan view of the sliding fretboard controller and partial or neck section as shown in FIG. 13.

With reference to FIG. 12, a ROM cartridge 73 is shown plugging into the Controller's off-board computer 72. The off-board computer interfaces with a video monitor 74 and keyboard terminal 75. The MIDI OUT terminal 76 of the Computer 72 is routed to the MIDI in terminal 66 of the Synthesizer 67, by way of the MIDI IN 77 and MIDI OUT 65 terminals of the Controller 1. As shown, the Synthesizer 67 is linked to the MIDI IN terminal 71 of te Computer 72 by means of the MIDI THRU connector 70. The Synthesizer 67 is comprised of an audio amplifier 68 and speakers 69.

When the Controller initially is activated the "power-on" electronics go through initialization routines and display a message (e.g. on LCD's 5 and 6) which prompts the operator for a SETUP number. The operator pushes a button, or buttons (e.g. switch 8) to enter a SETUP number in the range of 1 through n, where n is the highest setup number which can be stored given the available on-board memory. After entry, the specified setup is recalled from memory and becomes the active set of control parameters, until changed.

If the SETUP just recalled has been previously programmed by the user, or factory, it will be ready for use in performance. If it has never been programmed, or has been erased, it must be programmed before use.

Programming is split into four major categories:

(1) Pseudo-string basic pitch and MIDI transmission channel.

(2) Strum controller sequences and rates.

(3) The FDSHC levers.

(4) MIDI performance data for the external synthesizers.

Programming Basic Pitch and MIDI channel numbers

The operator presses a specified switch (e.g. switch 8) to enter this programming mode. Then, pressing one of the piano-like key controllers 20 will enable that key controller to be programmed. The first parameter to be entered is basic pitch. By moving a slide control or other controls (e.g. slider 7), basic pitch is entered in the MIDI range (1 through 127 decimal, or C#-2 through G8 musical). Then by pressing the same switch used to enter this mode one more time, the operator is prompted to enter the MIDI transmission channel number (range 1 through 16) on which this key controller is to transmit MIDI data. This key controller is now programmed. Pressing the other key controllers will individually select them for subsequent programming. This procedure is repeated until all keys desired are programmed for pitch and MIDI channel.

Schedule B is a simplified FORTRAN listing of Controller's off-board firmware routines for a preferred embodiment application.

Alternative Embodiment of Invention: A Digital Guitar

An alternative embodiment of the Controller is shown in FIGS. 13–17. The Controller 77 is shown with a body 78 upon which are attached six piano like key controllers 79, a strum controller 80, programming and data entry controls 81, a programming display 82, a performance display 83, and attachment couplings for a shoulder strap 90. Extending longitudinally from the body is a neck 84 punctuated by positional fret-like markings 85 (as found on a six-string guitar), a sliding fretboard controller 86 with a matrix of pressure sensitive on/off switches 87, a nut stop 88 limiting the longitudinal movement of the sliding fretboard controller 86 at one end, and a decorative headpiece 89.

This alternative embodiment of the invention is designed to emulate and to be played like an electric six string guitar. There are, therefore, two major differences in this embodiment from that discussed previously. Firstly, six key controllers 79 are typically pre-programmed to activate, when depressed, the notes E, A, D, G, B and E thereby simulating the pitch values controlled by each string of a six string guitar. Secondly, a distinct slide fretboard controller 86 replaces the sliding hand controller used in the invention's previous embodiment.

The sliding fretboard controller 86 is modeled after a guitar fretboard. In this embodiment four (4) fret divisions are shown by the protruding fret markers 91. Between each of the fret markers 91 are six independent pressure sensitive finger switches 87 which simulate the six strings normally found on a guitar. When depressed, the finger switches 87 each raise or lower the pitch values pre-assigned to the key controllers 79 by a pre-programmed amount. When each switch is programmed to raise the pitch of its corresponding key controller by a minor second, or half-step interval the invention performs and controls like a conventional guitar. Thus, minimal training is required for a guitarist to use the invention in this embodiment.

Another axis of pitch shifting is possible as the sliding fretboard controller 86 is slided longitudinally along the Controller's neck 84. As the sliding fretboard controller 86 moves longitudinally all notes are globally altered in pitch in a pre-programmed manner. Typically, however, each Key controlled note will increase in pitch by a semi-tone or half step interval as the sliding fretboard 86 is moved longitudinally a fret closer to the Controller body 78. The invention is designed to be used in conjunction with the strum contoller, fret emulator and all other components previously discussed. The major variation is the special sliding fretboard controller and programming methods used.

The invention performs a capo-like function on all guitar chords. An operator may play an E chord, for instance, while the capo fret 92 is positioned adjacent to the nut stop 88. By merely sliding the E chord up to the fifth fret an A chord or major 4th modulation has occurred. Other advantages of the invention will be readily apparent.

In order to slide easily, the sliding fretboard controller 86 is shown with a clearance space 95 between itself and the neck 84. Also the neck has a cavity 93 with an access slot 94 for a guide key (not shown) which will prevent rotation of the sliding fretboard controller 86 or provide an electrical contact between the sliding fretboard controller 86 and the on board microprocessor (not shown).

Figure 17:
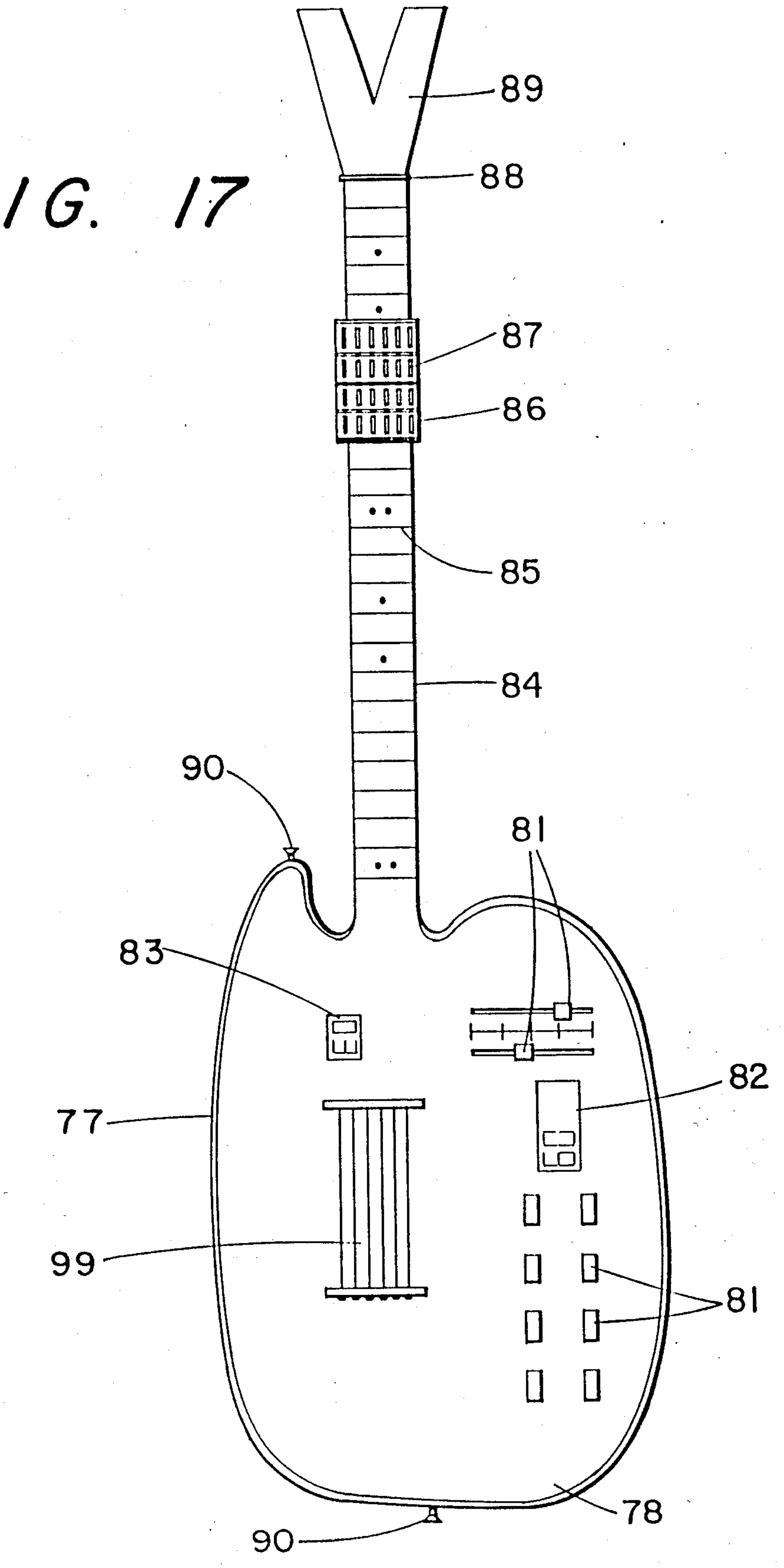
FIG. 17 is a top plan view of an alternative embodiment of an electronic controller, wherein the key controllers are replaced by a section of guitar-like string transducers.

Although the invention has been described in connection with sample embodiments, it should be understood that the invention is not limited to such embodiments. For example, the key controllers may be replaced, or used in conjunction with, a plurality of parallel guitar-like strings which can be strummed or picked to individually activate a pre-programmed note. The strings may run longitudinally along all or part of the controller body and may have amplitude sensing transducers which activate the pre-programmed notes. Such an embodiment is shown in FIG. 17. Thus, the present invention is intended to cover all further alternatives, modifications and equivalents as may be included within the scope and spirit of the invention as defined by the appended claims.

MIDI CONTROLLER NUMBERS

| MIDI Controller Number | Definition | October 1985 MIDI Specification | New C2P2 Use |
|---|---|---|---|
| 1 | modulation wheel | YES | NO |
| 2 | breath controller | YES | NO |
| 4 | foot controller | YES | NO |
| 5 | portamento time | YES | NO |
| 6 | data entry | YES | NO |
| 7 | main volume | YES | NO |
| 8 | C2P2 neck position | NO | YES |
| 9 | C2P2 index finger lever | NO | YES |
| 10 | C2P2 middle finger lever | NO | YES |
| 11 | C2P2 ring finger lever | NO | YES |
| 12 | C2P2 little finger lever | NO | YES |
| 13 | C2P2 thumb lever | NO | YES |
| 64 | damper/sustain pedal | YES | NO |
| 65 | portamento on/off | YES | NO |
| 66 | sostenuto | YES | NO |
| 67 | soft pedal | YES | NO |
| 68 | C2P2 key controller 1 | NO | YES |
| 69 | C2P2 key controller 2 | NO | YES |
| 70 | C2P2 key controller 3 | NO | YES |
| 71 | C2P2 key controller 4 | NO | YES |
| 72 | C2P2 key controller 5 | NO | YES |
| 73 | C2P2 key controller 6 | NO | YES |
| 74 | C2P2 key controller 7 | NO | YES |
| 75 | C2P2 key controller 8 | NO | YES |
| 76 | C2P2 key controller 9 | NO | YES |
| 77 | C2P2 key controller 10 | NO | YES |
| 96 | data increment | YES | NO |
| 97 | data decrement | YES | NO |

"SCHEDULE A"

```
              PROGRAM C2P4

   C  by James F. Corrigan III.  All rights reserved.

   C  PURPOSE:  To specify the Main Logic of the C2P4 ROM firmware of the
   C            C2P2 controller.
   C            This program is intended to be translated into another language
   C            or dialect and be ported to another computer, preferably a home
   C            computer or music computer such as a COMMODORE 64 or 128,
   C            ATARI 520ST or 1040ST, YAMAHA CX5M/MSX, or APPLE IIe or MAC, etc.
   C            This program may be translated to various microprocessors' assembly
   C            languages by using "Cross-Compilers" and various "Cross-Development-
   C            Tools" which are commercially available for the popular micro-
   C            processors such as the Z-80, 6800 family, MC68000 family, 8086/8088
   C            family, and NS16000 family, etc.

   C  DATE WRITING BEGUN:  March 17, 1986

   C  AUTHOR:  James F. Corrigan III

   C  LANGUAGE:  VAX FORTRAN, V4.3-145

   C  ENVIRONMENT:  VAX 11/750, VMS 4.2

   C  ------------------------------------------------------------------------!
   C                 U S E R    P R O G R A M    C O N T R O L S              !
   C                                                                          !
   C  Consistent with current trends in applications design, this C2P4 firmware !
   C  should use ICONS and cursor positioning via a MOUSE controller or keyboard  !
   C  ARROW KEYS for all user parameter selections and control functions.       !
   C                                                                          !
   C  There are six ICONS indicated at the top of the monitor screen display   !
   C  shown in Figure 7;  namely "SELECT SETUP", "ARCHIVE or FILE", "UPDATE C2P2", !
   C  "COPY", "TRANSPOSE", and "MODE".  However, for clarity, the ICONS are not  !
   C  represented in picture-symbols in Figures 7 or 8, since the type and choice !
   C  of symbols depends on the graphics resolution of the target computer.    !
   C  Instead, the ICONS are indicated by labeled boxes in Figures 7 and 8.    !
   C                                                                          !
   C  All numeric input should be entered by the user positioning the cursor in !
   C  the numeric field on the screen display and pressing either MOUSE buttons or !
   C  DATA INCREMENT/DECREMENT keys on the computer's keyboard to set the desired !
   C  numeric value.                                                          !
   C                                                                          !
   C  All alphanumeric input, however, must be entered by using the computer's  !
   C  main keyboard.  (Alphanumerics, however, are only entered for SETUP NAMES.) !
   C  ------------------------------------------------------------------------!

              INCLUDE 'XCOM.FOR/LIST'
 1 C  ----------------------------------------------------------------------
 1
 1            PARAMETER NUMBER_OF_FRETS = 24          !# of Pseudo-frets on neck.
 1
 1            PARAMETER NUMBER_OF_KEYS  = 10          !# of key controllers on body.
 1
 1            PARAMETER NUMBER_OF_SETUPS= 18          !# of setups stored in C2P2 memory.
 1
 1 C  ----------------------------------------------------------------------
```

```
        BYTE KEYS_ON (NUMBER_OF_KEYS)           !key on = .true.; off = .false.

        BYTE MIDI_STATUS_BYTE                   !read from MIDI_IN port.
        BYTE MIDI_CONTROLLER_NUMBER             !read from MIDI_IN port.
        BYTE MIDI_LEVER_POSITION                !read from MIDI_IN port.
        BYTE MIDI_NECK_POSITION                 !read from MIDI_IN port.
        BYTE MIDI_KEY_STATUS                    !read from MIDI_IN port.

        BYTE MIDI_CHNL16_CTRL_CHANGE            !10111111 binary or 191 decimal.,
                                                !control change code on channel 16.

        INTEGER *2 MIDI_XMIT_CHNL (NUMBER_OF_KEYS)
        INTEGER *2 MIDI_XMIT_CHNLS (NUMBER_OF_KEYS,NUMBER_OF_SETUPS)

        INTEGER *2 MIDI_PGM_NUMBER (NUMBER_OF_KEYS)
        INTEGER *2 MIDI_PGM_NUMBERS (NUMBER_OF_KEYS,NUMBER_OF_SETUPS)

        INTEGER *2 FRET_EMULATOR                        !0 = off;  1 = on
        INTEGER *2 FRET_EMULATORS (NUMBER_OF_SETUPS)

        INTEGER *2 UP_STRUM_SEQUENCE (NUMBER_OF_KEYS)
        INTEGER *2 UP_STRUM_SEQUENCES (NUMBER_OF_KEYS,NUMBER_OF_SETUPS)

        INTEGER *2 UP_STRUM_RATE
        INTEGER *2 UP_STRUM_RATES (NUMBER_OF_SETUPS)

        INTEGER *2 DOWN_STRUM_SEQUENCE (NUMBER_OF_KEYS)
        INTEGER *2 DOWN_STRUM_SEQUENCES (NUMBER_OF_KEYS,NUMBER_OF_SETUPS)

        INTEGER *2 DOWN_STRUM_RATE
        INTEGER *2 DOWN_STRUM_RATES (NUMBER_OF_SETUPS)

        INTEGER *2 CLOSEST_FRET
        INTEGER *2 ACTUAL_PITCH (NUMBER_OF_KEYS)

        INTEGER *2 BASIC_PITCH (NUMBER_OF_KEYS) !basic pitch array
        INTEGER *2 BASIC_PITCHS (NUMBER_OF_KEYS,NUMBER_OF_SETUPS)

        INTEGER *2 LEVER_SETUP(NUMBER_OF_KEYS,5)!contains the FDSHC programming
                                                !in a two-dimensional array, where
                                                !the first subscript is the key
                                                !controller number, and the second
                                                !subscript is the lever number as:
                                                ! 1 = FDSHC index finger lever
                                                ! 2 = FDSHC middle finger lever
                                                ! 3 = FDSHC ring finger lever
                                                ! 4 = FDSHC little finger lever
                                                ! 5 = FDSHC thumb lever

        INTEGER *2 LEVER_SETUPS (NUMBER_OF_KEYS,5,NUMBER_OF_SETUPS)     !as above, except three-dimensional.

        INTEGER *2 CURRENT_LEVER_EFFECT (NUMBER_OF_KEYS,5)!two-dimensional array as
                                                !above, except it contains the
                                                !real-time effects of the FDSHC's
                                                !neck and lever positioning.
```

```
1          INTEGER *2 ACTIVE_SETUP_NUMBER         !active setup number.
1          INTEGER *2 POSITION (2)                !cursor row, cursor column
1
1          REAL LEVER_POSITIONS(5)                !varies between 0.0 and 1.0, uses the same FDGHC lever subscripts
1                                                 !as LEVER_SETUP above.
1          REAL ELAPSED_REAL_TIME                 !expressed in seconds, typically.
1          REAL NECK_FRET_FACTOR                  !converts MIDI data to real fret #.
1          REAL REAL_FRET                         !varies between 0.0 and FLOAT(NUMBER_OF_FRETS).
1          REAL OFF_TUNE                          !varies between -.5 and +.5 numerically,
1                                                 !which represents -.25 to +.25 musical steps;
1                                                 !since each fret is a half step,
1                                                 !and you can't be off by more than
1                                                 !half of a half step!
1
1          REAL LEVER_DEPRESSION_FACTOR           !varies between 0.0 and 1.0
1
1          CHARACTER *18 SETUP_NAME, SETUP_NAMES(NUMBER_OF_SETUPS)
1
1          CHARACTER *6 REAL_CHORD                !6 ASCII characters, musical notation.
1
1 C  ------------------------------------------------------------------------
1
1          COMMON /MIDI_IN/ MIDI_STATUS_BYTE, MIDI_CONTROLLER_NUMBER,
1      &                    MIDI_LEVER_POSITION, MIDI_NECK_POSITION,
1      &                    MIDI_KEY_STATUS
1
1          COMMON /MIDI_OUT/ MIDI_OUT
1
1          COMMON /SETUPS/ BASIC_PITCHS, LEVER_SETUPS, MIDI_XMIT_CHNLS,
1      &                   MIDI_PGM_NUMBERS, FRET_EMULATORS,
1      &                   UP_STRUM_SEQUENCES, UP_STRUM_RATES,
1      &                   DOWN_STRUM_SEQUENCES, DOWN_STRUM_RATES,
1      &                   SETUP_NAMES
1
1          COMMON /ACTIVE_SETUP/ BASIC_PITCH, LEVER_SETUP, MIDI_XMIT_CHNL,
1      &                         MIDI_PGM_NUMBER, FRET_EMULATOR,
1      &                         UP_STRUM_SEQUENCE, UP_STRUM_RATE,
1      &                         DOWN_STRUM_SEQUENCE, DOWN_STRUM_RATE,
1      &                         ACTIVE_SETUP_NUMBER, SETUP_NAME
1
1          COMMON /PARAM/ NUM_FRETS,
1      &                  NUM_KEYS,
1      &                  NUM_SETUPS,
1      &                  NECK_FRET_FACTOR,
1      &                  MIDI_CHNL16_CTRL_CHANGE
1
1          COMMON /PERFORM/ KEYS_ON, CURRENT_LEVER_EFFECT, OFF_TUNE,
1      &                    LEVER_DEPRESSION_FACTOR, CLOSEST_FRET, ACTUAL_PITCH,
1      &                    REAL_FRET, ELAPSED_REAL_TIME, REAL_CHORD, LEVER_POSITIONS
1
1          COMMON /CURSOR/ POSITION
1 C  ------------------------------------------------------------------------

           DATA MIDI_CHNL16_CTRL_CHANGE / 191 /

  C  ------------------------------------------------------------------------
  C  initialize:
```

```
      NUM_FRETS = NUMBER_OF_FRETS              !Move parameter into labeled common.
      NUM_KEYS = NUMBER_OF_KEYS                !Move parameter into labeled common.
      NUM_SETUPS = NUMBER_OF_SETUPS            !Move parameter into labeled common.
      NECK_FRET_FACTOR = NUMBER_OF_FRETS / 127.        !Set for particular neck model of C2P2.

      DO 10 J = 1 , NUMBER_OF_KEYS             !Turn all key controllers off
10    KEYS_ON(J) = .FALSE.

C  ----------------------------------------------------------------------------
C  main control logic:

      CALL POWER_UP                            !Clear screen, initialize, etc.

      GO TO 100                                !User must select a setup after power-up.

50    CALL GET_ICON (ICON)                     !Check cursor position to see which
                                               !ICON the user wants.
      GO TO (100,200,300,400,500,600) ICON

100   CALL SELECT_SETUP                        !Display available setups on Screen #2.
      GO TO 50                                 !Load-up ACTIVE_SETUP.

150   CALL PERFORM                             !Run in real-time, screen # 1.
      GO TO 50

200   CALL ARCHIVE                             !Read or write SETUPS to or from external
      GO TO 50                                 !cassette, floppy disk, hard disk, EPROM,
                                               !or printer.

300   CALL UPDATE_C2P2                         !Send SETUPS out MIDI_OUT port to
      GO TO 50                                 !C2P2's EPROM.

400   CALL COPY                                !Copy from one SETUP to another.
      GO TO 100                                !Now select an ACTIVE_SETUP.

500   CALL TRANSPOSE                           !Alter ACTIVE_SETUP.
      GO TO 150                                !Try it out.

600   CALL MODE ( IMODE )                      !Return value for IMODE as
                                               !1 = PROGRAMMING mode, or
      GO TO (700,150) IMODE                    !2 = PERFORMANCE mode

700   CALL PROGRAMMING                         !Use modified Screen #1.
      GO TO 150                                !Try it out.

      END                                      !(Not reachable -  user powers computer off.)
```

```
PROGRAM SECTIONS

    Name                                    Bytes   Attributes

  0 $CODE                                     181   PIC CON REL LCL   SHR   EXE    RD NOWRT LONG
  2 $LOCAL                                     24   PIC CON REL LCL NOSHR NOEXE    RD   WRT LONG
  3 MIDI_IN                                     5   PIC OVR REL GBL   SHR NOEXE    RD   WRT LONG
  4 MIDI_OUT                                    4   PIC OVR REL GBL   SHR NOEXE    RD   WRT LONG
  5 SETUPS                                   4032   PIC OVR REL GBL   SHR NOEXE    RD   WRT LONG
  6 ACTIVE_SETUP                              226   PIC OVR REL GBL   SHR NOEXE    RD   WRT LONG
  7 PARAM                                      17   PIC OVR REL GBL   SHR NOEXE    RD   WRT LONG
  8 PERFORM                                   174   PIC OVR REL GBL   SHR NOEXE    RD   WRT LONG
  9 CURSOR                                      4   PIC OVR REL GBL   SHR NOEXE    RD   WRT LONG

    Total Space Allocated                    4667

ENTRY POINTS

    Address    Type  Name

  0-00000000         C2P4

VARIABLES

    Address    Type  Name                                  Address    Type  Name

  6-000000CE   I*2   ACTIVE_SETUP_NUMBER                 8-00000076   I*2   CLOSEST_FRET
  6-000000CC   I*2   DOWN_STRUM_RATE                     8-00000090   R*4   ELAPSED_REAL_TIME
  6-000000A0   I*2   FRET_EMULATOR                       2-00000000   I*4   ICON
  2-00000004   I*4   IMODE                                   **       I*4   J
  8-00000072   R*4   LEVER_DEPRESSION_FACTOR             7-00000010   L*1   MIDI_CHNL16_CTRL_CHANGE
  3-00000001   L*1   MIDI_CONTROLLER_NUMBER              3-00000004   L*1   MIDI_KEY_STATUS
  3-00000002   L*1   MIDI_LEVER_POSITION                 3-00000003   L*1   MIDI_NECK_POSITION
  4-00000000   I*4   MIDI_OUT                            3-00000000   L*1   MIDI_STATUS_BYTE
  7-0000000C   R*4   NECK_FRET_FACTOR                    7-00000000   I*4   NUM_FRETS
  7-00000004   I*4   NUM_KEYS                            7-00000008   I*4   NUM_SETUPS
  8-0000006E   R*4   OFF_TUNE                            8-00000094   CHAR  REAL_CHORD
  8-0000008C   R*4   REAL_FRET                           6-000000D0   CHAR  SETUP_NAME
  6-00000086   I*2   UP_STRUM_RATE

ARRAYS

    Address    Type  Name                              Bytes  Dimensions

  8-00000078   I*2   ACTUAL_PITCH                         20  (10)
  6-00000000   I*2   BASIC_PITCH                          20  (10)
  5-00000000   I*2   BASIC_PITCHS                        360  (10, 18)
  8-0000000A   I*2   CURRENT_LEVER_EFFECT                100  (10, 5)
  5-00000E58   I*2   DOWN_STRUM_RATES                     36  (18)
  6-000000B8   I*2   DOWN_STRUM_SEQUENCE                  20  (10)
  5-00000CF0   I*2   DOWN_STRUM_SEQUENCES                360  (10, 18)
  5-00000B40   I*2   FRET_EMULATORS                       36  (18)
  8-00000000   L*1   KEYS_ON                              10  (10)
  8-0000009A   R*4   LEVER_POSITIONS                      20  (5)
```

```
6-00000014  I*2  LEVER_SETUP               100  (10, 5)
5-00000168  I*2  LEVER_SETUPS             1800  (10, 5, 18)
6-0000008C  I*2  MIDI_PGM_NUMBER            20  (10)
5-000009D8  I*2  MIDI_PGM_NUMBERS          360  (10, 18)
6-00000078  I*2  MIDI_XMIT_CHNL             20  (10)
5-00000870  I*2  MIDI_XMIT_CHNLS           360  (10, 18)
9-00000000  I*2  POSITION                    4  (2)
5-00000E7C  CHAR SETUP_NAMES               324  (18)
5-00000CCC  I*2  UP_STRUM_RATES             36  (18)
6-000000A2  I*2  UP_STRUM_SEQUENCE          20  (10)
5-00000B64  I*2  UP_STRUM_SEQUENCES        360  (10, 18)
```

LABELS

| Address | Label | Address | Label | Address | Label | Address | Label | Address | Label | Address | Label |
|---|---|---|---|---|---|---|---|---|---|---|---|
| ** | 10 | 0-0000004C | 50 | 0-00000044 | 100 | 0-000000AC | 150 | 0-00000066 | 200 | 0-00000070 | 300 |
| 0-0000007C | 400 | 0-000000B8 | 500 | 0-00000094 | 600 | 0-000000A5 | 700 | | | | |

FUNCTIONS AND SUBROUTINES REFERENCED

| Type | Name | Type | Name | Type | Name | Type | Name | Type | Name | Type | Name |
|---|---|---|---|---|---|---|---|---|---|---|---|
| | ARCHIVE | | COPY | | GET_ICON | | MODE | | PERFORM | | POWER_UP |
| | PROGRAMMING | | SELECT_SETUP | | TRANSPOSE | | UPDATE_C2P2 | | | | |

```
      SUBROUTINE POWER_UP

      LOGICAL FOUND, END_FLAG_FOUND

      INCLUDE 'XCOM.FOR/NOLIST'

C ---------------------------------------------------------------------------

      CALL CLEAR_SCREEN                        !Clear monitor.

      OPEN (UNIT=1,FILE='MIDI_IN:',STATUS='UNKNOWN')  !Attach MIDI_IN port to logical unit # 1.

      OPEN (UNIT=2,FILE='MIDI_OUT:',STATUS='UNKNOWN') !Attach MIDI_OUT port to logical unit # 2.

      OPEN (UNIT=5,FILE='TT:',STATUS='UNKNOWN')       !Attach computer keyboard to logical unit # 5.

C ---------------------------------------------------------------------------
C initialize variables:

      FRET_EMULATOR = 0                        !off
      SETUP_NAME = '                           !blanks

      DO 10 J = 1 , NUM_KEYS                   !Zero-out SETUP variables.

      MIDI_XMIT_CHNL(J) = 0
      MIDI_PGM_NUMBER(J) = 0
      UP_STRUM_SEQUENCE(J) = 0
      DOWN_STRUM_SEQUENCE(J) = 0
      BASIC_PITCH(J) = 0

      DO 10 N = 1 , NUM_SETUPS

      MIDI_XMIT_CHNLS(J,N) = 0
      MIDI_PGM_NUMBERS(J,N) = 0
      UP_STRUM_SEQUENCES(J,N) = 0
      DOWN_STRUM_SEQUENCES(J,N) = 0
10    BASIC_PITCHS(J,N) = 0

      DO 20 N = 1 , NUM_SETUPS

      SETUP_NAMES(N) = '
      FRET_EMULATORS(N) = 0
      UP_STRUM_RATES(N) = 0
20    DOWN_STRUM_RATES(N) = 0

      DO 30 J = 1 , NUM_KEYS
      DO 30 N = 1 , 5

      LEVER_SETUP(J,N) = 0
      CURRENT_LEVER_EFFECT(J,N) = 0

      DO 30 L = 1 , NUM_SETUPS
30    LEVER_SETUPS(J,N,L) = 0

C ---------------------------------------------------------------------------
C check for a closed loop MIDI setup (as per Figure 6):
```

```
        CALL MATE (FOUND)                 !Send MIDI control signals out of
                                          !MIDI_OUT port to the C2P2, telling the
                                          !C2P2 to send its identification.
                                          !Then read ID from MIDI_IN port.
                                          !If proper ID is received, set FOUND = .true.
        IF (FOUND) GO TO 50

        TYPE 40
40      FORMAT(/' C2P2 controller not found.',/,
     &          ' Check connections and make sure',/,
     &          ' equipment is powered up.')
        STOP

50      CALL MEM_PROTECT_OFF              !Send MIDI control signals out of the
                                          !MIDI_OUT port to the C2P2, instructing the
                                          !C2P2 to turn its memory protect
                                          !software switch off.

        CALL BULK_LOAD (END_FLAG_FOUND)   !Send MIDI control signals out of the
                                          !MIDI_OUT port to the C2P2, instructing it
                                          !to transmit all of its SETUPS to this program.
                                          !Then read bulk data from MIDI_IN port into the
                                          !individual variables of COMMON area /SETUPS/.
                                          !Keep reading until MIDI system exclusive END FLAG
                                          !is found.  If it's found, set END_FLAG_FOUND = .true.
        IF (END_FLAG_FOUND) GO TO 70

        TYPE 60
60      FORMAT(/' Error loading bulk data from C2P2!',/,
     &          ' Check equipment.')
        STOP

70      RETURN                            !Labeled common area /SETUPS/ is now sucessfully
        END                               !loaded.
```

PROGRAM SECTIONS

| Name | Bytes | Attributes | | | | | | | | |
|---|---|---|---|---|---|---|---|---|---|---|
| 0 $CODE | 613 | PIC | CON | REL | LCL | SHR | EXE | RD | NOWRT | LONG |
| 1 $PDATA | 194 | PIC | CON | REL | LCL | SHR | NOEXE | RD | NOWRT | LONG |
| 2 $LOCAL | 120 | PIC | CON | REL | LCL | NOSHR | NOEXE | RD | WRT | LONG |
| 3 MIDI_IN | 5 | PIC | OVR | REL | GBL | SHR | NOEXE | RD | WRT | LONG |
| 4 MIDI_OUT | 4 | PIC | OVR | REL | GBL | SHR | NOEXE | RD | WRT | LONG |
| 5 SETUPS | 4032 | PIC | OVR | REL | GBL | SHR | NOEXE | RD | WRT | LONG |
| 6 ACTIVE_SETUP | 226 | PIC | OVR | REL | GBL | SHR | NOEXE | RD | WRT | LONG |
| 7 PARAM | 17 | PIC | OVR | REL | GBL | SHR | NOEXE | RD | WRT | LONG |
| 8 PERFORM | 174 | PIC | OVR | REL | GBL | SHR | NOEXE | RD | WRT | LONG |
| 9 CURSOR | 4 | PIC | OVR | REL | GBL | SHR | NOEXE | RD | WRT | LONG |
| Total Space Allocated | 5389 | | | | | | | | | |

ENTRY POINTS

| Address | Type | Name |
|---|---|---|
| 0-00000000 | | POWER_UP |

VARIABLES

| Address | Type | Name |
|---|---|---|
| 6-000000CE | I*2 | ACTIVE_SETUP_NUMBER |
| 6-000000CC | I*2 | DOWN_STRUM_RATE |
| 2-00000004 | L*4 | END_FLAG_FOUND |
| 6-000000A0 | I*2 | FRET_EMULATOR |
| ** | I*4 | L |
| 7-00000010 | L*1 | MIDI_CHNL16_CTRL_CHANGE |
| 3-00000004 | L*1 | MIDI_KEY_STATUS |
| 3-00000003 | L*1 | MIDI_NECK_POSITION |
| 3-00000000 | L*1 | MIDI_STATUS_BYTE |
| 7-0000000C | R*4 | NECK_FRET_FACTOR |
| 7-00000004 | I*4 | NUM_KEYS |
| 8-0000006E | R*4 | OFF_TUNE |
| 8-0000008C | R*4 | REAL_FRET |
| 6-000000B6 | I*2 | UP_STRUM_RATE |

| Address | Type | Name |
|---|---|---|
| 8-00000076 | I*2 | CLOSEST_FRET |
| 8-00000090 | R*4 | ELAPSED_REAL_TIME |
| 2-00000000 | L*4 | FOUND |
| ** | I*4 | J |
| 8-00000072 | R*4 | LEVER_DEPRESSION_FACTOR |
| 3-00000001 | L*1 | MIDI_CONTROLLER_NUMBER |
| 3-00000002 | L*1 | MIDI_LEVER_POSITION |
| 4-00000000 | I*4 | MIDI_OUT |
| ** | I*4 | N |
| 7-00000000 | I*4 | NUM_FRETS |
| 7-00000008 | I*4 | NUM_SETUPS |
| 8-00000094 | CHAR | REAL_CHORD |
| 6-000000D0 | CHAR | SETUP_NAME |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-000000BB | I*2 | DOWN_STRUM_SEQUENCE | 20 | (10) |
| 5-00000CF0 | I*2 | DOWN_STRUM_SEQUENCES | 360 | (10, 18) |
| 5-00000B40 | I*2 | FRET_EMULATORS | 36 | (18) |

```
8-00000000  L*1   KEYS_ON                     10  (10)
8-0000009A  R*4   LEVER_POSITIONS             20  (5)
6-00000014  I*2   LEVER_SETUP                100  (10, 5)
5-0000016B  I*2   LEVER_SETUPS              1800  (10, 5, 18)
6-0000008C  I*2   MIDI_PGM_NUMBER             20  (10)
5-000009D8  I*2   MIDI_PGM_NUMBERS           360  (10, 18)
6-00000078  I*2   MIDI_XMIT_CHNL              20  (10)
5-00000B70  I*2   MIDI_XMIT_CHNLS            360  (10, 18)
9-00000000  I*2   POSITION                     4  (2)
5-00000E7C  CHAR  SETUP_NAMES                324  (18)
5-00000CCC  I*2   UP_STRUM_RATES              36  (18)
6-000000A2  I*2   UP_STRUM_SEQUENCE           20  (10)
5-00000B64  I*2   UP_STRUM_SEQUENCES         360  (10, 18)

LABELS

   Address    Label      Address    Label      Address    Label      Address    Label      Address    Label      Address    Label

     **        10          **        20          **        30      1-00000017  40'     0-00000230  50      1-00000075  60'
 0-00000264    70

FUNCTIONS AND SUBROUTINES REFERENCED

  Type  Name                      Type  Name                      Type  Name

        BULK_LOAD                       CLEAR_SCREEN                    FOR$OPEN
        MATE                            MEM_PROTECT_OFF
```

```
      SUBROUTINE SELECT_SETUP

      LOGICAL FOUND_ICON, IN_BOX

      INCLUDE 'XCOM.FOR/NOLIST'

C  ---------------------------------------------------------------------------

      CALL CLEAR_SCREEN                      !Clear monitor.

      CALL DISPLAY_SCREEN_2                  !Display Screen 2 as shown in Figure 8,
                                             !and fill in the SETUP NUMBERS and SETUP_NAMES
                                             !contained in labeled common /SETUP/

10    CALL CHECK_CURSOR (FOUND_ICON)         !Subroutine to compare current cursor position to
                                             !see if it is in any one of the six ICON areas.
                                             !If it is, then set FOUND_ICON = .TRUE.

      IF (FOUND_ICON) RETURN

20    CALL CHECK_SETUP_BOX ( IN_BOX )        !Subroutine to compare current cursor position to
                                             !see if it is in the "SELECT ACTIVE SETUP" BOX
                                             !indicated in Figure 8.
                                             !If it is, set IN_BOX = .TRUE.
      IF (.NOT. IN_BOX) GO TO 10

      CALL GET_NUMERIC ( ISEL )              !Generalized interactive subroutine which allows the
                                             !user to select a numeric value by using MOUSE buttons
                                             !or DATA INCREMENT/DECREMENT keys while displaying
                                             !increasing or decreasing numeric values at the current
                                             !posiotion.
                                             !When the user hits a terminator (either "carriage return",
                                             !"enter", "select", or another MOUSE button, the current
                                             !integer value displayed on the screen is returned to the
                                             !calling program.

      IF (ISEL .GE. 1 .AND. ISEL .LE. NUMBER_OF_SETUPS) GO TO 30

      GO TO 20                               !User entered invalid SETUP NUMBER.

30    ACTIVE_SETUP_NUMBER = ISEL             !Move into labeled common /ACTIVE_SETUP/.

      DO 40 K = 1 , NUM_KEYS                 !Copy selected SETUP to ACTIVE_SETUP.

      BASIC_PITCH(K) = BASIC_PITCHS(K,ISEL)
      UP_STRUM_SEQUENCE(K) = UP_STRUM_SEQUENCES(K,ISEL)
      DOWN_STRUM_SEQUENCE(K) = DOWN_STRUM_SEQUENCES(K,ISEL)
      MIDI_XMIT_CHNL(K) = MIDI_XMIT_CHNLS(K,ISEL)
      MIDI_PGM_NUMBER(K) = MIDI_PGM_NUMBERS(K,ISEL)

      DO 40 L = 1 , 5

40    LEVER_SETUP(K,L) = LEVER_SETUPS(K,L,ISEL)

      SETUP_NAME = SETUP_NAMES(ISEL)
      FRET_EMULATOR = FRET_EMULATORS(ISEL)
      UP_STRUM_RATE = UP_STRUM_RATES(ISEL)
```

```
            DOWN_STRUM_RATE = DOWN_STRUM_RATES(ISEL)

            RETURN
            END


PROGRAM SECTIONS

    Name                                    Bytes   Attributes

  0 $CODE                                     420   PIC CON REL LCL   SHR   EXE   RD NOWRT LONG
  2 $LOCAL                                     36   PIC CON REL LCL NOSHR NOEXE   RD   WRT LONG
  3 MIDI_IN                                     5   PIC OVR REL GBL   SHR NOEXE   RD   WRT LONG
  4 MIDI_OUT                                    4   PIC OVR REL GBL   SHR NOEXE   RD   WRT LONG
  5 SETUPS                                   4032   PIC OVR REL GBL   SHR NOEXE   RD   WRT LONG
  6 ACTIVE_SETUP                              226   PIC OVR REL GBL   SHR NOEXE   RD   WRT LONG
  7 PARAM                                      17   PIC OVR REL GBL   SHR NOEXE   RD   WRT LONG
  8 PERFORM                                   174   PIC OVR REL GBL   SHR NOEXE   RD   WRT LONG
  9 CURSOR                                      4   PIC OVR REL GBL   SHR NOEXE   RD   WRT LONG

    Total Space Allocated                    4918

ENTRY POINTS

    Address   Type  Name

  0-00000000        SELECT_SETUP

VARIABLES

    Address   Type  Name                                Address   Type  Name

  6-000000CE  I*2   ACTIVE_SETUP_NUMBER               8-00000076  I*2   CLOSEST_FRET
  6-000000CC  I*2   DOWN_STRUM_RATE                   8-00000090  R*4   ELAPSED_REAL_TIME
  2-00000000  L*4   FOUND_ICON                        6-000000A0  I*2   FRET_EMULATOR
  2-00000004  L*4   IN_BOX                            2-00000008  I*4   ISEL
      **      I*4   K                                     **      I*4   L
  8-00000072  R*4   LEVER_DEPRESSION_FACTOR           7-00000010  L*1   MIDI_CHNL16_CTRL_CHANGE
  3-00000001  L*1   MIDI_CONTROLLER_NUMBER            3-00000004  L*1   MIDI_KEY_STATUS
  3-00000002  L*1   MIDI_LEVER_POSITION               3-00000003  L*1   MIDI_NECK_POSITION
  4-00000000  I*4   MIDI_OUT                          3-00000000  L*1   MIDI_STATUS_BYTE
  7-0000000C  R*4   NECK_FRET_FACTOR                  7-00000000  I*4   NUM_FRETS
  7-00000004  I*4   NUM_KEYS                          7-00000008  I*4   NUM_SETUPS
  8-0000006E  R*4   OFF_TUNE                          8-00000094  CHAR  REAL_CHORD
  8-000000BC  R*4   REAL_FRET                         6-000000D0  CHAR  SETUP_NAME
  6-00000086  I*2   UP_STRUM_RATE
```

```
ARRAYS

    Address   Type  Name                                       Bytes  Dimensions

  8-00000078  I*2  ACTUAL_PITCH                                  20   (10)
  6-00000000  I*2  BASIC_PITCH                                   20   (10)
  5-00000000  I*2  BASIC_PITCHS                                 360   (10, 18)
  8-0000000A  I*2  CURRENT_LEVER_EFFECT                         100   (10, 5)
  5-00000E58  I*2  DOWN_STRUM_RATES                              36   (18)
  6-000000B8  I*2  DOWN_STRUM_SEQUENCE                           20   (10)
  5-00000CF0  I*2  DOWN_STRUM_SEQUENCES                         360   (10, 18)
  5-00000B40  I*2  FRET_EMULATORS                                36   (18)
  8-00000000  L*1  KEYS_ON                                       10   (10)
  8-0000009A  R*4  LEVER_POSITIONS                               20   (5)
  6-00000014  I*2  LEVER_SETUP                                  100   (10, 5)
  5-00000168  I*2  LEVER_SETUPS                                1800   (10, 5, 18)
  6-0000008C  I*2  MIDI_PGM_NUMBER                               20   (10)
  5-000009D8  I*2  MIDI_PGM_NUMBERS                             360   (10, 18)
  6-00000078  I*2  MIDI_XMIT_CHNL                                20   (10)
  5-00000870  I*2  MIDI_XMIT_CHNLS                              360   (10, 18)
  9-00000000  I*2  POSITION                                       4   (2)
  5-00000E7C  CHAR SETUP_NAMES                                  324   (18)
  5-00000CCC  I*2  UP_STRUM_RATES                                36   (18)
  6-000000A2  I*2  UP_STRUM_SEQUENCE                             20   (10)
  5-00000B64  I*2  UP_STRUM_SEQUENCES                           360   (10, 18)

LABELS

    Address   Label      Address   Label      Address   Label      Address   Label

  0-00000018  10       0-00000024  20       0-00000048  30           **      40

FUNCTIONS AND SUBROUTINES REFERENCED

  Type  Name                               Type  Name                        Type  Name

        CHECK_CURSOR                             CHECK_SETUP_BOX                   CLEAR_SCREEN
        DISPLAY_SCREEN_2                         GET_NUMERIC
```

```
      SUBROUTINE PERFORM

      LOGICAL ANY_CHARS, FOUND_ICON

      INCLUDE 'XCOM.FOR/NOLIST'

C ---------------------------------------------------------------------------

      CALL CLEAR_SCREEN                    !Clear screen.

      CALL DISPLAY_SCREEN_1                !Display Screen 1 as shown in Figure 7,
                                           !and fill in all of the data fields from labeled
                                           !common /ACTIVE_SETUP/.

C ---------------------------------------------------------------------------
C Does user want to exit performance mode?

10    CALL TYPE_AHEAD (ANY_CHRS)           !Subroutine to check a 'type-ahead' buffer to see if
                                           !the user has hit any keys on the keyboard since the
                                           !last time we called this routine.
                                           !If he did, set ANY_CHRS = .TRUE.

      IF (.NOT. ANY_CHARS) GO TO 20

      CALL CHECK_CURSOR (FOUND_ICON)       !Subroutine described earlier.

      IF (FOUND_ICON) RETURN

      GO TO 10                             !Try again.

20    ELAPSED_REAL_TIME = 0.0              !Reset to zero.

C ---------------------------------------------------------------------------
C beginning of real-time display, main logic:

30    READ (1,END=600,ERR=500) MIDI_STATUS_BYTE      !Read from MIDI_IN port as binary data

      IF (MIDI_STATUS_BYTE .EQ. MIDI_CHNL16_CTRL_CHANGE) GO TO 50     !Is it a control change code?

      GO TO 30                             !No, it's not a control change code.

C ---------------------------------------------------------------------------
C Which C2P2 controller is activated?

50    READ (1,END=600,ERR=500) MIDI_CONTROLLER_NUMBER

      ICTRL = MIDI_CONTROLLER_NUMBER       !Move to a full integer word.

      IF (ICTRL .EQ. 8) GO TO 100          !Is it the neck position?

      IF (ICTRL .GE. 9 .AND. ICTRL .LE. 13) GO TO 200        !Is it a finger lever?

      IF (ICTRL .GE. 68 .AND. ICTRL .LE. 77) GO TO 300       !Is it a key controller?

      GO TO 30                             !Ignore it.  Look for next MIDI_STATUS_BYTE.

C ---------------------------------------------------------------------------
```

```
C  neck position:

100     READ (1,END=600,ERR=500) MIDI_NECK_POSITION

        REAL_FRET = MIDI_NECK_POSITION * NECK_FRET_FACTOR
        CLOSEST_FRET = INT (REAL_FRET + 0.5)
        OFF_TUNE = REAL_FRET - CLOSEST_FRET

C  ---------------------------------------------------------------------------
C  update real-time display:

150     CALL UPDATE_ACTUAL_PITCH                    !Update ACTUAL_PITCH.

        CALL CHORD                                  !Subroutine which scans array KEYS_ON and extracts the
                                                    !pitch values from array ACTUAL_PITCH.  If three or more
                                                    !keys are on, and if the notes are not excessively inharmonious,
                                                    !then calculate a musical chord and convert it to musical
                                                    !notation and place ASCII text in character string REAL_CHORD.

        CALL REAL_TIME_DISPLAY                      !Subroutine which updates Screen Display # 1 with the real-time
                                                    !data contained in labeled common area /PERFORM/ as follows:
                                                    ! 1)  Display variable CLOSEST_FRET in the "FRET BOX" (see figure 7),
                                                    !     and generate a horizontal bar graph based on the value of
                                                    !     OFF_TUNE in the bar graph area of the display.
                                                    ! 2)  Convert the contents of array ACTUAL_PITCH from MIDI numbers
                                                    !     to musical notes and display their values in the screen's
                                                    !     "ACTUAL PITCH" column.  Keys which are off are blanked-out
                                                    !     with the column's background color.
                                                    ! 3)  Display the contents of array LEVER_POSITIONS as five
                                                    !     vertical bar graphs representing each of the FDSHC lever's
                                                    !     amount of depression (from 0.0 = open to 1.0 = fully depressed).
                                                    !     The five vertical bar graphs are indicated in Figure 7.
                                                    ! 4)  Display the character string REAL_CHORD in the "CHORD BOX"
                                                    !     indicated in Figure 7.

        CALL SYSTEM_CLOCK (ELAPSED_REAL_TIME).      !Derive elapsed time, in seconds, since we zeroed-out this field,
                                                    !from the target computer's hardware.

        IF (ELAPSED_REAL_TIME .GT. 2.0) GO TO 10!If more than 2 seconds have gone by, check to see if the user
                                                    !wants to exit performance mode by checking the type-ahead buffer.

        GO TO 30                                    !Continue doing a real-time display.

C  ---------------------------------------------------------------------------
C  FDSHC lever position:

200     READ (1,END=600,ERR=500) MIDI_LEVER_POSITION

        L = MIDI_CONTROLLER_NUMBER - 8              !Calculate lever subscript, L, as:
                                                    ! L = 1 = index finger lever
                                                    ! L = 2 = middle finger lever
                                                    ! L = 3 = ring finger lever
                                                    ! L = 4 = little finger lever
                                                    ! l = 5 = thumb lever

        LEVER_DEPRESSION_FACTOR = MIDI_LEVER_POSITION / 127.0   !Convert value to range between 0.0 and 1.0
```

```
        LEVER_POSITIONS(L) = LEVER_DEPRESSION_FACTOR     !Move value to appropriate array location.

        GO TO 150                                  !Update real-time display.

C  ------------------------------------------------------------------------------
C  key controller on or off:

300     READ (1,END=600,ERR=500) MIDI_KEY_STATUS

        K = MIDI_CONTROLLER_NUMBER - 67            !Calculate key controller subscript, K.

        KEYS_ON(K) = .FALSE.                       !Set off, default.

        IF (MIDI_KEY_STATUS .EQ. 127) KEYS_ON(K) = .TRUE.       !Set on, if high value.

        GO TO 150                                  !Update real_time display.
C  ------------------------------------------------------------------------------
C  MIDI read errors:

500     MIDI_ERROR = MIDI_ERROR + 1                        !MIDI_IN READ ERROR!

        IF (MIDI_ERROR .LE. 500) GO TO 30                  !Allow 500 errors.

        TYPE 510
510     FORMAT(/' Device error on MIDI IN port!')

        STOP                                               !Go no further.

C  ------------------------------------------------------------------------------
C  end of file condition on MIDI read:

600     RETURN
        END
```

```
PROGRAM SECTIONS

    Name                                 Bytes   Attributes

  0 $CODE                                  500   PIC CON REL LCL   SHR   EXE    RD NOWRT LONG
  1 $PDATA                                  34   PIC CON REL LCL   SHR NOEXE    RD NOWRT LONG
  2 $LOCAL                                  40   PIC CON REL LCL NOSHR NOEXE    RD   WRT LONG
  3 MIDI_IN                                  5   PIC OVR REL GBL   SHR NOEXE    RD   WRT LONG
  4 MIDI_OUT                                 4   PIC OVR REL GBL   SHR NOEXE    RD   WRT LONG
  5 SETUPS                                4032   PIC OVR REL GBL   SHR NOEXE    RD   WRT LONG
  6 ACTIVE_SETUP                           226   PIC OVR REL GBL   SHR NOEXE    RD   WRT LONG
  7 PARAM                                   17   PIC OVR REL GBL   SHR NOEXE    RD   WRT LONG
  8 PERFORM                                174   PIC OVR REL GBL   SHR NOEXE    RD   WRT LONG
  9 CURSOR                                   4   PIC OVR REL GBL   SHR NOEXE    RD   WRT LONG

    Total Space Allocated                 5036

ENTRY POINTS

    Address   Type  Name

  0-00000000        PERFORM

VARIABLES

    Address   Type  Name                                Address   Type  Name

  6-000000CE  I*2   ACTIVE_SETUP_NUMBER               2-00000000  L*4   ANY_CHARS
  2-00000008  R*4   ANY_CHRS                          8-00000076  I*2   CLOSEST_FRET
  6-000000CC  I*2   DOWN_STRUM_RATE                   8-00000090  R*4   ELAPSED_REAL_TIME
  2-00000004  L*4   FOUND_ICON                        6-000000A0  I*2   FRET_EMULATOR
      **      I*4   ICTRL                                 **      I*4   K
      **      I*4   L                                 8-00000072  R*4   LEVER_DEPRESSION_FACTOR
  7-00000010  L*1   MIDI_CHNL16_CTRL_CHANGE           3-00000001  L*1   MIDI_CONTROLLER_NUMBER
  2-0000000C  I*4   MIDI_ERROR                        3-00000004  L*1   MIDI_KEY_STATUS
  3-00000002  L*1   MIDI_LEVER_POSITION               3-00000003  L*1   MIDI_NECK_POSITION
  4-00000000  I*4   MIDI_OUT                          3-00000000  L*1   MIDI_STATUS_BYTE
  7-0000000C  R*4   NECK_FRET_FACTOR                  7-00000000  I*4   NUM_FRETS
  7-00000004  I*4   NUM_KEYS                          7-00000008  I*4   NUM_SETUPS
  8-0000006E  R*4   OFF_TUNE                          8-00000094  CHAR  REAL_CHORD
  8-0000008C  R*4   REAL_FRET                         6-000000D0  CHAR  SETUP_NAME
  6-000000B6  I*2   UP_STRUM_RATE

ARRAYS

    Address   Type  Name                               Bytes  Dimensions

  8-00000078  I*2   ACTUAL_PITCH                          20  (10)
  6-00000000  I*2   BASIC_PITCH                           20  (10)
  5-00000000  I*2   BASIC_PITCHS                         360  (10, 18)
  8-0000000A  I*2   CURRENT_LEVER_EFFECT                 100  (10, 5)
  5-00000E58  I*2   DOWN_STRUM_RATES                      36  (18)
  6-000000B8  I*2   DOWN_STRUM_SEQUENCE                   20  (10)
  5-00000CF0  I*2   DOWN_STRUM_SEQUENCES                 360  (10, 18)
```

```
5-00000840   I*2   FRET_EMULATORS            36   (18)
8-00000000   L*1   KEYS_ON                   10   (10)
8-0000009A   R*4   LEVER_POSITIONS           20   (5)
6-00000014   I*2   LEVER_SETUP              100   (10, 5)
5-00000168   I*2   LEVER_SETUPS            1800   (10, 5, 18)
6-0000008C   I*2   MIDI_PGM_NUMBER           20   (10)
5-000009D8   I*2   MIDI_PGM_NUMBERS         360   (10, 18)
6-00000078   I*2   MIDI_XMIT_CHNL            20   (10)
5-00000870   I*2   MIDI_XMIT_CHNLS          360   (10, 18)
9-00000000   I*2   POSITION                   4   (2)
5-00000E7C   CHAR  SETUP_NAMES              324   (18)
5-00000CCC   I*2   UP_STRUM_RATES            36   (18)
6-000000A2   I*2   UP_STRUM_SEQUENCE         20   (10)
5-00000864   I*2   UP_STRUM_SEQUENCES       360   (10, 18)

ABELS

  Address      Label     Address      Label     Address      Label     Address      Label     Address      Label     Address      Label

0-0000002C    10       0-00000050    20       0-00000054    30       0-00000080    50       0-0000014C    100      0-00000193    150
0-0000010C    200      0-000000CC    300      0-000001C0    500      1-00000000    510'     0-000001EC    600

JNCTIONS AND SUBROUTINES REFERENCED

Type  Name                       Type  Name                      Type  Name

      CHECK_CURSOR                     CHORD                           CLEAR_SCREEN
      DISPLAY_SCREEN_1                 REAL_TIME_DISPLAY               SYSTEM_CLOCK
      TYPE_AHEAD                       UPDATE_ACTUAL_PITCH
```

```
      SUBROUTINE UPDATE_ACTUAL_PITCH

C-----------------------------------------------------------------------------!
C NOTE:  This is a basic version of C2P2/C2P4 firmware which allows the finger  !
C        levers to add or subtract frets cummulatively.  A more advanced       !
C        version would allow combinations of finger levers to effect actual    !
C        pitch using boolean functions.                                        !
C-----------------------------------------------------------------------------!

      INCLUDE 'XCOM.FOR/NOLIST'

      DO 10 J = 1 , NUMBER_OF_KEYS                               !Scan all key controllers.

      IF (.NOT. KEYS_ON(J)) GO TO 10                             !Skip, if off.

      ACTUAL_PITCH(J) = BASIC_PITCH(J) + CLOSEST_FRET            !Add closest neck position to basic pitch.

      DO 10 L = 1 , 5                                            !Scan all FDSHC levers.

      CURRENT_LEVER_EFFECT(J,L)=INT(LEVER_SETUP(J,L)*LEVER_POSITIONS(L)+0.5)  !Update lever effects.

      ACTUAL_PITCH(J) = ACTUAL_PITCH(J) + CURRENT_LEVER_EFFECT(J,L)   !Apply lever effects.

0     CONTINUE

      RETURN
      END


ECTIONS

                         Bytes   Attributes

                           122   PIC CON REL LCL   SHR   EXE   RD NOWRT LONG
L                            4   PIC CON REL LCL NOSHR NOEXE   RD   WRT LONG
IN                           5   PIC OVR REL GBL   SHR NOEXE   RD   WRT LONG
OUT                          4   PIC OVR REL GBL   SHR NOEXE   RD   WRT LONG
S                         4032   PIC OVR REL GBL   SHR NOEXE   RD   WRT LONG
E_SETUP                    226   PIC OVR REL GBL   SHR NOEXE   RD   WRT LONG
                            17   PIC OVR REL GBL   SHR NOEXE   RD   WRT LONG
RM                         174   PIC OVR REL GBL   SHR NOEXE   RD   WRT LONG
R                            4   PIC OVR REL GBL   SHR NOEXE   RD   WRT LONG

 Space Allocated          4588

NTS

ss  Type  Name

)00       UPDATE_ACTUAL_PITCH
```

VARIABLES

| Address | Type | Name |
|---|---|---|
| 6-000000CE | I*2 | ACTIVE_SETUP_NUMBER |
| 6-000000CC | I*2 | DOWN_STRUM_RATE |
| 6-000000A0 | I*2 | FRET_EMULATOR |
| 2-00000000 | I*4 | L |
| 7-00000010 | L*1 | MIDI_CHNL16_CTRL_CHANGE |
| 3-00000004 | L*1 | MIDI_KEY_STATUS |
| 3-00000003 | L*1 | MIDI_NECK_POSITION |
| 3-00000000 | L*1 | MIDI_STATUS_BYTE |
| 7-00000000 | I*4 | NUM_FRETS |
| 7-00000008 | I*4 | NUM_SETUPS |
| 8-00000094 | CHAR | REAL_CHORD |
| 6-000000D0 | CHAR | SETUP_NAME |

| Address | Type | Name |
|---|---|---|
| 8-00000076 | I*2 | CLOSEST_FRET |
| 8-00000090 | R*4 | ELAPSED_REAL_TIME |
| ** | I*4 | J |
| 8-00000072 | R*4 | LEVER_DEPRESSION_FACTOR |
| 3-00000001 | L*1 | MIDI_CONTROLLER_NUMBER |
| 3-00000002 | L*1 | MIDI_LEVER_POSITION |
| 4-00000000 | I*4 | MIDI_OUT |
| 7-0000000C | R*4 | NECK_FRET_FACTOR |
| 7-00000004 | I*4 | NUM_KEYS |
| 8-0000006E | R*4 | OFF_TUNE |
| 8-0000008C | R*4 | REAL_FRET |
| 6-00000086 | I*2 | UP_STRUM_RATE |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-000000B8 | I*2 | DOWN_STRUM_SEQUENCE | 20 | (10) |
| 5-00000CF0 | I*2 | DOWN_STRUM_SEQUENCES | 360 | (10, 18) |
| 5-00000B40 | I*2 | FRET_EMULATORS | 36 | (18) |
| 8-00000000 | L*1 | KEYS_ON | 10 | (10) |
| 8-0000009A | R*4 | LEVER_POSITIONS | 20 | (5) |
| 6-00000014 | I*2 | LEVER_SETUP | 100 | (10, 5) |
| 5-00000168 | I*2 | LEVER_SETUPS | 1800 | (10, 5, 18) |
| 6-0000008C | I*2 | MIDI_PGM_NUMBER | 20 | (10) |
| 5-000009D8 | I*2 | MIDI_PGM_NUMBERS | 360 | (10, 18) |
| 6-00000078 | I*2 | MIDI_XMIT_CHNL | 20 | (10) |
| 5-00000870 | I*2 | MIDI_XMIT_CHNLS | 360 | (10, 18) |
| 9-00000000 | I*2 | POSITION | 4 | (2) |
| 5-00000E7C | CHAR | SETUP_NAMES | 324 | (18) |
| 5-00000CCC | I*2 | UP_STRUM_RATES | 36 | (18) |
| 6-000000A2 | I*2 | UP_STRUM_SEQUENCE | 20 | (10) |
| 5-00000B64 | I*2 | UP_STRUM_SEQUENCES | 360 | (10, 18) |

LABELS

| Address | Label |
|---|---|
| 0-00000034 | 10 |

```
        SUBROUTINE ARCHIVE

C--------------------------------------------------------------------------|
C  This subroutine reads or writes a SETUP or all SETUPS to an external device  |
C  attached to the target computer for archiving.  Anticipated devices are:    |
C       1)      Printer                                                    |
C       2)      Cassette tape                                              |
C       3)      Disk, floppy or hard                                       |
C       4)      EEPROM cartridge                                           |
C--------------------------------------------------------------------------|

        LOGICAL FOUND_ICON, ANS

        INTEGER *2 OCTAVE
        CHARACTER FILENAME * 11, FNAME * 6, NOTES(12) * 2

        INCLUDE 'XCOM.FOR/NOLIST'
        DATA NOTES /'C ','C#','D ','Eb','E ','F ','F#','G ','Ab','A ',
     &              'Bb','B '/

C  -------------------------------------------------------------------------

        CALL CLEAR_SCREEN                       !Clear screen

        CALL DISPLAY_SCREEN_2                   !Described earlier

10      CALL CHECK_CURSOR (FOUND_ICON)          !Described earlier

        IF (FOUND_ICON) RETURN

20      CALL POSITION_CURSOR ( 15 , 5 )         !Position cursor in box at bottom of
                                                !Screen 2, (Firgure 8).
        TYPE 30
30      FORMAT ('+Do you want to Load or Save (L/S)?',$)

        READ (5,40,END=10) ANS
40      FORMAT (A1)

        IF (ANS .EQ. 'L') GO TO 100             !Load from external device?
        IF (ANS .EQ. 'S') GO TO 500             !Save to external device?

        GO TO 10                                !Check for an ICON.

C  -------------------------------------------------------------------------
C  load:

100     CALL POSITION_CURSOR (15,5)

        TYPE 110
110     FORMAT ('+From 1=DSK, 2=CAS, 3=CART (1/2/3)?',$)

        READ (5,*,END=10,ERR=100) IDEVICE

        IF (IDEVICE .LE. 0 .OR. IDEVICE .GE. 4) GO TO 100       !Valid device?

        GO TO (150, 250, 350) IDEVICE
```

```
C ---------------------------------------------------------------------------
C  load from disk:

150     CALL POSITION_CURSOR (15,5)

        TYPE 160
160     FORMAT('+Enter filename:',$)

        READ (5,170,END=10) FNAME
170     FORMAT (A6)

        FILENAME = 'DISK:'                        !Pseudo-device name for target computer.
        FILENAME(6:6) = FNAME                     !Append filename to device name.

        OPEN (UNIT=6,FILE=FILENAME,STATUS='OLD',ERR=180)        !Open DISK:user's filename.

        GO TO 400                                 !To read in SETUPS.

180     CALL POSITION_CURSOR (15,5)

        TYPE 190, FNAME
190     FORMAT('+',A6,' not found!',$)

        CALL WAIT (2)                             !Wait 2 seconds.

        GO TO 150                                 !Re-enter

C ---------------------------------------------------------------------------
C  load from cassette:

250     FILENAME = 'CASS:'                        !Pseudo-device name for target computer.

        OPEN (UNIT=6,FILE=FILENAME,STATUS='UNKNOWN',ERR=260)    !Open CASS:  for reading.

        GO TO 400                                 !To read in SETUPS.

260     CALL POSITION_CURSOR (15,5)

        TYPE 270
270     FORMAT('+Cassette error!',$)

        CALL WAIT (2)                             !Wait 2 seconds.

        GO TO 10                                  !Check for ICON.

C ---------------------------------------------------------------------------
C  load from EEPROM:

350     FILENAME = 'CART:'                        !Pseudo-device name for target computer's cartridge slot.

        OPEN (UNIT=6,FILE=FILENAME,STATUS='UNKNOWN',ERR=360)    !Open CART:  for reading.

        GO TO 400                                 !To read in SETUPS.

360     CALL POSITION_CURSON (15,5)

        TYPE 370
```

```
370     FORMAT('+Cartridge error!',$)

        CALL WAIT (2)                             !Wait 2 seconds.

        GO TO 10                                  !Check for ICON.

C -------------------------------------------------------------------------
C  load up SETUPS from external device (all READs are binary):

400     DO 410 N = 1 , NUMBER_OF_SETUPS

        READ (6,END=420,ERR=900) SETUP_NAMES(N),
     &                           FRET_EMULATORS(N),
     &                           UP_STRUM_RATES(N),
     &                           DOWN_STRUM_RATES(N)

        DO 410 K = 1 , NUMBER_OF_KEYS

        READ (6,END=420,ERR=900) MIDI_XMIT_CHNLS(K,N),
     &                           MIDI_PGM_NUMBERS(K,N),
     &                           UP_STRUM_SEQUENCES(K,N),
     &                           DOWN_STRUM_SEQUENCES(K,N),
     &                           BASIC_PITCHS(K,N)

        DO 410 L = 1 ,5          !(5 levers)

        READ (6,END=420,ERR=900) LEVER_SETUPS(K,L,N)

410     CONTINUE

420     GO TO 1000                        !Return to Main Program.

C -------------------------------------------------------------------------
C  save:

500     CALL POSITION_CURSOR (15,5)

        TYPE 510
510     FORMAT('+To 1=DSK, 2=CAS, 3=CART, 4=PTR (1/2/3/4)?',$)

        READ (5,*,END=10,ERR=500) IDEVICE

        IF (IDEVICE .LE. 0 .OR. IDEVICE .GE. 5) GO TO 500       !Valid Device?

        GO TO (550,650,750,850) IDEVICE

C -------------------------------------------------------------------------
C  save to disk:

550     CALL POSITION_CURSOR (15,5)

        TYPE 160                                 !'Enter filename?'

        READ (5,170,END=10) FNAME

        FILENAME = 'DISK:'
        FILENAME(6:6) = FNAME
```

```
      OPEN (UNIT=6,FILE=FILENAME,STATUS='UNKNOWN',ERR=560)    !Open DISK:user's filename as
                                                              !either an OLD or NEW file.
      GO TO 800                              !To write out SETUPS.

560   CALL POSITION_CURSOR (15,5)

      TYPE 190, FNAME                        !File not found!

      CALL WAIT (2)

      GO TO 550                              !To Re-enter filename.

C  ------------------------------------------------------------------------
C  save to cassette:

650   FILENAME = 'CASS:'                     !Pseudo-device name for target computer.

      OPEN (UNIT=6,FILE=FILENAME,STATUS='UNKNOWN',ERR=660)    !Open CASS: for writing.

      GO TO 800                              !To write out SETUPS.

660   TYPE 270                               !'Cassette error!'

      CALL WAIT (2)

      GO TO 10                               !Check for an ICON.

C  ------------------------------------------------------------------------
C  save to cartridge:

750   FILENAME = 'CART:'                     !Pseudo-device name for target computer's cartridge slot.

      OPEN (UNIT=6,FILE=FILENAME,STATUS='UNKNOWN',ERR=760)    !Open CART: for writing.

      GO TO 800                              !To write out SETUPS.

760   TYPE 370                               !'Cartridge error!'

      CALL WAIT (2)                          !Wait 2 seconds.

      GO TO 10                               !Check for an ICON.

C  ------------------------------------------------------------------------
C  write SETUPS to an external device in binary:

800   DO 810 N = 1 , NUMBER_OF_SETUPS

      WRITE(6,ERR=950) SETUP_NAMES(N),
   &                   FRET_EMULATORS(N),
   &                   UP_STRUM_RATES(N),
   &                   DOWN_STRUM_RATES(N)

      DO 810 K = 1 , NUMBER_OF_KEYS

      WRITE(6,ERR=950) MIDI_XMIT_CHNLS(K,N),
   &                   MIDI_PGM_NUMBERS(K,N),
```

```
     &                       UP_STRUM_SEQUENCES(K,N),
     &                       DOWN_STRUM_SEQUENCES(K,N),
     &                       BASIC_PITCHS(K,N)

        DO 810 L = 1 ,5            !(5 levers)

        WRITE(6,ERR=950) LEVER_SETUPS(K,L,N)

810     CONTINUE

        GO TO 1000                        !Return to Main Program.

C  -----------------------------------------------------------------------------
C  write SETUPS formatted in ASCII to attached printer:

850     OPEN (UNIT=6,FILE='PTR:',STATUS='UNKNOWN')      !Use 'PTR' as pseudo-device for target computer's printer.

        DO 890 N = 1 , NUMBER_OF_SETUPS

        WRITE (6,860) N, SETUP_NAMES(N)
860     FORMAT ('1',T10,'SETUP NUMBER ',I2, '  SETUP NAME:  ',A18,//,
     &          ' KEY BASIC                            MIDI MIDI',/,
     &          '  #  PITCH  I    M    R    L    T  CHAN  PGM',/,
     &          ' --- ----- ---  ---  ---  ---  --- ---- ----',/)

        DO 880 K = NUMBER_OF_KEYS , 1 , -1              !Print arrays in reverse order.

        OCTAVE = -2 + BASIC_PITCHS(K,N) / 12            !Convert from MIDI # to musical octave number.
        KSUB = MOD (BASIC_PITCHS(K,N),12) + 1           !Calculate subscript for musical notation.

        WRITE (6,870) K, NOTES(KSUB), OCTAVE,
     &                (LEVER_SETUPS(K,L,N),L=1,5),
     &                MIDI_XMIT_CHNLS(K,N),
     &                MIDI_PGM_NUMBERS(K,N)

870     FORMAT (1X,I2,3X,A2,I2,5(I4,1X),I3,I6)

880     CONTINUE

        IF (FRET_EMULATORS(N) .EQ. 1) GO TO 882

        WRITE (6,881)
881     FORMAT (/,' Fret Emulator OFF.')

        GO TO 884

882     WRITE (6,883)
883     FORMAT(/,' Fret Emulator ON.')

884     WRITE (6,885) UP_STRUM_RATES(N),
     &                (UP_STRUM_SEQUENCES(K,N),K=1,NUMBER_OF_KEYS)

885     FORMAT(/,' UP-STRUM RATE:   ',I3,/,
     &          ' UP-STRUM SEQUENCE:   ',20(I3,1H,))

        WRITE (6,886) DOWN_STRUM_RATES(N),
     &                (DOWN_STRUM_SEQUENCES(K,N),K=1,NUMBER_OF_KEYS)
```

```
886     FORMAT(/,' DOWN-STRUM RATE:   ',I3,/,
     &         ' DOWN-STRUM SEQUENCE:   ',20(I3,1H,))

890     CONTINUE

        GO TO 1000                      !Return to Main Program
C ------------------------------------------------------------------------------
C  errors:

900     TYPE 910
910     FORMAT(' ERROR loading SETUPS!')

        STOP                            !Go no further.

950     TYPE 960
960     FORMAT(' ERROR saving SETUPS!')

        STOP                            !Go no further.

C ------------------------------------------------------------------------------
1000    CLOSE (6)                       !Close whatever device was used.

        RETURN
        END


PROGRAM SECTIONS

    Name                             Bytes   Attributes

  0 $CODE                             1934   PIC CON REL LCL   SHR   EXE   RD NOWRT LONG
  1 $PDATA                             664   PIC CON REL LCL   SHR NOEXE   RD NOWRT LONG
  2 $LOCAL                             204   PIC CON REL LCL NOSHR NOEXE   RD   WRT LONG
  3 MIDI_IN                              5   PIC OVR REL GBL   SHR NOEXE   RD   WRT LONG
  4 MIDI_OUT                             4   PIC OVR REL GBL   SHR NOEXE   RD   WRT LONG
  5 SETUPS                            4032   PIC OVR REL GBL   SHR NOEXE   RD   WRT LONG
  6 ACTIVE_SETUP                       226   PIC OVR REL GBL   SHR NOEXE   RD   WRT LONG
  7 PARAM                               17   PIC OVR REL GBL   SHR NOEXE   RD   WRT LONG
  8 PERFORM                            174   PIC OVR REL GBL   SHR NOEXE   RD   WRT LONG
  9 CURSOR                               4   PIC OVR REL GBL   SHR NOEXE   RD   WRT LONG

    Total Space Allocated             7264

ENTRY POINTS

    Address   Type  Name

  0-00000000        ARCHIVE
```

VARIABLES

| Address | Type | Name |
|---|---|---|
| 6-000000CE | I*2 | ACTIVE_SETUP_NUMBER |
| 8-00000076 | I*2 | CLOSEST_FRET |
| 8-00000090 | R*4 | ELAPSED_REAL_TIME |
| 2-00000023 | CHAR | FNAME |
| 6-000000A0 | I*2 | FRET_EMULATOR |
| ** | I*4 | K |
| ** | I*4 | L |
| 7-00000010 | L*1 | MIDI_CHNL16_CTRL_CHANGE |
| 3-00000004 | L*1 | MIDI_KEY_STATUS |
| 3-00000003 | L*1 | MIDI_NECK_POSITION |
| 3-00000000 | L*1 | MIDI_STATUS_BYTE |
| 7-0000000C | R*4 | NECK_FRET_FACTOR |
| 7-00000004 | I*4 | NUM_KEYS |
| ** | I*2 | OCTAVE |
| 8-00000094 | CHAR | REAL_CHORD |
| 6-000000D0 | CHAR | SETUP_NAME |

| Address | Type | Name |
|---|---|---|
| 2-00000030 | L*4 | ANS |
| 6-000000CC | I*2 | DOWN_STRUM_RATE |
| 2-00000018 | CHAR | FILENAME |
| 2-0000002C | L*4 | FOUND_ICON |
| 2-00000034 | I*4 | IDEVICE |
| ** | I*4 | KSUB |
| 8-00000072 | R*4 | LEVER_DEPRESSION_FACTOR |
| 3-00000001 | L*1 | MIDI_CONTROLLER_NUMBER |
| 3-00000002 | L*1 | MIDI_LEVER_POSITION |
| 4-00000000 | I*4 | MIDI_OUT |
| ** | I*4 | N |
| 7-00000000 | I*4 | NUM_FRETS |
| 7-00000008 | I*4 | NUM_SETUPS |
| 8-0000006E | R*4 | OFF_TUNE |
| 8-0000008C | R*4 | REAL_FRET |
| 6-000000B6 | I*2 | UP_STRUM_RATE |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-000000B8 | I*2 | DOWN_STRUM_SEQUENCE | 20 | (10) |
| 5-00000CF0 | I*2 | DOWN_STRUM_SEQUENCES | 360 | (10, 18) |
| 5-00000B40 | I*2 | FRET_EMULATORS | 36 | (18) |
| 8-00000000 | L*1 | KEYS_ON | 10 | (10) |
| 8-0000009A | R*4 | LEVER_POSITIONS | 20 | (5) |
| 6-00000014 | I*2 | LEVER_SETUP | 100 | (10, 5) |
| 5-00000168 | I*2 | LEVER_SETUPS | 1800 | (10, 5, 18) |
| 6-0000008C | I*2 | MIDI_PGM_NUMBER | 20 | (10) |
| 5-000009D8 | I*2 | MIDI_PGM_NUMBERS | 360 | (10, 18) |
| 6-00000078 | I*2 | MIDI_XMIT_CHNL | 20 | (10) |
| 5-00000870 | I*2 | MIDI_XMIT_CHNLS | 360 | (10, 18) |
| 2-00000000 | CHAR | NOTES | 24 | (12) |
| 9-00000000 | I*2 | POSITION | 4 | (2) |
| 5-00000E7C | CHAR | SETUP_NAMES | 324 | (18) |
| 5-00000CCC | I*2 | UP_STRUM_RATES | 36 | (18) |
| 6-000000A2 | I*2 | UP_STRUM_SEQUENCE | 20 | (10) |
| 5-00000B64 | I*2 | UP_STRUM_SEQUENCES | 360 | (10, 18) |

LABELS

| Address | Label | Address | Label | Address | Label | Address | Label | Address | Label | Address | Label |
|---|---|---|---|---|---|---|---|---|---|---|---|
| 0-00000020 | 10 | ** | 20 | 1-00000011 | 30' | 1-0000003B | 40' | 0-000004D4 | 100 | 1-0000003B | 110' |
| 0-0000052A | 150 | 1-00000062 | 160' | 1-00000076 | 170' | 0-00000590 | 180 | 1-00000079 | 190' | 0-000005C4 | 250 |
| 0-000005DC | 260 | 1-0000008D | 270' | 0-00000608 | 350 | 0-00000764 | 360 | 1-000000A1 | 370' | 0-00000621 | 400 |

```
      **      410     0-00000737  420     0-0000008C  500     1-00000086  510'    0-000000E4  550     0-00000148  560
0-0000017C    650     0-00000194  660     0-00000188  750     0-00000300  760     0-000001D1  800          **     810
0-00000324    850     1-000000E4  860'    1-0000019D  870'         **     880     1-000001B5  881'    0-00000440  882
1-000001CC    883'    0-00000456  884     1-000001E2  885'    1-00000218  886'         **     890     0-00000744  900
1-00000258    910'    0-000002E0  950     1-00000271  960'    0-00000737  1000

FUNCTIONS AND SUBROUTINES REFERENCED

Type  Name                      Type  Name                  Type  Name

      CHECK_CURSOR                    CLEAR_SCREEN                DISPLAY_SCREEN_2
      FOR$CLOSE                       FOR$OPEN                    POSITION_CURSON
      POSITION_CURSOR                 WAIT
```

```
      SUBROUTINE UPDATE_C2P2

C -------------------------------------------------------------------------!
C This subroutine sends the contents of labeled common area /SETUPS/ out the   !
C MIDI OUT port in binary.  The C2P2 stores these setups in on-board non-      !
C volitile memory.                                                             !
C -------------------------------------------------------------------------!

      INCLUDE 'XCOM.FOR/NOLIST'

      BYTE MIDI_PREFIX(6), EOX

C -------------------------------------------------------------------------
      DATA MIDI_PREFIX /240,0,0,0,0,0/      !NOTE:  Bytes 2 thru 6 must be set by the
                                            !manufacturer of the C2P2 and C2P4, since they depend
                                            !upon the manufacturer's ID and the number of SETUPS
                                            !allowed in the C2P2's on-board memory.
      DATA EOX /247/                        !"END-FLAG" of System Exclusive transfer.
C -------------------------------------------------------------------------

      WRITE (2,ERR=200) MIDI_PREFIX         !Tell C2P2 to load up
                                            !all of our SETUPS.
      DO 100 N = 1 , NUMBER_OF_SETUPS

      WRITE (2,ERR=200) SETUP_NAMES(N),
     &                  FRET_EMULATORS(N),
     &                  UP_STRUM_RATES(N),
     &                  DOWN_STRUM_RATES(N)

      DO 100 K = 1 , NUMBER_OF_KEYS

      WRITE (2,ERR=200) MIDI_XMIT_CHNLS(K,N),
     &                  MIDI_PGM_NUMBERS(K,N),
     &                  UP_STRUM_SEQUENCES(K,N),
     &                  DOWN_STRUM_SEQUENCES(K,N),
     &                  BASIC_PITCHS(K,N)

      DO 100 L = 1 , 5

      WRITE (2,ERR=200) LEVER_SETUPS(K,L,N)

100   CONTINUE

      WRITE (2,ERR=200) EOX            !Send MIDI "End Flag".

      RETURN                           !Sucessfully transferred!

C -------------------------------------------------------------------------
C  Update error over MIDI OUT port:

200   TYPE 210
210   FORMAT (/' C2P2 not updated!',/, ' Check equipment!')

      CALL WAIT (5)                    !Wait 5 seconds.
      RETURN
      END
```

PROGRAM SECTIONS

| Name | Bytes | Attributes |
|---|---|---|
| 0 $CODE | 376 | PIC CON REL LCL SHR EXE RD NOWRT LONG |
| 1 $PDATA | 46 | PIC CON REL LCL SHR NOEXE RD NOWRT LONG |
| 2 $LOCAL | 40 | PIC CON REL LCL NOSHR NOEXE RD WRT LONG |
| 3 MIDI_IN | 5 | PIC OVR REL GBL SHR NOEXE RD WRT LONG |
| 4 MIDI_OUT | 4 | PIC OVR REL GBL SHR NOEXE RD WRT LONG |
| 5 SETUPS | 4032 | PIC OVR REL GBL SHR NOEXE RD WRT LONG |
| 6 ACTIVE_SETUP | 226 | PIC OVR REL GBL SHR NOEXE RD WRT LONG |
| 7 PARAM | 17 | PIC OVR REL GBL SHR NOEXE RD WRT LONG |
| 8 PERFORM | 174 | PIC OVR REL GBL SHR NOEXE RD WRT LONG |
| 9 CURSOR | 4 | PIC OVR REL GBL SHR NOEXE RD WRT LONG |
| Total Space Allocated | 4924 | |

ENTRY POINTS

| Address | Type | Name |
|---|---|---|
| 0-00000000 | | UPDATE_C2P2 |

VARIABLES

| Address | Type | Name | Address | Type | Name |
|---|---|---|---|---|---|
| 6-000000CE | I*2 | ACTIVE_SETUP_NUMBER | 8-00000076 | I*2 | CLOSEST_FRET |
| 6-000000CC | I*2 | DOWN_STRUM_RATE | 8-00000090 | R*4 | ELAPSED_REAL_TIME |
| 2-00000006 | L*1 | EOX | 6-000000A0 | I*2 | FRET_EMULATOR |
| ** | I*4 | K | ** | I*4 | L |
| 8-00000072 | R*4 | LEVER_DEPRESSION_FACTOR | 7-00000010 | L*1 | MIDI_CHNL16_CTRL_CHANGE |
| 3-00000001 | L*1 | MIDI_CONTROLLER_NUMBER | 3-00000004 | L*1 | MIDI_KEY_STATUS |
| 3-00000002 | L*1 | MIDI_LEVER_POSITION | 3-00000003 | L*1 | MIDI_NECK_POSITION |
| 4-00000000 | I*4 | MIDI_OUT | 3-00000000 | L*1 | MIDI_STATUS_BYTE |
| ** | I*4 | N | 7-0000000C | R*4 | NECK_FRET_FACTOR |
| 7-00000000 | I*4 | NUM_FRETS | 7-00000004 | I*4 | NUM_KEYS |
| 7-00000008 | I*4 | NUM_SETUPS | 8-0000006E | R*4 | OFF_TUNE |
| 8-00000094 | CHAR | REAL_CHORD | 8-0000008C | R*4 | REAL_FRET |
| 6-000000D0 | CHAR | SETUP_NAME | 6-00000086 | I*2 | UP_STRUM_RATE |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-000000B8 | I*2 | DOWN_STRUM_SEQUENCE | 20 | (10) |
| 5-00000CF0 | I*2 | DOWN_STRUM_SEQUENCES | 360 | (10, 18) |
| 5-00000B40 | I*2 | FRET_EMULATORS | 36 | (18) |
| 8-00000000 | L*1 | KEYS_ON | 10 | (10) |

```
8-0000009A  R*4  LEVER_POSITIONS                       20  (5)
6-00000014  I*2  LEVER_SETUP                          100  (10, 5)
5-00000168  I*2  LEVER_SETUPS                        1800  (10, 5, 18)
6-0000008C  I*2  MIDI_PGM_NUMBER                       20  (10)
5-000009D8  I*2  MIDI_PGM_NUMBERS                     360  (10, 18)
2-00000000  L*1  MIDI_PREFIX                            6  (6)
6-00000078  I*2  MIDI_XMIT_CHNL                        20  (10)
5-00000870  I*2  MIDI_XMIT_CHNLS                      360  (10, 18)
9-00000000  I*2  POSITION                               4  (2)
5-00000E7C  CHAR SETUP_NAMES                          324  (18)
5-00000CCC  I*2  UP_STRUM_RATES                        36  (18)
6-000000A2  I*2  UP_STRUM_SEQUENCE                     20  (10)
5-00000B64  I*2  UP_STRUM_SEQUENCES                   360  (10, 18)

LABELS

    Address   Label       Address   Label        Address   Label

      **      100       0-00000158  200        1-00000004  210'

FUNCTIONS AND SUBROUTINES REFERENCED

  Type  Name

        WAIT
```

```
        SUBROUTINE COPY

        LOGICAL FOUND_ICON, IN_BOX

        INTEGER *2 FROM, TO

        INCLUDE 'XCOM.FOR/NOLIST'

C  -------------------------------------------------------------------------------

        CALL CLEAR_SCREEN                      !Clear monitor.

        CALL DISPLAY_SCREEN_2                  !Display Screen 2 as shown in Figure 8,
                                               !and fill in the SETUP NUMBERS and SETUP_NAMES
                                               !contained in labeled common /SETUP/

        CALL POSITION_CURSOR (15,5)            !Position cursor in the box at bottom of
                                               !Screen 2.

        TYPE 10                                !Modify Screen 2 by over-writing the
10      FORMAT ('+Copy from SETUP #?',$)       !"Select Active SETUP ?" display field.

20      CALL CHECK_CURSOR (FOUND_ICON)         !Subroutine to compare current cursor position to
                                               !see if it is in any one of the six ICON areas.
                                               !If it is, then set FOUND_ICON = .TRUE.

        IF (FOUND_ICON) RETURN

30      CALL CHECK_SETUP_BOX ( IN_BOX )        !Subroutine to compare current cursor position to
                                               !see if it is in the "SELECT ACTIVE SETUP" BOX
                                               !indicated in Figure 8.
                                               !If it is, set IN_BOX = .TRUE.
        IF (.NOT. IN_BOX) GO TO 20

        CALL GET_NUMERIC ( FROM )              !Get "FROM" SETUP number.

        IF (FROM .GE. 1 .AND. FROM .LE. NUMBER_OF_SETUPS) GO TO 40

        GO TO 30                               !User entered invalid SETUP NUMBER.

40      CALL POSITION_CURSOR (15,5)

        TYPE 50
50      FORMAT('+Copy to SETUP #?',$)

        CALL GET_NUMERIC ( TO )                !Get "TO" SETUP number.

        IF (TO .GE. 1 .AND. TO .LE. NUMBER_OF_SETUPS .AND. FROM .NE. TO)
     &          GO TO 70

        CALL POSITION_CURSOR (15,5)

        TYPE 60
60      FORMAT ('+Invalid combination!',$)

        CALL WAIT (2)                          !Wait 2 seconds.

```

```
        GO TO 40

70      ACTIVE_SETUP_NUMBER = TO                !Move into labeled common /ACTIVE_SETUP/.

        DO 100 K = 1 , NUM_KEYS                 !Copy selected SETUP to ACTIVE_SETUP.

        BASIC_PITCHS(K,TO) = BASIC_PITCHS(K,FROM)
        UP_STRUM_SEQUENCES(K,TO) = UP_STRUM_SEQUENCES(K,FROM)
        DOWN_STRUM_SEQUENCES(K,TO) = DOWN_STRUM_SEQUENCES(K,FROM)
        MIDI_XMIT_CHNLS(K,TO) = MIDI_XMIT_CHNLS(K,FROM)
        MIDI_PGM_NUMBERS(K,TO) = MIDI_PGM_NUMBERS(K,FROM)

        DO 100 L = 1 , 5

100     LEVER_SETUPS(K,L,TO) = LEVER_SETUPS(K,L,FROM)

        SETUP_NAMES(TO) = SETUP_NAMES(FROM)
        FRET_EMULATORS(TO) = FRET_EMULATORS(FROM)
        UP_STRUM_RATES(TO) = UP_STRUM_RATES(FROM)
        DOWN_STRUM_RATES(TO) = DOWN_STRUM_RATES(FROM)

        RETURN                                  !Sucessful copy.
        END
```

```
PROGRAM SECTIONS

    Name                           Bytes   Attributes

  0 $CODE                            444   PIC CON REL LCL   SHR   EXE   RD NOWRT LONG
  1 $PDATA                            81   PIC CON REL LCL   SHR NOEXE   RD NOWRT LONG
  2 $LOCAL                            64   PIC CON REL LCL NOSHR NOEXE   RD   WRT LONG
  3 MIDI_IN                            5   PIC OVR REL GBL   SHR NOEXE   RD   WRT LONG
  4 MIDI_OUT                           4   PIC OVR REL GBL   SHR NOEXE   RD   WRT LONG
  5 SETUPS                          4032   PIC OVR REL GBL   SHR NOEXE   RD   WRT LONG
  6 ACTIVE_SETUP                     226   PIC OVR REL GBL   SHR NOEXE   RD   WRT LONG
  7 PARAM                             17   PIC OVR REL GBL   SHR NOEXE   RD   WRT LONG
  8 PERFORM                          174   PIC OVR REL GBL   SHR NOEXE   RD   WRT LONG
  9 CURSOR                             4   PIC OVR REL GBL   SHR NOEXE   RD   WRT LONG

    Total Space Allocated           5051

ENTRY POINTS

    Address   Type  Name

  0-00000000        COPY
```

VARIABLES

| Address | Type | Name | Address | Type | Name |
|---|---|---|---|---|---|
| 6-000000CE | I*2 | ACTIVE_SETUP_NUMBER | 8-00000076 | I*2 | CLOSEST_FRET |
| 6-000000CC | I*2 | DOWN_STRUM_RATE | 8-00000090 | R*4 | ELAPSED_REAL_TIME |
| 2-00000004 | L*4 | FOUND_ICON | 6-000000A0 | I*2 | FRET_EMULATOR |
| 2-00000000 | I*2 | FROM | 2-00000008 | L*4 | IN_BOX |
| ** | I*4 | K | ** | I*4 | L |
| 8-00000072 | R*4 | LEVER_DEPRESSION_FACTOR | 7-00000010 | L*1 | MIDI_CHNL16_CTRL_CHANGE |
| 3-00000001 | L*1 | MIDI_CONTROLLER_NUMBER | 3-00000004 | L*1 | MIDI_KEY_STATUS |
| 3-00000002 | L*1 | MIDI_LEVER_POSITION | 3-00000003 | L*1 | MIDI_NECK_POSITION |
| 4-00000000 | I*4 | MIDI_OUT | 3-00000000 | L*1 | MIDI_STATUS_BYTE |
| 7-0000000C | R*4 | NECK_FRET_FACTOR | 7-00000000 | I*4 | NUM_FRETS |
| 7-00000004 | I*4 | NUM_KEYS | 7-00000008 | I*4 | NUM_SETUPS |
| 8-0000006E | R*4 | OFF_TUNE | 8-00000094 | CHAR | REAL_CHORD |
| 8-0000008C | R*4 | REAL_FRET | 6-000000D0 | CHAR | SETUP_NAME |
| 2-00000002 | I*2 | TO | 6-000000B6 | I*2 | UP_STRUM_RATE |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-000000B8 | I*2 | DOWN_STRUM_SEQUENCE | 20 | (10) |
| 5-00000CF0 | I*2 | DOWN_STRUM_SEQUENCES | 360 | (10, 18) |
| 5-00000B40 | I*2 | FRET_EMULATORS | 36 | (18) |
| 8-00000000 | L*1 | KEYS_ON | 10 | (10) |
| 8-0000009A | R*4 | LEVER_POSITIONS | 20 | (5) |
| 6-00000014 | I*2 | LEVER_SETUP | 100 | (10, 5) |
| 5-00000168 | I*2 | LEVER_SETUPS | 1800 | (10, 5, 18) |
| 6-0000008C | I*2 | MIDI_PGM_NUMBER | 20 | (10) |
| 5-000009D8 | I*2 | MIDI_PGM_NUMBERS | 360 | (10, 18) |
| 6-00000078 | I*2 | MIDI_XMIT_CHNL | 20 | (10) |
| 5-00000870 | I*2 | MIDI_XMIT_CHNLS | 360 | (10, 18) |
| 9-00000000 | I*2 | POSITION | 4 | (2) |
| 5-00000E7C | CHAR | SETUP_NAMES | 324 | (18) |
| 5-00000CCC | I*2 | UP_STRUM_RATES | 36 | (18) |
| 6-000000A2 | I*2 | UP_STRUM_SEQUENCE | 20 | (10) |
| 5-00000B64 | I*2 | UP_STRUM_SEQUENCES | 360 | (10, 18) |

ABELS

| Address | Label | Address | Label | Address | Label | Address | Label | Address | Label | Address | Label |
|---|---|---|---|---|---|---|---|---|---|---|---|
| 1-0000000C | 10' | 0-0000003C | 20 | 0-00000048 | 30 | 0-0000006C | 40 | 1-00000023 | 50' | 1-00000038 | 60' |
| 0-000000D0 | 70 | ** | 100 | | | | | | | | |

FUNCTIONS AND SUBROUTINES REFERENCED

| Type | Name | Type | Name | Type | Name |
|---|---|---|---|---|---|
| | CHECK_CURSOR | | CHECK_SETUP_BOX | | CLEAR_SCREEN |
| | DISPLAY_SCREEN_2 | | GET_NUMERIC | | POSITION_CURSOR |
| | WAIT | | | | |

```
        SUBROUTINE TRANSPOSE

        LOGICAL FOUND_ICON, IN_BOX

        INTEGER *2 UP_OR_DOWN_AMOUNT, LOWEST_PITCH, HIGHEST_PITCH,
     &             NEW_LOW, NEW_HIGH

        INCLUDE 'XCOM.FOR/NOLIST'

C   -------------------------------------------------------------------------------

        LOWEST_PITCH = 127                   !Set seed value high.
        HIGHEST_PITCH = 0                    !Set seed value low.

        DO 1 K = 1 , NUMBER_OF_KEYS          !Set lowest and highest pitches from
                                             !array BASIC_PITCH.
        LOWEST_PITCH = MIN (LOWEST_PITCH , BASIC_PITCH(K))
        HIGHEST_PITCH= MAX (HIGHEST_PITCH, BASIC_PITCH(K))

1       CONTINUE

        CALL DISPLAY_SCREEN_2                !Display Screen 2 as shown in Figure 8,
                                             !and fill in the SETUP NUMBERS and SETUP_NAMES
                                             !contained in labeled common /SETUP/

        CALL POSITION_CURSOR (15,5)          !Position cursor in the box at bottom of
                                             !Screen 2.

        TYPE 10                              !Modify Screen 2 by over-writing the
10      FORMAT ('+Enter amount (+/-#)?',$)   !"Select Active SETUP ?" display field.

20      CALL CHECK_CURSOR (FOUND_ICON)       !Subroutine to compare current cursor position to
                                             !see if it is in any one of the six ICON areas.
                                             !If it is, then set FOUND_ICON = .TRUE.

        IF (FOUND_ICON) RETURN

30      CALL CHECK_SETUP_BOX ( IN_BOX )      !Subroutine to compare current cursor position to
                                             !see if it is in the "SELECT ACTIVE SETUP" BOX
                                             !indicated in Figure 8.
                                             !If it is, set IN_BOX = .TRUE.
        IF (.NOT. IN_BOX) GO TO 20

        CALL GET_NUMERIC ( UP_OR_DOWN_AMOUNT )  !Get amount expressed in + or - musical half steps.

        NEW_LOW  = LOWEST_PITCH + UP_OR_DOWN_AMOUNT
        NEW_HIGH = HIGHEST_PITCH + UP_OR_DOWN_AMOUNT

        IF (NEW_LOW .LT. 0 .OR. NEW_HIGH .GT. 127 - NUMBER_OF_FRETS) THEN
                CALL ERROR ( UP_OR_DOWN_AMOUNT )
                GO TO 30
        END IF

        DO 50 K = 1 , NUMBER_OF_KEYS         !Transpose by "UP_OR_DOWN_AMOUNT".

        BASIC_PITCH(K) = BASIC_PITCH(K) + UP_OR_DOWN_AMOUNT
        BASIC_PITCHS(K,ACTIVE_SETUP_NUMBER) = BASIC_PITCH(K)    !Update labeled common area /SETUPS/ as well.
```

```
        50      CONTINUE
                                                  !Sucessful transposition.
                RETURN
                END
```

PROGRAM SECTIONS

| Name | Bytes | Attributes |
|---|---|---|
| 0 $CODE | 208 | PIC CON REL LCL SHR EXE RD NOWRT LONG |
| 1 $PDATA | 33 | PIC CON REL LCL SHR NOEXE RD NOWRT LONG |
| 2 $LOCAL | 48 | PIC CON REL LCL NOSHR NOEXE RD WRT LONG |
| 3 MIDI_IN | 5 | PIC OVR REL GBL SHR NOEXE RD WRT LONG |
| 4 MIDI_OUT | 4 | PIC OVR REL GBL SHR NOEXE RD WRT LONG |
| 5 SETUPS | 4032 | PIC OVR REL GBL SHR NOEXE RD WRT LONG |
| 6 ACTIVE_SETUP | 226 | PIC OVR REL GBL SHR NOEXE RD WRT LONG |
| 7 PARAM | 17 | PIC OVR REL GBL SHR NOEXE RD WRT LONG |
| 8 PERFORM | 174 | PIC OVR REL GBL SHR NOEXE RD WRT LONG |
| 9 CURSOR | 4 | PIC OVR REL GBL SHR NOEXE RD WRT LONG |
| Total Space Allocated | 4751 | |

ENTRY POINTS

| Address | Type | Name |
|---|---|---|
| 0-00000000 | | TRANSPOSE |

VARIABLES

| Address | Type | Name |
|---|---|---|
| 6-000000CE | I*2 | ACTIVE_SETUP_NUMBER |
| 6-000000CC | I*2 | DOWN_STRUM_RATE |
| 2-00000004 | L*4 | FOUND_ICON |
| ** | I*2 | HIGHEST_PITCH |
| ** | I*4 | K |
| ** | I*2 | LOWEST_PITCH |
| 3-00000001 | L*1 | MIDI_CONTROLLER_NUMBER |
| 3-00000002 | L*1 | MIDI_LEVER_POSITION |
| 4-00000000 | I*4 | MIDI_OUT |
| 7-0000000C | R*4 | NECK_FRET_FACTOR |
| ** | I*2 | NEW_LOW |
| 7-00000004 | I*4 | NUM_KEYS |
| 8-0000006E | R*4 | OFF_TUNE |
| 8-000000BC | R*4 | REAL_FRET |
| 2-00000000 | I*2 | UP_OR_DOWN_AMOUNT |
| 8-00000076 | I*2 | CLOSEST_FRET |
| 8-00000090 | R*4 | ELAPSED_REAL_TIME |
| 6-000000A0 | I*2 | FRET_EMULATOR |
| 2-00000008 | L*4 | IN_BOX |
| 8-00000072 | R*4 | LEVER_DEPRESSION_FACTOR |
| 7-00000010 | L*1 | MIDI_CHNL16_CTRL_CHANGE |
| 3-00000004 | L*1 | MIDI_KEY_STATUS |
| 3-00000003 | L*1 | MIDI_NECK_POSITION |
| 3-00000000 | L*1 | MIDI_STATUS_BYTE |
| ** | I*2 | NEW_HIGH |
| 7-00000000 | I*4 | NUM_FRETS |
| 7-00000008 | I*4 | NUM_SETUPS |
| 8-00000094 | CHAR | REAL_CHORD |
| 6-000000D0 | CHAR | SETUP_NAME |
| 6-000000B6 | I*2 | UP_STRUM_RATE |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-00000088 | I*2 | DOWN_STRUM_SEQUENCE | 20 | (10) |
| 5-00000CF0 | I*2 | DOWN_STRUM_SEQUENCES | 360 | (10, 18) |
| 5-00000840 | I*2 | FRET_EMULATORS | 36 | (18) |
| 8-00000000 | L*1 | KEYS_ON | 10 | (10) |
| 8-0000009A | R*4 | LEVER_POSITIONS | 20 | (5) |
| 6-00000014 | I*2 | LEVER_SETUP | 100 | (10, 5) |
| 5-00000168 | I*2 | LEVER_SETUPS | 1800 | (10, 5, 18) |
| 6-000000BC | I*2 | MIDI_PGM_NUMBER | 20 | (10) |
| 5-000009D8 | I*2 | MIDI_PGM_NUMBERS | 360 | (10, 18) |
| 6-00000078 | I*2 | MIDI_XMIT_CHNL | 20 | (10) |
| 5-00000870 | I*2 | MIDI_XMIT_CHNLS | 360 | (10, 18) |
| 9-00000000 | I*2 | POSITION | 4 | (2) |
| 5-00000E7C | CHAR | SETUP_NAMES | 324 | (18) |
| 5-00000CCC | I*2 | UP_STRUM_RATES | 36 | (18) |
| 6-000000A2 | I*2 | UP_STRUM_SEQUENCE | 20 | (10) |
| 5-00000864 | I*2 | UP_STRUM_SEQUENCES | 360 | (10, 18) |

LABELS

| Address | Label | Address | Label | Address | Label | Address | Label | Address | Label |
|---|---|---|---|---|---|---|---|---|---|
| ** | 1 | 1-00000008 | 10' | 0-00000068 | 20 | 0-00000074 | 30 | ** | 50 |

FUNCTIONS AND SUBROUTINES REFERENCED

| Type | Name | Type | Name | Type | Name |
|---|---|---|---|---|---|
| | CHECK_CURSOR | | CHECK_SETUP_BOX | | DISPLAY_SCREEN_2 |
| | ERROR | | GET_NUMERIC | | POSITION_CURSOR |

```
          SUBROUTINE MODE ( IMODE )

C   --------------------------------------------------------------------------------

          CALL SWITCH_MODES ( IMODE )    !An interactive subroutine (similar to "TOGGLE" described earlier)
                                         !which alternately displays either "PERFORM" or "PROGRAM" in the
                                         !"MODE BOX" in the upper right corner of Screen display 1.
                                         !The returned value "IMODE" is as folowws:
                                         !  IMODE = 1 = PROGRAMMING MODE.
                                         !  IMODE = 2 = PERFORMANCE MODE.

          RETURN
          END
```

```
PROGRAM SECTIONS

    Name                              Bytes   Attributes

  0 $CODE                                22   PIC CON REL LCL   SHR   EXE   RD NOWRT LONG
  2 $LOCAL                                8   PIC CON REL LCL NOSHR NOEXE   RD   WRT LONG

    Total Space Allocated                30

ENTRY POINTS

    Address   Type  Name

  0-00000000        MODE

VARIABLES

    Address   Type  Name

 AP-00000004@ I*4   IMODE

FUNCTIONS AND SUBROUTINES REFERENCED

  Type  Name

        SWITCH_MODES
```

```
      SUBROUTINE PROGRAMMING

C ----------------------------------------------------------------------|
C This subroutine allows the user to interactively alter any of the SETUP para-|
C meters contained in the arrays and variables of labeled common areas  |
C /ACTIVE_SETUP/ and /SETUPS/.                                          |
C The user must make his/her active setup selection in the subroutine "SELECT_ |
C SETUP", contained elsewhere in this program.                          |
C Again, all numeric input is achieved by calls to subroutine "GET_NUMERIC",  |
C which uses MOUSE or data INCREMENT/DECREMENT keys for interactive data entry.|
C ----------------------------------------------------------------------|
      INCLUDE 'XCOM.FOR/NOLIST'

      LOGICAL FOUND_ICON

      INTEGER *2 WHERE, KSUB, LSUB, ASUB
C ----------------------------------------------------------------------
C begin:

      ASUB = ACTIVE_SETUP_NUMBER              !Active Setup Number Subscript.

      CALL CLEAR_SCREEN
      CALL DISPLAY_SCREEN_1

10    CALL CHECK_CURSOR (FOUND_ICON)

      IF (FOUND_ICON) RETURN                  !Is user finished programming?

20    CALL WHERE_IS_THE_CURSOR ( WHERE , KSUB , LSUB ) !Subroutine which checks the current cursor position
                                              !within several tables of (X,Y) coordinates to determine which
                                              !field the user wants to update.  (The actual code for this, as
                                              !well as some other subroutines contained in this program cannot
                                              !be included here in VAX FORTRAN without knowing the target
                                              !computer's graphics capabilities, screen resolution, and input/
                                              !output routines available.  For this reason all hardware-dependent
                                              !subroutine calls contained in this program are described in enough
                                              !detail, that they can be implemented on any target computer.)
                                              !This subroutine returns three variables:
                                              !  1)  "KSUB" which a key controller associated subscript varying
                                              !       between 1 and NUMBER_OF_KEYS.
                                              !  2)  "LSUB" which is a FDSHC lever associated subscript varying
                                              !       between 1 and 5.
                                              !  3)  "WHERE" which is an integer variable set by table lookups
                                              !       as follows:
                                              !       1 = cursor is in the FDSHC LEVER area at (KSUB,LSUB).
                                              !       2 = cursor is in the BASIC PITCH area at KSUB.
                                              !       3 = cursor is in the MIDI TRANSMIT CHANNEL area at KSUB.
                                              !       4 = cursor is in the MIDI PROGRAM area at KSUB.
                                              !       5 = cursor is in the FRET EMULATOR area.
                                              !       6 = cursor is in the UP STRUM SEQUENCE area at KSUB.
                                              !       7 = cursor is in the DOWN STRUM SEQUENCE area at KSUB.
                                              !       8 = cursor is in the UP STRUM RATE area.
                                              !       9 = cursor is in the DOWN STRUM RATE area.
                                              !       10= cursor is in the SETUP NAME area.

      GO TO (100,200,300,400,500,600,700,800,900,1000) WHERE
```

```
C  -------------------------------------------------------------------------
C  FDSHC levers:

100     CALL GET_NUMERIC ( IVALUE )               !(Subroutine described earlier.)

        IF (IVALUE .LE. -12 .OR. IVALUE .GE. 12) THEN
                CALL ERROR (IVALUE)               !Subroutine to indicate a value out of range; preferably
                GO TO 10                          !by changing the color of the number (to red), for instance.
        END IF

        LEVER_SETUP(KSUB,LSUB) = IVALUE           !Update /ACTIVE_SETUP/
        LEVER_SETUPS(KSUB,LSUB,ASUB) = IVAL       !Update /SETUPS/

        GO TO 10                                  !Check for an ICON.
C  -------------------------------------------------------------------------
C  basic pitch:

200     CALL GET_NUMERIC ( IVALUE )

        IF (IVALUE .LT. 0 .OR. IVALUE .GT. 127 - NUMBER_OF_FRETS) THEN
                CALL ERROR ( IVALUE )
                GO TO 10
        END IF

        BASIC_PITCH(KSUB) = IVALUE                !Update /ACTIVE_SETUP/
        BASIC_PITCHS(KSUB,ASUB) = IVALUE          !Update /SETUPS/

        GO TO 10                                  !Check for an ICON.
C  -------------------------------------------------------------------------
C  MIDI transmit channels:

300     CALL GET_NUMERIC ( IVALUE )

        IF (IVALUE .LE. 0 .OR. IVALUE .GE. 17) THEN
                CALL ERROR ( IVALUE )
                GO TO 10
        END IF

        MIDI_XMIT_CHNL(KSUB) = IVALUE - 1         !Update /ACTIVE_SETUP/
        MIDI_XMIT_CHNLS(KSUB,ASUB) = IVALUE - 1 !Update /SETUPS/

        GO TO 10                                  !Check for an ICON.
C  -------------------------------------------------------------------------
C  MIDI program number:

400     CALL GET_NUMERIC ( IVALUE )

        IF (IVALUE .LE. 0 .OR. IVALUE .GE. 33) THEN
                CALL ERROR ( IVALUE )
                GO TO 10
        END IF

        MIDI_PGM_NUMBER(KSUB) = IVALUE - 1        !Update /ACTIVE_SETUP/
        MIDI_PGM_NUMBERS(KSUB,ASUB) = IVALUE - 1!UPDATE /SETUPS/

        GO TO 10                                  !Check for an ICON.
C  -------------------------------------------------------------------------
```

```
C  fret emulator:

500     CALL TOGGLE (IVALUE)                        !An interactive subroutine similar to "GET_NUMERIC", except that
                                                    !the screen area only displays either "ON" or "OFF" to alternate
                                                    !keystrokes by the user.  The returned value "IVALUE" is as follows:
                                                    !  IVALUE = 0   = "OFF".
                                                    !  IVALUE = 127 = "ON".

        FRET_EMULATOR = IVALUE                      !Update /ACTIVE_SETUP/
        FRET_EMULATORS(ASUB) = IVALUE               !Update /SETUPS/

        GO TO 10                                    !Check for an ICON.
C  -----------------------------------------------------------------------------
C  up strum sequence:

600     CALL GET_NUMERIC ( IVALUE )

        IF (IVALUE .LE. 0 .OR. IVALUE .GE. NUMBER_OF_KEYS + 1) THEN
                CALL ERROR ( IVALUE )
                GO TO 10
        END IF

        UP_STRUM_SEQUENCE(KSUB) = IVALUE                    !Update /ACTIVE_SETUP/
        UP_STRUM_SEQUENCES(KSUB,ASUB) = IVALUE              !Update /SETUPS/

        GO TO 10                                    !Check for an ICON.
C  -----------------------------------------------------------------------------
C  down strum sequence:

700     CALL GET_NUMERIC ( IVALUE )

        IF (IVALUE .LE. 0 .OR. IVALUE .GE. NUMBER_OF_KEYS + 1) THEN
                CALL ERROR ( IVALUE )
                GO TO 10
        END IF

        DOWN_STRUM_SEQUENCE(KSUB) = IVALUE                  !Update /ACTIVE_SETUP/
        DOWN_STRUM_SEQUENCES(KSUB,ASUB) = IVALUE            !Update /SETUPS/

        GO TO 10                                    !Check for an ICON.
C  -----------------------------------------------------------------------------
C  up strum rate:

800     CALL GET_NUMERIC ( IVALUE )

        IF (IVALUE .LT. 0 .OR. IVALUE .GT. 127 ) THEN
                CALL ERROR ( IVALUE )
                GO TO 10
        END IF

        UP_STRUM_RATE = IVALUE                      !Update /ACTIVE_SETUP/
        UP_STRUM_RATES(ASUB) = IVALUE               !Update /SETUPS/

        GO TO 10                                    !Check for an ICON
C  -----------------------------------------------------------------------------
C  down strum rate:
```

```
900     CALL GET_NUMERIC ( IVALUE )

        IF ( IVALUE .LT. 0 .OR. IVALUE .GT. 127) THEN
                CALL ERROR ( IVALUE )
                GO TO 10
        END IF

        DOWN_STRUM_RATE = IVALUE                !Update /ACTIVE_SETUP/
        DOWN_STRUM_RATES(ASUB) = IVALUE         !Update /SETUPS/

        GO TO 10                                !Check for an ICON.
C ------------------------------------------------------------------------
C  setup name:

1000    READ (5,1010,END=10) SETUP_NAME         !Read as ASCII character string.
1010    FORMAT (A18)

        SETUP_NAMES(ASUB) = SETUP_NAME          !Update /SETUPS/

        GO TO 10                                !Check for an ICON.
C ------------------------------------------------------------------------

        END
```

PROGRAM SECTIONS

| Name | Bytes | Attributes |
|---|---|---|
| 0 $CODE | 716 | PIC CON REL LCL SHR EXE RD NOWRT LONG |
| 1 $PDATA | 3 | PIC CON REL LCL SHR NOEXE RD NOWRT LONG |
| 2 $LOCAL | 60 | PIC CON REL LCL NOSHR NOEXE RD WRT LONG |
| 3 MIDI_IN | 5 | PIC OVR REL GBL SHR NOEXE RD WRT LONG |
| 4 MIDI_OUT | 4 | PIC OVR REL GBL SHR NOEXE RD WRT LONG |
| 5 SETUPS | 4032 | PIC OVR REL GBL SHR NOEXE RD WRT LONG |
| 6 ACTIVE_SETUP | 226 | PIC OVR REL GBL SHR NOEXE RD WRT LONG |
| 7 PARAM | 17 | PIC OVR REL GBL SHR NOEXE RD WRT LONG |
| 8 PERFORM | 174 | PIC OVR REL GBL SHR NOEXE RD WRT LONG |
| 9 CURSOR | 4 | PIC OVR REL GBL SHR NOEXE RD WRT LONG |
| Total Space Allocated | 5241 | |

ENTRY POINTS

| Address | Type | Name |
|---|---|---|
| 0-00000000 | | PROGRAMMING |

VARIABLES

| Address | Type | Name | Address | Type | Name |
|---|---|---|---|---|---|
| 6-000000CE | I*2 | ACTIVE_SETUP_NUMBER | ** | I*2 | ASUB |
| 8-00000076 | I*2 | CLOSEST_FRET | 6-000000CC | I*2 | DOWN_STRUM_RATE |
| 8-00000090 | R*4 | ELAPSED_REAL_TIME | 2-00000008 | L*4 | FOUND_ICON |
| 6-000000A0 | I*2 | FRET_EMULATOR | 2-00000010 | I*4 | IVAL |
| 2-0000000C | I*4 | IVALUE | 2-00000002 | I*2 | KSUB |
| 8-00000072 | R*4 | LEVER_DEPRESSION_FACTOR | 2-00000004 | I*2 | LSUB |
| 7-00000010 | L*1 | MIDI_CHNL16_CTRL_CHANGE | 3-00000001 | L*1 | MIDI_CONTROLLER_NUMBER |
| 3-00000004 | L*1 | MIDI_KEY_STATUS | 3-00000002 | L*1 | MIDI_LEVER_POSITION |
| 3-00000003 | L*1 | MIDI_NECK_POSITION | 4-00000000 | I*4 | MIDI_OUT |
| 3-00000000 | L*1 | MIDI_STATUS_BYTE | 7-0000000C | R*4 | NECK_FRET_FACTOR |
| 7-00000000 | I*4 | NUM_FRETS | 7-00000004 | I*4 | NUM_KEYS |
| 7-00000008 | I*4 | NUM_SETUPS | 8-0000006E | R*4 | OFF_TUNE |
| 8-00000094 | CHAR | REAL_CHORD | 8-0000008C | R*4 | REAL_FRET |
| 6-000000D0 | CHAR | SETUP_NAME | 6-000000B6 | I*2 | UP_STRUM_RATE |
| 2-00000000 | I*2 | WHERE | | | |

ARRAYS

| Address | Type | Name | Bytes | Dimensions |
|---|---|---|---|---|
| 8-00000078 | I*2 | ACTUAL_PITCH | 20 | (10) |
| 6-00000000 | I*2 | BASIC_PITCH | 20 | (10) |
| 5-00000000 | I*2 | BASIC_PITCHS | 360 | (10, 18) |
| 8-0000000A | I*2 | CURRENT_LEVER_EFFECT | 100 | (10, 5) |
| 5-00000E58 | I*2 | DOWN_STRUM_RATES | 36 | (18) |
| 6-000000B8 | I*2 | DOWN_STRUM_SEQUENCE | 20 | (10) |
| 5-00000CF0 | I*2 | DOWN_STRUM_SEQUENCES | 360 | (10, 18) |
| 5-00000B40 | I*2 | FRET_EMULATORS | 36 | (18) |
| 8-00000000 | L*1 | KEYS_ON | 10 | (10) |
| 8-0000009A | R*4 | LEVER_POSITIONS | 20 | (5) |
| 6-00000014 | I*2 | LEVER_SETUP | 100 | (10, 5) |
| 5-00000168 | I*2 | LEVER_SETUPS | 1800 | (10, 5, 18) |
| 6-0000008C | I*2 | MIDI_PGM_NUMBER | 20 | (10) |
| 5-000009D8 | I*2 | MIDI_PGM_NUMBERS | 360 | (10, 18) |
| 6-00000078 | I*2 | MIDI_XMIT_CHNL | 20 | (10) |
| 5-00000870 | I*2 | MIDI_XMIT_CHNLS | 360 | (10, 18) |
| 9-00000000 | I*2 | POSITION | 4 | (2) |
| 5-00000E7C | CHAR | SETUP_NAMES | 324 | (18) |
| 5-00000CCC | I*2 | UP_STRUM_RATES | 36 | (18) |
| 6-000000A2 | I*2 | UP_STRUM_SEQUENCE | 20 | (10) |
| 5-00000B64 | I*2 | UP_STRUM_SEQUENCES | 360 | (10, 18) |

LABELS

| Address | Label | Address | Label | Address | Label | Address | Label | Address | Label | Address | Label |
|---|---|---|---|---|---|---|---|---|---|---|---|
| 0-00000030 | 10 | ** | 20 | 0-00000061 | 100 | 0-000000B0 | 200 | 0-000000F4 | 300 | 0-00000138 | 400 |
| 0-0000017C | 500 | 0-0000019C | 600 | 0-000001DC | 700 | 0-0000021C | 800 | 0-00000258 | 900 | 0-00000294 | 1000 |
| 1-00000000 | 1010' | | | | | | | | | | |

```
FUNCTIONS AND SUBROUTINES REFERENCED

  Type  Name                         Type  Name                      Type  Name

        CHECK_CURSOR                       CLEAR_SCREEN                    DISPLAY_SCREEN_1
        ERROR                              GET_NUMERIC                     TOGGLE
        WHERE_IS_THE_CURSOR

COMMAND QUALIFIERS

  FOR/LIST=LPAO: C2P4

  /CHECK=(NOBOUNDS, OVERFLOW, NOUNDERFLOW)
  /DEBUG=(NOSYMBOLS, TRACEBACK)
  /STANDARD=(NOSYNTAX, NOSOURCE_FORM)
  /SHOW=(NOPREPROCESSOR, NOINCLUDE, MAP, NODICTIONARY, SINGLE)
  /WARNINGS=(GENERAL, NODECLARATIONS)
  /CONTINUATIONS=19  /NOCROSS_REFERENCE . /NOD_LINES  /NOEXTEND_SOURCE  /F77
  /NOG_FLOATING  /I4  /NOMACHINE_CODE  /OPTIMIZE

COMPILATION STATISTICS

  Run Time:            41.55 seconds
  Elapsed Time:        47.16 seconds
  Page Faults:         5848
  Dynamic Memory:      499 pages
```

I claim the following as my invention:

1. A device for controlling electrical signals comprising:

(a) a body comprising a multiplicity of controls and displays for respectively programming and monitoring the operation of the device, and a multiplicity of on/off switches for activating pre-programmed electrical signals generated by an external electrical signal generating means, the switches being disposed on a base portion of said body, said body having two orthogonal axes with distal and proximate borders on one axis, and upper and lower borders on the other axis;

(b) a rigid neck with a proximate end attached to and extending longitudinally from the distal border of the body;

(c) a slide hand controller member comprising a support for a plurality of levers which may be actuated by one hand of a user, said slide hand controller member being superposed on so as to freely slide longitudinally along the neck, said slide hand controller member also producing first and second distinctive electrical control signals as it slides longitudinally and as its individual levers are actuated, respectively, said first and second distinctive electrical control signals electrically altering the pre-programmed electrical signals activated by the multiplicity of switches attached to the body;

(d) stopping means secured to the distal end of the neck for inhibiting further longitudinal motion of the slide hand controller member in the distal direction; and (e) processing means, responsive to said multiplicity of on/off switches of the body and said first and second distinctive electrical control signals, for determining controller position, lever position and movement signals representing the position of said slide hand controller member along said neck, the position of said levers, and movement of said slide hand controller member along said neck, respectively, and for translating according to an intelligent protocol, the controller position, lever position and movement signals into adapted electrical control signals for controlling at least one of pitch, amplitude and tone of the output of said external signal generating means, said processing means being controlled by user input via the multiplicity of controls of the body.

2. A device as set forth in claim 1, further comprising a display and a ROM with setup charts and algorithms stored therein which are displayed on said display along with the adapted electrical control signals translated by the processing means, said display enabling the user to monitor said adapted electrical control signals and to receive instructions for using the device, said ROM communicating with and providing further control input for use in programming the operation of said processing means.

3. A device as set forth in claim 2, wherein the multiplicity of on/off switches disposed on the body and used for activating said pre-programmed electrical signals are in the shape of white keys of a piano keyboard, said keys running longitudinally and parallel to the upper and lower borders of the body so as to provide easy finger actuation by the user, said switches also comprising velocity and pressure transducer means for controlling the amplitude and tone of the pre-programmed electrical signals.

4. A device as set forth in claim 2, wherein the multiplicity of on/off switches disposed on the body and used for activating said pre-programmed electrical signals are in the shape of white keys of a piano keyboard, said keys being wider at one end than the other end and adjacent to each other so as to extend radially towards the lower border of the body to form a semi-circular pattern conforming to the positioning of the user's natural hand span relative to said keys.

5. A device as set forth in claim 2, wherein the body further comprises:

a strum controller comprising a first monostable on/-off strum switch, normally undepressed, that may be depressed by the user's little finger, wherein said first strum switch is fixed on an upper proximate quadrant of the body adjacent to a proximate section of the multiplicity of switches disposed on the body for activating said pre-programmed electrical signals, and a second monostable on/off strum switch, normally undepressed, that may be depressed by the user's thumb, wherein said second strum switch is fixed on an upper distal quadrant of the body adjacent to a distal section of the multiplicity of switches disposed on the body for activating said pre-programmed electrical signals, wherein said first and second strum switches, when depressed, independently activate at a pre-programmed rate and sequence the pre-programmed electrical signals.

6. A device as set forth in claim 5, wherein the first and second strum switches of the strum controller are joined by an arm that has ends superposed on and fixed to each strum switch and is rested on a pivot secured to the body between the first and second strum switches.

7. A device as set forth in claim 5, wherein the first and second strum switches of the strum controller each contain pressure and velocity sensors which provide inputs to said processing means, wherein said first and second strum switches are joined by an arm that has ends superposed on and fixed to each strum switch and is rested on a pivot secured to the body, said pivot being movable such that it may be moved to any position between the first and second strum switches, thereby creating a fulcrum for the arm during the operation of the strum controller.

8. A device as set forth in claim 2, wherein the slide hand controller member communicates electronically with said processing means by way of a wireless electromagnetic transmitter and receiver.

9. A device as set forth in claim 8, wherein the slide hand controller member comprises a digital transmission system powered by a battery which is automatically recharged whenever the slide hand controller member touches the stopping means.

10. A device as set forth in claim 2, wherein the neck is indented at regular intervals with tapered notches and the interior side of the slide hand controller member contains anti-frictional compressed rollers which extend as each roller passes over one of said notches so as to indicate, tacilely, the position of the slide hand controller member on the neck.

11. A device as set forth in claim 2, wherein the neck is marked with fret lines spaced exponentially for indicating the position of the slide hand controller member along said neck.

12. A device as set forth in claim 2, wherein the neck is marked with fret lines spaced linearly for indicating the position of the slide hand controller member along said neck.

13. A device as set forth in claim 2, further comprising cables which electrically connect the processing means and the slide hand controller member, said neck being hollow so as to form a cavity for holding said cables.

14. A device as set forth in claim 2, wherein the exterior side of said slide hand controller member contains a thumb lever and four finger levers which are positioned in conformity with the natural grasp of the user's hand and which are normally held in an extended position by a spring when the corresponding lever is not depressed, a moment being created by the depression of one of said levers and the depression of each of said levers producing said lever position signals in proportion to the amount of depression of each lever.

15. A device as set forth in claim 2, wherein the slide hand controller member further comprises a key column, the neck further comprising a two-walled track into which the key column protrudes so as to restrain the slide hand controller member from rotating about the neck's longitudinal axis.

16. A device as set forth in claim 15, wherein each wall of the neck's track comprises resistive strips which the slide hand controller member electrically shunts by means of the key column, thereby creating a variable resistance circuit with a resistive value dependent upon the slide hand controller's longitudinal position along the neck.

17. A device as set forth in claim 2, wherein the multiplicity of on/off switches disposed on the body are a plurality of parallel guitar-like strings which are strummed or picked to individually activate said pre-programmed electrical signals, said strings running longitudinally along the body and having amplitude sensing transducers which activate the pre-programmed electrical signals.

18. A process for producing polyphonic pitch altering control signals in real-time, comprising the following steps:

(a) assigning basic note pitch values to a plurality of key controller on/off switches controlled by one hand of a user;

(b) assigning a first predetermined incremental note pitch value to a predetermined increment of movement of a slide hand controller member such that said basic note pitch values are polyphonically altered uniformly in one of a glissando and portamento manner as said slide hand controller member is slid;

(c) assigning second predetermined incremental note pitch values to levers attached to the exterior side of the slide hand controller member, said levers being activated by the fingers and thumb of one hand of the user and altering, in proportion to their depression, the pitch of the basic note pitch values of the plurality of key controller on/off switches;

(d) depressing in a desired sequence the plurality of key controller switches so as to produce a signal corresponding to said basic note pitch values;

(e) selectively sliding said slide hand controller member so as to produce a signal corresponding to said first predetermined incremental note pitch value;

(f) selectively depressing said levers so as to produce a signal corresponding to said second predetermined incremental note pitch values;

(g) processing said signal corresponding to said basic note pitch values and said signals corresponding to said first and second predetermined incremental note pitch values to produce a polyphonic pitch control signal; and (h) controlling a sound synthesizeer to vary its output in response to said polyphonic pitch control signal.

19. A process as set forth in claim 18, comprising the further steps of:

(i) displaying the polyphonic pitch control signal on a display; and (j) displaying user instructions on said display for purposes of teaching and instructing the user as to how to produce said polyphonic pitch control signals.

20. A process for producing polyphonic pitch altering control signals in real-time, comprising the following steps:

(a) assigning basic note pitch values to a plurality of key controller on/off switches controlled by one hand of a user;

(b) determining a sequence and rate at which said plurality of key controller on/off switches are to be activated by a strum controller;

(c) assigning a first predetermined incremental note pitch value to a predetermined increment of movement of a slide hand controller member such that basic note pitch values are polyphonically altered uniformly in one of a glissando and portamento manner as said slide hand controller member is slid;

(d) assigning second predetermined incremental note pitch values to levers attached to the exterior side of the slide hand controller member, said levers being activated by the fingers and thumb of one hand of the user and altering, in proportion to their depression, the pitch of the basic note pitch values of the plurality of key controller on/off switches;

(e) depressing in a desired sequence said plurality of key controller on/off switches so as to produce a signal corresponding to said basic note pitch values and selectively activating said strum controller in said sequence at said rate to thereby produce signals corresponding to said sequence of basic note pitch values;

(f) selectively sliding said slide hand controller member so as to produce a signal corresponding to said first predetermined incremental note pitch value;

(g) selectively depressing said levers so as to produce a signal corresponding to said second predetermined incremental note pitch values;

(h) processing said signal corresponding to said basic note pitch values and said signals corresponding to said first and second predetermined incremental note pitch values to produce a polyphonic pitch control signal; and (i) controlling a sound synthesizer to vary its output in response to said polyphonic pitch control signal.

21. In an electronic musical instrument of the type having a body with a plurality of key controller switches each of which activates a predetermined electronically synthesized note, and in which translucent key controller switches resembling "white" piano keys are illuminated from behind by a light source such that each key controller switch may be easily seen in the dark, an improved key controller wherein each key controller switch is illuminated according to a spectral color scheme such that the key controller switch activating the lowest frequency note is illuminated by a color closest to the red end of the optical spectrum, and each other key controller switch activating successively higher frequency notes is illuminated by a proportionally higher frequency optical light, thereby allowing the user to determine, at a glance, the relative pitch of each predetermined electronically synthesized note activated by the key controller switches.

22. An electronic musical instrument comprising:

(a) a body comprising a multiplicity of controls and displays for programming and monitoring the operation of the instrument, respectively, and a predetermined number "n" of piano key control switches disposed on the body for activating preprogrammed notes generated by a synthesizer;

(b) a rigid neck with fret markings extending longitudinally from the body;

(c) a sliding hand controller member superposed on so as to freely slide longitudinally along the neck, wherein the sliding hand controller member causes the pitch of said pre-programmed notes to be uniformly altered, in real-time, as it is slid; and (d) a matrix of fretboard switches attached to the exterior of the sliding hand controller member for emulating an "m" fretted section of an "n" stringed guitar, wherein "m" is a number between 3 and 6 and each switch in the matrix of fretboard switches when depressed raises or lowers the pitch of the pre-programmed notes by a predetermined amount.

23. A strum controller of an electronic musical instrument having a body, a neck extending from the body, and a fingerboard on the neck for producing a desired sequence of selected musical tones through an electronic tone generating means, comprising:

a first monostable on/off strum switch, normally undepressed, disposed on said body so as to be depressed by an operator's little finger during operation of said electronic musical instrument, said first switch activating a first predetermined sequence of selected musical tones at a first rate when depressed;

a second monostable on/off strum switch, normally undepressed, disposed on said body so as to be depressed by the operator's thumb during operation of said electronic musical instrument, said second switch activating a second predetermined sequence of selected muscial tones at a second rate when depressed;

an arm with ends respectively superposed on and fixed to each of said first and second strum switches;

a pivot disposed on the body between the first and second strum switches, said arm resting on said pivot so as to create a fulcrum about which the arm selectively actuates said first and second strum switches during operation of said electronic musical instrument; and pressure and velocity sensing means provided in said first and second strum switches for sensing the pressure and velocity at which said first and second strum switches are actuated by said arm.

24. A pitch controller for use with a sound generator, comprising:

a controller housing with a plurality of control switches and a plurality of note activating switches mounted on a side thereof, each note activating switch causing a predetermined note to be sounded when closed;

a neck member mechanically supported by and rigidly attached to said controller housing and attached at a proximate end thereof, said neck member extending longitudinally away from said controller housing;

a slide hand controller comprising a plurality of levers for depression by one hand of a user, said slide hand controller being mounted on said neck member so as to slide longitudinally along said neck member, movement of said slide hand controller causing a hand controller position signal representing the position of said slide hand controller along said neck member to be generated and depression of one or more of said levers causing lever position signals representing the position of each of said levers to be generated;

processing means, integral to said controller housing and responsive to said plurality of control switches, for altering at least one of tone, amplitude and pitch of said predetermined note in response to said hand controller position signal and said lever position signals, for causing said altered note to be outputted by said sound generator, and for selectively outputting a user feedback information signal for identifying which of said note activating switches is closed, which of said levers is depressed and by how much, and the position along the neck member of said slide hand controller.

25. A pitch controller as claimed in claim 24, further comprising:

external processing means, operating ancillary to said processing means integral to said controller housing and responsive to said user feedback information signal and external user input, for auxiliary programming of said plurality of note activating switches and for programming the manner in which the depression of said levers alters said predetermined note during a programming mode, wherein the user inputs designated pitches to be activated by each of the plurality of note activating switches and lever depression data for altering said designated pitches when said levers are depressed during a performance mode, wherein electrical signals activating the designated pitches are generated during said performance mode when said note activating switches are depressed, said designated pitches being altered by said lever depression data when said levers are depressed, and predetermined pitches inputted via said plurality of control switches are activated by said plurality of note activating switches during said performance mode by generating electrical signals activating the predetermined pitches when the note activating signals are not so designated in said programming mode, said predetermined pitches being altered by lever depression data, inputted via said plurality of control switches, when said levers are depressed; and a monitor receiving input from said further processing means during said programming mode and said performance mode for displaying changes in pitch of notes caused to be sounded by said note activating switches and altered by the depression of said levers and movement of said slide hand controller, for displaying the extent of depression of said levers, and for displaying the position of said slide hand controller along said neck.

26. A pitch controller as claimed in claim 24, further comprising:

a strum controller mounted on said controller housing, said strum controller comprising first and second strum switches which are open when said strum controller is not in use, said strum controller being mounted adjacent said plurality of note activating switches such that said strum controller may be actuated by a little finger and thumb of the same hand of the user which is used to actuate said note activating switches.

27. A pitch controller as claimed in claim 24, wherein said controller housing has a guitar-like shape, said plurality of note activating switches are mounted on the front side thereof, and the front side of said controller housing further includes at least one electronic display.

28. A pitch controller as claimed in claim 24, wherein said plurality of note activating switches are in the shape of white keys of a piano keyboard, said keys being arranged parallel and adjacent to each other and substantially perpendicular to the longitudinal axis of said controller housing, said note activating switches further comprising transducers for measuring the velocity and pressure with which said note activating switches are closed, the output of said transducers being inputted to said processing means for altering the amplitude and tone of said predetermined note.

29. A pitch controller as claimed in claim 28, wherein said keys are translucent and are illuminated by a light source disposed behind said keys so that each key is visible in the dark.

30. A pitch controller as claimed in claim 29, wherein each of said translucent keys are illuminated according to a spectral color scheme such that a key activating a note of the lowest frequency is illuminated by a light of a reddish color, and each other key successively activating notes of a higher frequency is illuminated by a different frequency of light.

31. A pitch controller as claimed in claim 24, wherein said plurality of note activating switches are in the shape of white keys of a piano keyboard, said keys being arranged adjacent to each other and in a semi-circular pattern conforming to the positioning of the user's hand, said keys being wider at the end of the outer circumference of the semi-circular pattern than at the end of the inner circumference such that a continuous fan-like arrangement of keys is formed, said note activating switches further comprising transducers for measuring the velocity and pressure with which said note activating switches are closed, the output of the transducers being inputted to said processing means for altering the amplitude and tone of said predetermined note.

32. A pitch controller as claimed in claim 31, wherein said keys are translucent and are illuminated by a light source disposed behind said keys so that each key is visible in the dark.

33. A pitch controller as claimed in claim 32, wherein each of said translucent keys are illuminated according to a spectral color scheme such that a key activating a note of the lowest frequency is illuminated by a light of a reddish color, and each other key successively activating notes of a higher frequency is illuminated by a different frequency of light.

34. A pitch controller as claimed in claim 24, further comprising a stop secured to a distal end of said neck member for inhibiting further longitudinal motion of said slide hand controller in the distal direction.

35. A pitch controller as claimed in claim 24, wherein said neck member further includes exponentially spaced fret lines for indicating the position of said slide hand controller along said neck.

36. A pitch controller as claimed in claim 24, wherein said neck member further includes linearly spaced fret lines for indicating the position of said slide hand controller along said neck.

37. A pitch controller as claimed in claim 24, wherein said neck member is hollow so as to contain electrical connections which connect said processing means to said slide hand controller.

38. A pitch controller as claimed in claim 24, wherein said neck member is hollow so as to contain fiber-optical connections which connect said processing means to said slide hand controller.

39. A pitch controller as claimed in claim 24, wherein said slide hand controller communicates with said processing means through a wireless transmitter and receiver.

40. A pitch controller as claimed in claim 39, wherein said transmitter is placed in said slide hand controller and said receiver is placed in said controller housing, said transmitter transmitting said lever position signals to said receiver and being powered by a battery which is recharged whenever said slide hand controller touches said controller housing.

41. A pitch controller as claimed in claim 24, wherein said neck member is indented at regular intervals with tapered notches, the interior side of said slide hand controller comprising compressed rollers which extend as the compressed rollers pass over said notches, thereby rendering the position of said slide hand controller on said neck member perceptible by touch.

42. A pitch controller as claimed in claim 24, wherein said slide hand controller contains finger levers and a thumb lever which are designed to conform to the shape of the grasp of the user's hand, each of said levers being fitted with a transducer for generating one of said lever position signals, each of said lever position signals being proportional to a lever depression angle about a pivot point and each of said levers being held in an extended position by a spring when said lever is not depressed.

43. A pitch controller as claimed in claim 24, wherein said slide hand controller comprises a guide key and said neck member contains a neck slot into which said guide key protrudes so as to restrain said slide hand controller from rotating about the axis of said neck member.

44. A pitch controller as claimed in claim 43, wherein said neck slot runs longitudinally along said neck member and comprises resistive strips such that said guide key electrically shunts said neck slot resistive strips to form a variable resistance circuit with a resistive value dependent upon the longitudinal position along the neck member of said slide hand controller, said variable resistance circuit outputting said slide hand controller position signal.

45. A pitch controller as claimed in claim 26, wherein said strum controller further comprises an arm that has first and second ends attached to said first and second strum switches, respectively, said arm pivoting about a pivot secured to said controller housing between said first and second strum switches.

46. A pitch controller as claimed in claim 45, wherein said first and second strum switches comprise pressure and velocity sensors which detect the pressure and velocity at which said first and second strum switches are closed.

47. A pitch controller as claimed in claim 25, wherein said further processing means comprises a ROM containing setup charts and algorithms stored therein, said ROM providing user instructions explaining the use of said setup charts, said setup charts and said user instructions being displayed on said monitor during said programming mode.

48. A pitch controller for use with a sound generator, comprising:

a controller housing with a plurality of control switches and a plurality of note activating switches mounted on a side thereof, each note activating switch causing a predetermined note to be sounded when closed;

a neck member mechanically supported by and rigidly attached to said controller housing and attached at a proximate end thereof, said neck member extending longitudinally away from said controller housing;

a slide fretboard controller mounted on said neck member such that said slide fretboard controller may slide longitudinally along said neck member, said slide fretboard controller comprising a plurality of fret divisions, each of said fret divisions containing a separate pressure sensitive switch for each of said note activating switches, wherein movement of said slide fretboard controller causes a fretboard controller position signal representing the position of said slide fretboard controller along said neck member to be generated and depression of one or more of said pressure sensitive switches causes fret depression signals representing which of said pressure sensitive switches is depressed to be generated; and processing means, integral to said controller housing and responsive to said plurality of control switches, for altering at least one of tone, amplitude and pitch of said predetermined note in response to said fretboard controller position signal and said fret depression signals, for causing said altered note to be outputted by said sound generator, and for selectively outputting a user feedback information signal for identifying which of said note activating switches is closed, which of said pressure sensitive switches is depressed, and the position along the neck member of said slide fretboard controller.

49. A pitch controller as claimed in claim 48, further comprising:

external processing means, operating ancillary to said processing means integral to said controller housing and responsive to said user feedback information signal and external user input, for auxiliary programming of said plurality of note activating switches and for programming the manner in which the depression of said pressure sensitive switches alter said predetermined note during a programming mode, the user inputting during the programming mode designated pitches to be activated by each of the plurality of note activating switches and inputting switch depression data for altering said designated pitches when said pressure sensitive switches are depressed during a performance mode, electrical signals activating the designated pitches being generated during said performance mode when said note activating switches are depressed and said designated pitches being altered by said switch depression data when said pressure sensitive switches are depressed, wherein when the note activating signals are not so designated in said programming mode, predetermined pitches inputted via said plurality of control switches are activated by said plurality of note activating switches during said performance mode by generating electrical signals activating the predetermined pitches, and said predetermined pitches are altered by said switch depression data, inputted via said plurality of control switches, when said pressure sensitive switches are depressed; and a monitor receiving input from said external processing means during said programming mode and said performance mode for displaying changes in pitch of notes caused to be sounded by said note activating switches and altered by the depression of said pressure sensitive switches and movement of said slide fretboard controller, for displaying the extent of depression of said pressure sensitive switches, and for displaying the position of said slide fretboard controller along said neck.

50. A pitch controller as claimed in claim 49, further comprising:

a strum controller mounted on said controller housing, said strum controller comprising first and second strum switches which are open when said strum controller is not in use, said strum controller being mounted adjacent said plurality of note activating switches such that said strum controller may be actuated by a little finger and thumb of the same hand of the user which is used to actuate said note activating switches.

51. A pitch controller as claimed in claim 48, wherein said note activating switches are parallel guitar-like strings, said guitar-like strings generating said predetermined notes when strummed or picked.

52. A method for producing polyphonic pitch control signals in real-time, comprising the steps of:

assigning note values to each of a plurality of note activating switches, each of said note values being represented by an electrical signal;

assigning a pitch increment value to an increment of movement of a slide hand controller, the pitch of each of said note values being uniformly raised or lowered by the movement of said slide hand controller;

activating a predetermined note by closing one or more of said note activating switches;

continuously generating a uniform pitch increment control signal identifying the position of said slide hand controller;

altering at least one of tone, amplitude, and pitch of said predetermined note in response to said uniform pitch increment control signal;

outputting said altered note to a sound generator;

selectively transmitting a user feedback information signal to a processing means, said user feedback information signal identifying which of said note activating switches is depressed and the position of said slide hand controller;

receiving said user feedback information signal by said processing means;

processing in real-time said user feedback information signal to determine the pitches being played by the user; and displaying said processed user feedback information signal and user operating instructions on a display.

53. A method in accordance with claim 52, including the further steps of:

assigning up and down strumming sequences to a strum controller, said strumming sequences specifying the switches to be activated in said activating step; and generating a sequence of said predetermined notes by activating the strumming sequences of said strum controller, the rate at which said notes are generated being determined by sensing the velocity with which said strum controller is activated.

* * * * *